US011587172B1

(12) United States Patent
Guzman et al.

(10) Patent No.: US 11,587,172 B1
(45) Date of Patent: Feb. 21, 2023

(54) METHODS AND SYSTEMS TO QUANTIFY AND INDEX SENTIMENT RISK IN FINANCIAL MARKETS AND RISK MANAGEMENT CONTRACTS THEREON

(71) Applicant: Economic Alchemy Inc., New York, NY (US)

(72) Inventors: Giselle Claudette Guzman, New York, NY (US); Lawrence Klein, Gladwyne, PA (US)

(73) Assignee: Economic Alchemy Inc., New York, NY (US)

( * ) Notice: Subject to any disclaimer, the term of this patent is extended or adjusted under 35 U.S.C. 154(b) by 0 days.

(21) Appl. No.: 13/677,297

(22) Filed: Nov. 14, 2012

Related U.S. Application Data

(60) Provisional application No. 61/629,227, filed on Nov. 14, 2011.

(51) Int. Cl.
*G06Q 40/06* (2012.01)
(52) U.S. Cl.
CPC .................................. *G06Q 40/06* (2013.01)
(58) Field of Classification Search
CPC ........ G06Q 40/00; G06Q 40/04; G06Q 40/06; G06Q 30/02; G06Q 10/063; G06Q 10/04
(Continued)

(56) References Cited

U.S. PATENT DOCUMENTS 5,521,814 A  5/1996  Teran
5,701,400 A  12/1997  Amado
(Continued)

FOREIGN PATENT DOCUMENTS

EP      2182481 A1    5/2010
KR   20060123116 A   12/2006
(Continued)

OTHER PUBLICATIONS

Office Action for U.S. Appl. No. 13/677,276 dated Jan. 6, 2015; 12 pps.
(Continued)

*Primary Examiner* — Hao Fu
(74) *Attorney, Agent, or Firm* — Sage Patent Group

(57) ABSTRACT

Systems and methods for creating an index to track sentiment risk in 1) the economy as measured by expectations for future economic (GDP) growth; 2) in financial markets as measured by sentiment for securities comprising a benchmark financial index; 3) or for individual securities comprising an individual portfolio; by combining multiple data sources including surveys, opinion polls, prediction markets, news, internet content, activity, and search query data, and extracting a common signal from multiple sources. An index can be created aggregating sentiment measures across securities which are the components of a well-known financial market index to track sentiment risk for that index. An index can be created by aggregating sentiment measures across securities which are the holdings in an individual portfolio. Security-specific sentiment measures can be created. Financial instruments—options, futures, options on futures, ETFs, ETNs and other financial instruments can be created to track the sentiment index and the sentiment measures for each underlying component, providing a way to hedge sentiment risk.

18 Claims, 6 Drawing Sheets

(58) Field of Classification Search
USPC .................................... 705/36 R, 35–37
See application file for complete search history.

(56) References Cited

U.S. PATENT DOCUMENTS

| | | |
|---|---|---|
| 5,727,161 A | 3/1998 | Purcell |
| 5,812,988 A | 9/1998 | Sandretto |
| 5,852,811 A | 12/1998 | Atkins |
| 5,875,437 A | 2/1999 | Atkins |
| 5,946,667 A | 8/1999 | Tull |
| 5,987,435 A | 11/1999 | Weiss |
| 6,018,722 A | 1/2000 | Ray |
| 6,038,540 A | 3/2000 | Krist |
| 6,092,056 A | 7/2000 | Tull |
| 6,125,355 A | 9/2000 | Bekaert |
| 6,341,271 B1 | 1/2002 | Salvo |
| 6,366,870 B2 | 4/2002 | Jarman et al. |
| 6,513,020 B1 | 1/2003 | Weiss |
| 6,658,467 B1 | 12/2003 | Rice et al. |
| 6,792,399 B1 | 9/2004 | Phillips et al. |
| 6,876,992 B1 | 4/2005 | Sullivan |
| 7,062,447 B1 | 6/2006 | Valentine et al. |
| 7,072,863 B1 | 7/2006 | Phillips |
| 7,175,072 B2 | 2/2007 | Krishnan et al. |
| 7,191,150 B1 | 3/2007 | Shao |
| 7,415,432 B1 | 8/2008 | Gianakouros et al. |
| 7,464,006 B1 | 12/2008 | Huang |
| 7,474,985 B1 | 1/2009 | Pugh et al. |
| 7,480,659 B2 | 1/2009 | Chmura |
| 7,546,265 B1 | 6/2009 | Donner |
| 7,599,872 B2 | 10/2009 | Dundas et al. |
| 7,664,693 B1 | 2/2010 | von Groll et al. |
| 7,676,375 B1 | 3/2010 | Neifeld |
| 7,707,091 B1 | 4/2010 | Kauffman |
| 7,730,019 B1 | 6/2010 | Graham |
| 7,769,657 B2 | 8/2010 | Chacko et al. |
| 7,958,204 B1 | 6/2011 | Phillips |
| 8,108,290 B2 | 1/2012 | Speth |
| 8,156,035 B2 | 4/2012 | Ferguson et al. |
| 8,190,458 B2 | 5/2012 | Back |
| 8,200,477 B2 | 6/2012 | Yi |
| 8,229,866 B2 | 7/2012 | Alaniz |
| 8,234,201 B1 | 7/2012 | Canabarro |
| 8,250,009 B1 | 8/2012 | Breckenridge |
| 8,275,637 B1 | 9/2012 | Glacy |
| 8,335,735 B1 | 12/2012 | Chafkin |
| 8,346,647 B1 | 1/2013 | Phelps et al. |
| 8,364,518 B1 | 1/2013 | Blake et al. |
| 8,407,118 B1 | 3/2013 | Zazelenchuk et al. |
| 8,433,640 B2 | 4/2013 | Rooney |
| 8,452,677 B1 | 5/2013 | de la Houssaye et al. |
| 8,515,851 B2 | 8/2013 | Cardoza et al. |
| 8,533,082 B1 | 9/2013 | Sudjianto et al. |
| 8,533,089 B1 | 9/2013 | Renshaw |
| 8,566,067 B2 | 10/2013 | Johnson |
| 8,606,681 B2 | 12/2013 | O'Rourke |
| 8,798,399 B2 | 8/2014 | Huang et al. |
| 9,508,082 B1 | 11/2016 | Mannix et al. |
| 9,547,477 B2 | 1/2017 | Mun |
| 10,038,703 B2 | 7/2018 | Liu et al. |
| 10,296,857 B2 | 5/2019 | Martin et al. |
| 10,430,848 B2 | 10/2019 | Cotton et al. |
| 10,838,965 B1 | 11/2020 | Todd et al. |
| 2002/0023045 A1 | 2/2002 | Feilbogen et al. |
| 2002/0151992 A1 | 10/2002 | Hoffberg |
| 2003/0018548 A1 | 1/2003 | Cattaneo |
| 2003/0035468 A1 | 2/2003 | Corbaton |
| 2003/0046212 A1 | 3/2003 | Hunter et al. |
| 2003/0074244 A1 | 4/2003 | Braxton |
| 2003/0093347 A1 | 5/2003 | Gray |
| 2003/0105703 A1 | 6/2003 | Palsky |
| 2003/0130975 A1 | 7/2003 | Muller |
| 2003/0149586 A1 | 8/2003 | Chen |
| 2003/0225719 A1 | 12/2003 | Juang et al. |
| 2004/0015376 A1 | 1/2004 | Zhu |
| 2004/0024606 A1 | 2/2004 | Chukwu |
| 2004/0073506 A1 | 4/2004 | Tull |
| 2004/0172352 A1 | 9/2004 | Deretz |
| 2004/0181422 A1 | 9/2004 | Brand |
| 2004/0186803 A1 | 9/2004 | Weber |
| 2004/0193524 A1 | 9/2004 | Almeida et al. |
| 2004/0202914 A1 | 10/2004 | Sridhar |
| 2004/0204775 A1 | 10/2004 | Keyes |
| 2004/0267684 A1 | 12/2004 | Erdem |
| 2005/0021517 A1* | 1/2005 | Marchisio ............... 707/4 |
| 2005/0071300 A1 | 3/2005 | Bartlett et al. |
| 2005/0080704 A1 | 4/2005 | Erlach |
| 2005/0096893 A1 | 5/2005 | Feraille |
| 2005/0102175 A1 | 5/2005 | Dudat |
| 2005/0119922 A1 | 6/2005 | Eder |
| 2005/0228591 A1 | 10/2005 | Hur et al. |
| 2005/0240465 A1 | 10/2005 | Kiran |
| 2005/0262002 A1 | 11/2005 | Manning |
| 2005/0273319 A1 | 12/2005 | Dittmar et al. |
| 2005/0273376 A1 | 12/2005 | Ouimet et al. |
| 2005/0273377 A1 | 12/2005 | Ouimet et al. |
| 2006/0004653 A1 | 1/2006 | Strongin |
| 2006/0085455 A1 | 4/2006 | Chmura |
| 2006/0190303 A1 | 8/2006 | Yourist |
| 2006/0248096 A1 | 11/2006 | Adam |
| 2006/0262865 A1 | 11/2006 | Moran |
| 2006/0282380 A1 | 12/2006 | Birney |
| 2007/0086513 A1 | 4/2007 | Fernandez-Corbaton |
| 2007/0129838 A1 | 6/2007 | Bendix |
| 2007/0130060 A1 | 6/2007 | Rajah |
| 2007/0208599 A1 | 9/2007 | Cornford |
| 2007/0239571 A1 | 10/2007 | Michaletz |
| 2007/0244785 A1 | 10/2007 | Williams |
| 2007/0282758 A1 | 12/2007 | Vischer |
| 2007/0288336 A1 | 12/2007 | Malaviya et al. |
| 2008/0052097 A1 | 2/2008 | Bouzas |
| 2008/0071588 A1 | 3/2008 | Eder |
| 2008/0120250 A1 | 5/2008 | Hiatt |
| 2008/0222052 A1 | 9/2008 | Choueifaty |
| 2008/0270314 A1 | 10/2008 | Birney |
| 2008/0281581 A1 | 11/2008 | Henshaw |
| 2008/0288596 A1 | 11/2008 | Smith |
| 2008/0319712 A1 | 12/2008 | Claps |
| 2008/0319829 A1 | 12/2008 | Hunt |
| 2008/0319923 A1 | 12/2008 | Casey et al. |
| 2009/0018891 A1 | 1/2009 | Eder |
| 2009/0018996 A1 | 1/2009 | Hunt |
| 2009/0043637 A1 | 2/2009 | Eder |
| 2009/0043713 A1 | 2/2009 | Weber |
| 2009/0076987 A1 | 3/2009 | Chmura |
| 2009/0097772 A1 | 4/2009 | Zhao |
| 2009/0119200 A1 | 5/2009 | Riviere |
| 2009/0132347 A1 | 5/2009 | Anderson |
| 2009/0172821 A1 | 7/2009 | Daira et al. |
| 2009/0177589 A1 | 7/2009 | Edgar |
| 2009/0204446 A1 | 8/2009 | Simon et al. |
| 2009/0217302 A1 | 8/2009 | Grechanik |
| 2009/0238426 A1 | 9/2009 | Fear et al. |
| 2009/0254389 A1 | 10/2009 | Teal |
| 2009/0254395 A1 | 10/2009 | Lynn |
| 2009/0254971 A1* | 10/2009 | Herz ............ G06Q 30/0603 726/1 |
| 2009/0265281 A1 | 10/2009 | Cohen |
| 2009/0281964 A1 | 11/2009 | Broms et al. |
| 2009/0292662 A1 | 11/2009 | Ueno et al. |
| 2009/0307057 A1 | 12/2009 | Azout |
| 2009/0319436 A1 | 12/2009 | Andra |
| 2010/0036529 A1 | 2/2010 | Landells |
| 2010/0042553 A1 | 2/2010 | Van Erlach |
| 2010/0070485 A1 | 3/2010 | Parsons |
| 2010/0076785 A1 | 3/2010 | Mehta |
| 2010/0076904 A1* | 3/2010 | Ghosh et al. ............ 705/36 R |
| 2010/0076966 A1 | 3/2010 | Strutton |
| 2010/0119053 A1 | 5/2010 | Goeldi |
| 2010/0121707 A1 | 5/2010 | Goeldi |
| 2010/0121843 A1 | 5/2010 | Goeldi |
| 2010/0125532 A1 | 5/2010 | Cohen |
| 2010/0145773 A1 | 6/2010 | Desai et al. |
| 2010/0179921 A1 | 7/2010 | Scheinerman |

(56) References Cited

U.S. PATENT DOCUMENTS

| | | |
|---|---|---|
| 2010/0179930 A1 | 7/2010 | Teller |
| 2010/0185716 A1 | 7/2010 | Nakamura et al. |
| 2010/0204967 A1 | 8/2010 | Mun |
| 2010/0205117 A1 | 8/2010 | Van Erlach |
| 2010/0205124 A1 | 8/2010 | Ben-Hur et al. |
| 2010/0205131 A1 | 8/2010 | Kumar |
| 2010/0228685 A1 | 9/2010 | Barsade |
| 2010/0262597 A1 | 10/2010 | Han |
| 2010/0305913 A1 | 12/2010 | Johnson |
| 2010/0312724 A1 | 12/2010 | Pinckney |
| 2011/0040635 A1 | 2/2011 | Simmons |
| 2011/0060572 A1 | 3/2011 | Brown |
| 2011/0071857 A1 | 3/2011 | Malov |
| 2011/0071885 A1 | 3/2011 | Ayres de Castro |
| 2011/0106578 A1 | 5/2011 | Cerminaro |
| 2011/0106589 A1 | 5/2011 | Blomberg |
| 2011/0112995 A1 | 5/2011 | Chang |
| 2011/0125623 A1 | 5/2011 | DeLillio |
| 2011/0137825 A1 | 6/2011 | Weber |
| 2011/0145126 A1 | 6/2011 | Rooney |
| 2011/0153412 A1 | 6/2011 | Novikov |
| 2011/0153451 A1 | 6/2011 | Bitz |
| 2011/0191372 A1 | 8/2011 | Kaushansky |
| 2011/0202475 A1 | 8/2011 | Choueifaty |
| 2011/0246155 A1 | 10/2011 | Fitch |
| 2011/0246179 A1 | 10/2011 | O'Neil |
| 2011/0251974 A1 | 10/2011 | Woodard |
| 2011/0282943 A1 | 11/2011 | Anderson |
| 2011/0302106 A1* | 12/2011 | Nosegbe ..................... 705/36 R |
| 2012/0019307 A1 | 1/2012 | Ludwig |
| 2012/0023040 A1 | 1/2012 | Benoit |
| 2012/0030082 A1 | 2/2012 | Voltz |
| 2012/0036085 A1 | 2/2012 | Srivastava |
| 2012/0041880 A1 | 2/2012 | Shai |
| 2012/0041937 A1 | 2/2012 | Dhillon |
| 2012/0046928 A1 | 2/2012 | Godbole |
| 2012/0047219 A1 | 2/2012 | Feng |
| 2012/0066024 A1 | 3/2012 | Strongin |
| 2012/0069131 A1 | 3/2012 | Abelow |
| 2012/0095802 A1 | 4/2012 | Wilberding |
| 2012/0101805 A1 | 4/2012 | Barbosa |
| 2012/0101808 A1 | 4/2012 | Duong-Van |
| 2012/0116941 A1 | 5/2012 | Pazner |
| 2012/0143683 A1 | 6/2012 | Hertz |
| 2012/0143738 A1 | 6/2012 | McConnel |
| 2012/0143739 A1 | 6/2012 | Lopez de Prado |
| 2012/0143740 A1 | 6/2012 | Lopez de Prado |
| 2012/0143741 A1 | 6/2012 | Lopez de Prado |
| 2012/0158613 A1 | 6/2012 | Bollen |
| 2012/0166330 A1 | 6/2012 | Kemp |
| 2012/0173302 A1 | 7/2012 | Dooley |
| 2012/0179692 A1 | 7/2012 | Hsiao |
| 2012/0185544 A1 | 7/2012 | Chang |
| 2012/0191730 A1* | 7/2012 | Parikh et al. ................. 707/754 |
| 2012/0203684 A1 | 8/2012 | Gilbert |
| 2012/0215717 A1 | 8/2012 | Arnott |
| 2012/0226645 A1* | 9/2012 | O'Rourke ...................... 706/46 |
| 2012/0246048 A1 | 9/2012 | Cohen |
| 2012/0316904 A1 | 12/2012 | Eder |
| 2012/0323674 A1 | 12/2012 | Simmons |
| 2012/0330810 A1 | 12/2012 | Dadkar |
| 2013/0041841 A1 | 2/2013 | Lyons |
| 2013/0041848 A1 | 2/2013 | Stubbs |
| 2013/0060603 A1 | 3/2013 | Wagner |
| 2013/0218736 A1 | 8/2013 | Eisen et al. |
| 2013/0297479 A1 | 11/2013 | Rooney |
| 2013/0332391 A1 | 12/2013 | Renshaw |
| 2014/0012776 A1 | 1/2014 | Lo |
| 2014/0046872 A1 | 2/2014 | Arnott |
| 2014/0067279 A1 | 3/2014 | George et al. |
| 2014/0108059 A1 | 4/2014 | Ring et al. |
| 2014/0257829 A1 | 9/2014 | Schuetz et al. |
| 2014/0278472 A1 | 9/2014 | Guetz |
| 2014/0372172 A1 | 12/2014 | Martínez et al. |
| 2015/0127425 A1 | 5/2015 | Greene et al. |
| 2015/0142713 A1 | 5/2015 | Gopinathan et al. |
| 2016/0140584 A1 | 5/2016 | Moghtaderi |
| 2016/0379388 A1 | 12/2016 | Rasco et al. |
| 2017/0300824 A1 | 10/2017 | Peng et al. |

FOREIGN PATENT DOCUMENTS

| | | | | |
|---|---|---|---|---|
| KR | 100930505 B1 | 12/2009 | | |
| WO | 2002099601 A2 | 12/2002 | | |
| WO | WO-2006121338 A2 * | 11/2006 | ........... | G06F 16/345 |
| WO | 2007106475 A2 | 9/2007 | | |
| WO | WO-2011095988 A2 * | 8/2011 | ........... | G06F 40/131 |
| WO | WO-2011119509 A1 * | 9/2011 | ............. | G06Q 30/02 |

OTHER PUBLICATIONS

"U.S. Appl. No. 13/677,273, Notice of Allowance dated Oct. 1, 2014", 8 pgs.

"U.S. Appl. No. 13/677,273, Non-Final Office Action dated Mar. 25, 2014", 14 pgs.

"U.S. Appl. No. 13/677,277, Non-Final Office Action dated Oct. 15, 2014", 6 pgs.

"U.S. Appl. No. 13/677,277, Non-Final Office Action dated Mar. 24, 2014", 5 pgs.

"U.S. Appl. No. 13/677,278, Final Office Action dated Oct. 9, 2014", 13 pgs.

"U.S. Appl. No. 13/677,278, Restriction Requirement dated Dec. 24, 2013", 7 pgs.

"U.S. Appl. No. 13/677,278, Non-Final Office Action dated May 22, 2013", 10 pgs.

Tanaka-Yamawaki, Mieko, "Cross Correlation of Intra-Day Stock Prices in Comparison to Random Matrix Theory", Intelligent Information Management, (May 2011), pp. 65-70.

Ozertem et al., "Recursive Generalized Eigendecomposition for Independent Component Analysis", Independent Component Analysis and Blind Signal Separation, vol. 3889, (2006), pp. 198-205.

"CBOE S&P 500 Implied Correlation Index", Chicago Board Options Exchange, Incorporated, (2009), 9 pgs.

Guzman, Giselle, "Internet Search Behavior as an Economic Forecasting Tool: The Case of Inflation Expectations", Journal of Economic and Social Measurement, 36, (2011), 119-167.

Guzman, Giselle, "Sexonomics: Gender, Wealth, and Expectations in Financial Markets", Journal of Economic and Social Measurement, 37, (2012), 1-60.

Guzman, Giselle, "Using Sentiment Surveys to Predict GDP Growth and Stock Returns", The Making of National Economic Forecasts, Chapter 12, 319-351.

Klein, Lawrence R, "The Making of National Economic Forecasts", Edward Elgar Publishing Limited, Northampton, MA, USA, (2009), 403 pgs.

Schmidt, Thorsten, "Correlation and Correlation Risk", University of Leipzig, Dep. of Mathematics, 4 pgs.

Driessen et al., "The Price of Correlation Risk: Evidence from Equity Options", The Journal of Finance, vol. 64, No. 3, (Jun. 2009), 30 pgs.

Antenucci, Dolan et al.; "Ringtail: Feature Selection for Easier Nowcasting"; 16th International Workshop on the Web and Databases, Jun. 23, 2013, New York, NY; 6 pages.

Giusto, Andrea et al.; "Nowcasting U.S. Business Cycle Turning Points with Vector Quantization"; Dalhousie University, Department of Economics, Sep. 2013; 35 pages.

Herrmannova, Lenka; "Forecasting and Nowcasting Power of Confidence Indicators: Evidence for Central Europe"; Charles University in Prague, Instutute of Economic Studies, Rigorous Thesis, Sep. 9, 2013; 140 pages.

Picerno, James; "Nowcasting the Business Cycle: A Practical Guide for Spotting Business Cycle Peaks Ahead of the Crowd"; Beta Publishing, 2014; 6 pages.

O'Donoghue, Cathal et al.; "Nowcasting in Microsimulation Models: A Methodological Survey"; Journal of Artificial Societies and Social Simulation 17 (4) 12, Oct. 31, 2014, 11 pages.

(56) References Cited

OTHER PUBLICATIONS

Brave, Scott A. et al.; "Nowcasting Using the Chicago Fed National Activity Index"; Federal Reserve Bank of Chicago, 2014; 107 pages.
Higgins, Patrick; "GDP Now: A Model for GDP 'Nowcasting'"; Working Paper No. 2014-7, Federal Reserve Bank of Atlanta, 2014; 87 pages.
Duffy, David et al.; "Quarterly Economic Commentary"; The Economic and Social Research Institute, Oct. 8, 2014; 100 pages.
Kourentzes, Nikolaos et al.; "Increasing Knowledge Base for Nowcasting GDP by Quantifying the Sentiment About the State of Economy"; Workshop on Using Big Data for Forecasting and Statistics, Feb. 15, 2014; 16 pages.
Kunovac, Davor et al.; "Nowcasting GDP Using Available Monthly Indicators"; Croatian National Bank, Working Papers W-39, Oct. 2014; 28 pages.
Massachusetts Institute of Technology; "The Emerging Pitfalls of Nowcasting with Big Data"; Aug. 18, 2014; 6 pages.
United Nations; "Handbook on Economic Tendency Surveys"; Statistical Papers, Series M, No. 96; 2015; 253 pages.
Caruso, Alberto; "Nowcasting Mexican GDP"; Ecares Working Paper 2015-40; Oct. 2015; 30 pages.
Henzel, Steffen et al.; "Nowcasting Regional GDP: The Case of the Free State of Saxony"; CESifo Working Paper, No. 5336; Apr. 2015; 29 pages.
Galbraith, John W. et al.; "Nowcasting GDP with Electronic Payments Data"; European Central Bank (ECB); ECB Statistics Paper No. 10; Aug. 2015; 21 pages.
Kovacs, Kevin et al.; "Nowcasting German Turning Points Using CUSUM Analysis"; The George Washington University Center of Economic Research, Research Program on Forecasting (RPF); RPF Working Paper No. 2016-014; Dec. 20, 2016; 18 pages.
Modugno, Michele et al.; "Nowcasting Turkish GDP and News Decomposition"; Finance and Economics Discussion Series 2016-044; May 2016; 40 pages.
Abdalla, Ahmed; "The Power of Aggregate Book-to-Market Innovations: Forecasting, Nowcasting, and Dating the Real Economy"; London School of Economics; Jul. 2016; 52 pages.
Kim, Hyan Hak et al.; "Methods for Pastcasting, Nowcasting and Forecasting Using Factor-MIDAS"; Aug. 2016; 50 pages.
Diebold, Francis X.; "Forecasting in Economics, Business, Finance and Beyond"; University of Pennsylvania, Edition 2017, Aug. 1, 2017; 619 pages.
Chernis, Tony et al.; "A Dynamic Factor Model for Nowcasting Canadian GDP Growth"; Bank of Canada Working Paper No. 2017-2, Feb. 2017; 30 pages.
Marsilli, Clement; "Nowcasting US Inflation Using a Midas Augmented Phillips Curve"; Int. J. Computational Economics and Econometrics, vol. 7, Nos. 1/2, 2017; 14 pages.
Dahlhaus, Tatjana et al.; "Nowcasting BRIC+M in Real Time"; Bank of Canada Working Paper No. 2015-38, Oct. 2015; 45 pages.
Antolin-Diaz, Juan et al.; "Advances in Nowcasting Economic Activity"; XIII Annual Conference on Real-Time Data Analysis, Bank of Spain, Oct. 19, 2017; 50 pages.
Glaeser, Edward L. et al.; "Nowcasting the Local Economy: Using Yelp Data to Measure Economic Activity" Harvard Business School, Working Paper 18-022, Oct. 2017; 56 pages.
Dartmouth College, Tuck School of Business, Elective Courses, 2020; 54 pages.
"King's College London PhD Studentships in Economic Measurement: Economic Statistics, Centre of Excellence 2017, UK"; 2017; 6 pages.
University of Kansas Economics; Student Conference Presentations 2007-2015; 7 pages.
Federal Reserve Bank of New York, Research and Statistic Group, Research Analyst Program; 2018; 12 pages.
"Advanced Workshop for Central Bankers"; Centre for International Macroeconomics, Northwestern University, Sep. 6-13, 2016; 6 pages.
MIT Center for Digital Business, 2012 Calendar of Events; 2 pages.
Columbia University, Quantitative Methods in the Social Sciences (QMSS) Courses, 2012; 7 pages.
Midwest Economics Group (MEG) Program, 26th Annual Meeting of the Midwest Economics Group, Department of Economics, University of Illinois at Urbana-Champaign, Oct. 21-22, 2016; 14 pages.
European Commission, Collaboration in Research and Methodology for Official Statistics, "Workshop on Using Big Data for Forecasting and Statistics"; Apr. 7-8, 2014; 4 pages.
Norges Bank, Central Bank of Norway, "Recent Developments in the Econometrics of Macroeconomics and Finance" Jun. 2-4, 2010; 2 pages.
Brandeis University, Econ/Fin250a Introduction, Spring 2018; 4 pages.
Federal Reserve Bank of Atlanta; "Nowcast for Real Gross Private Domestic Investment: Fixed Investment: Business" Mar. 1, 2018; 34 pages.
Nowcasting Scotland, "February Nowcasts!"; Feb. 6, 2018; 2 pages.
PwC Global; "Economic Integration: The Key to Unlocking ASEAN's Export Potential?"; Global Economy Watch Monthly Macroeconomic Publication, Oct. 2017; 6 pages.
Fulcrum Asset Management; "Global Surveys or Hard Data—Which are the Fake News?"; 2016; 3 pages.
American Economic Association; "JOE—Dec. 2013"; 3 pages.
American Economic Association; "JOE Listings (Job Openings for Economists)"; Feb. 1, 2017-Jul. 31, 2017; 2 pages.
M. Ege Yazgan Curriculum Vitae, 2014; 1 page.
Simon Kirby Curriculum Vitae, National Institute of Economic and Social Research, 2017; 3 pages.
Jack Fosten Introduction, Google, 2017; 1 page.
Carl Bonham, UHERO Executive Director and Professor of Economics, University of Hawaii, 2018; 2 pages.
Ahmed M. Abdalla Curriculum Vitae, 2017; 4 pages.
Klein et al., "The University of Pennsylvania Model for High-Frequency Economic Forecasting," Economic & Financial Modeling, Autumn 1995.
Klein et al., "Combinations of High and Low Frequency Data in Macroeconomics Models," University of Pennsylvania, 2008.
Giannone, Domenico; Reichlin, Lucrezia; Small, David, (May 2008), "Nowcasting: The real-time informational content of macroeconomic data," Journal of Monetary Economics (Elsevier) 55(4): pp. 665-676.
Camacho, Maximo; Perez-Quiros, Gabriel (2010), "Introducing the euro-sting: Short-term indicator of Euro Area Growth," Journal of Applied Econometrics (John Wiley & sons) 25 (4): pp. 663-694.
Evans, Martin D.D. (Sep. 2005). "Where Are We Now? Real-Time Estimates of the Macroeconomy," International Journal of Central Banking 1(2).
Runstler et al., "Short-term forecasting of GDP using large datasets: a pseudo real-time forecast evaluation exercise," Journal of Forecasting (John Wiley & Sons) 28(7) C. (2009), pp. 595-611.
Giannone, Domenico et al. (Nov. 23, 2009), "Is the UK still in recession? We don't think so." Vox.
Banbura, Marta et al., "Nowcasting," Working Papers ECARES 2010-021, Oxford Handbook on Economic Forecasting (2010).
Andreou, Elena, et al., "Forecasting with Mixed-Frequency Data," Oxford Handbook of Economic Forecasting, (2010).
Andreou, Elena et al., "Regression models with Mixed Sampling Frequencies," Journal of Econometrics, (2010), pp. 256-261.
A. Ang et al., "Do macro variables, asset markets, or surveys forecast inflation better?" Journal of Monetary Economics, 54 (2007), pp. 1163-1212.
C. Anvik and K. Gjelstad, "Just Google It," Forecasting Norwegian unemployment: figures with web queries Center for Research in Economics and Management CREAM Publication 11 (2010).
N. Askitas and K. Zimmerman, "Google econometrics and unemployment forecasting," Applied Economics Quarterly 65(2) (2009), pp. 107-120.
G. Calvo, "Staggered prices in a utility-maximizing framework," Journal of Monetary Economics 12 (1983), pp. 383-398.
C. Carroll, "Macroeconomic expectations of households and professional forecasters," The Quarterly Journal of Economics 118(1) (2003), pp. 269-298.

(56) References Cited

OTHER PUBLICATIONS

H. Choi and H. Varian, "Predicting the present with Google Trends," www.google.com/googleblogs/ . . . /googlepredictingthepresent.pdf (2009).
H. Choi and H. Varian, "Predicting initial claims for unemployment benefits," research.google.com/archive/papers/initialclaimsUS.pdf (2009).
A. Constant and K. Zimmerman, "Face to face with the financial crisis: The U.S. Presidential election from a transnational perspective," German Institute for Economic Research Weekly Report 16/2008 (4)(2009).
F. D'Amuri, "Predicting unemployment in short samples with internet job search query data," MPRA Paper 18403 (2009).
F. D'Amuri and J. Marcucci, "Google It" Forecasting the US unemployment rate with a Google job search index, Fondazione Eni Ennco Mattei Working Papers, 421 (2010); 58 pages.
R.F. Engle and CWJ Granger, "Co-integration and error correction: Representation, estimation, and testing," Econometrica 55 (1987), pp. 251-276.
G. Eysenbach, "Infodemiology: Tracking flu-related searches on the web for syndromic suveillance," AMIA 2006, Symposium Proceedings (2006), pp. 244-248.
Pula, Gabor et al.; "Can Business Confidence Indicators Be Useful to Predict Short-Term Industrial Growth in Hungary?"; Magyar Nemzeti Bank, MNB Background Studies Mar. 2002; Sep. 2002; 38 pages.
J. Ginsberg, et al. "Detecting influenza epidemics using search engine query data," Nature 457 (19) (2009).
S. Goel et al., "Predicting consumer behavior with web search," PNAS Early Edition (2010).
E.M. Gramlich, "Models of inflation expectations formation: A comparison of household and economist forecasts," Journal of Money, Credit, and Banking, 15(2) (1983), pp. 155-173.
CWJ Granger et al., "Forecasting Economic Time Series," Academic Press, Florida, 1977, pgs vii viii, ix, 13, 14, 25.
AP Grant et al., "Inflationary expectations and rationality revisited," Economics Letters 62 (1999), pp. 331-338.
G. Guzman, "Using sentiment surveys to predict GDP growth and stock returns," in The Making of National Forecasts LR Klein, ed., Edward Elgar Publishing Ltd., London, 2009, pp. 319-351.
D. Harvey et al., "Testing the equality of prediction mean squared errors," International Journal of Forecasting, 13 (1997), pp. 281-291.
R. Kulkarni et al., "Forecasting housing prices with Google econometrics," George Mason University School of Public Policy Research Paper 10 (2009).
M. Lanne et al., "A Naive sticky information model of households' expectations," Journal of Economic Dynamics & Control, B3 (2009), pp. 1332-1344.
G. Mankiw and R. Reis, "Sticky information versus sticky prices. A proposal to replace the New Keynesian Phillips Curve," The Quarterly Journal of Economics 117(4)(2002), pp. 1295-1328.
R. Mariano and D. Preve, "Statistical Tests for Multiple Forecast Comparison," Presentation, TW Anderson Conference, Stanford University, 2008.
Yp Mehra, "Survey measures of expected inflation: Revisiting the issues of predictive content and rationality." Federal Reserve Bank of Richmond Economic Quarterly 88/3 (2002), pp. 17-35.
Wa Morgan, "A test for significance of the difference between the two variances in a sample from a normal to variate populations," Biometrika 31 (1939), pp. 13-19.
Elshenawy, Lamiaa M. et al., "Efficient Recursive Principal Component Analysis Algorithms for Process Monitoring", Ind. Eng. Chem. Res. 2010, 49, pp. 252-259 (Year: 2010).
Hamid Krim et al., "Two decades of Array Signal Processing Research", IEEE Signal Processing Magazine (vol. 13, Issue: 4, Jul. 1996), pp. 67-94.
Giannone, Domenico et al.; "Nowcasting GDP and Inflation: The Real-Time Informational Content of Macroeconomic Data Releases"; Finance and Economics Discussion Series, Divisions of Research & Statistics and Monetary Affairs, Federal Reservse Board, Washington D.C.; Sep. 2005, 42 pages.
Giannone, Domenico et al.; "Monetary Policy in Real Time"; NBER Macroeconomics Annual 2004, vol. 19, Apr. 2005; 65 pages.
Giannone, Domenico et al.; "Nowcasting GDP and Inflation: The Real-Time Informational Content of Macroeconomic Data Releases"; European Central Bank (ECB); ECB Working Paper No. 633, 2006; 51 pages.
Giannone, Domenico et al.; "Incorporating Conjunctural Analysis in Structural Models"; Mar. 21, 2008; 24 pages.
Angelini, Elena et al., "Short-Term Forecasts of Euro Area GDP Growth"; European Central Bank, Working Paper Series, No. 949, Oct. 2008; 31 pages.
Giannone, Domenico et al.; "Nowcasting Euro Area Economic Activity in Real-Time: The Role of Confidence ndicators"; Centre for Studies in Economics and Finance, Working Paper No. 240; Nov. 2009; 24 pages.
Banbura, Marta et al.; "Nowcasting with Daily Data"; Oct. 21, 2011; 31 pages.
Wikipedia; "Nowcasting (Economics)"; Dec. 19, 2010; 3 pages.
Wikipedia; "Nowcasting (Economics)—Old Revisions"; Dec. 19, 2010; 13 pages.
Schreyer, Paul et al.; "Short-Term Indicators: Using Qualitative Indicators to Update Production Indices"; OECD Science, Technology and Industry Working Papers 1996/03, 1996; 23 pages.
Baffigi, Alberto et al.; "Real-Time GDP Forecasting in the Euro Area"; Banca D'Italia, Temi di discussione del Servizio Studi, No. 456, Dec. 2002; 42 pages.
https://www.markit.com/Company/Files/PressReleaseFile?CMSID=7bc848f70957 4b9a99f4c56a71548aa0, Jun. 2016, 2 pages.
Finance Magnate, "European Commission Selects Markit for its Fixed Income Solution", Jun. 15, 2016, 3 pages. (https://www.financemagnates.com/institutional-forex/technology/european-commission-selects-markit-for-its-fixed-income-solution).
https://www.blackrock.com/us/individual/literature/whitepaper/bii-introduction-to-gps.pdf, Sep. 2016, 2 pages.
BlackRock Investment Institute, "BlackRock Macro Dashboard", 2019, 6 pages, (https://www.blackrock.com/corporate/insights/blackrock-investment-institute/data-visuals/macro-dashboard).
DeepMacro, "Frequently Asked Questions", 2016, 7 pages, (https://beta.deepmacro.com/faq).
"Ice Data Services Summary: Final SEC Rules for Liquidity Risk Management Programs", Jul. 7, 2017, 2 pages. https://www.theice.com/market-data/pricing-and-analytics/analytics/liquidity/SECLRM, 2017).
"Ice Liquidity Indicators", Dec. 21, 2016, 3 pages. (https://web.archive.org/web/20161221065616/https://www.theice.com/market-data/pricing-and-analytics/analytics/liquidity).
Hoover, Kevin D. et al., "Data-mining reconsidered: encompassing and the general-to-specific approach to specific search", Econometrics Journal (1999), vol. 2, pp. 167-191.
"Diseases Tracked by Using Google Trends", Spain, Emerging Infectious Diseases, 111.cdc.gov/eid, vol. 16, No. 1, Jan. 2010.
Angelini, Elena et al., "Estimating and forecasting the euro area monthly national accounts from a dynamic factor model"; European Central Bank, Working Paper Series, No. 953, Oct. 2008, 31 pages.
Choudhry, Moorad et al., "Measuring Bond Market Liquidity: Devising a Composite Aggregate Liquidity Score" Applied Financial Econonmics, vol. 20, 2010; pp. 955-973.
Agrrawal, Pankaj et al., "A Multivariate Liquidity Score and Ranking Device for ETFs," 2009, Academy of Financial Services, pp. 2-18.
Medo, Matus et al.; "How to quantify the influence of correlations on investment diversification", International Review of Financial Analysis; vol. 18, Issues 1-2; Jun. 2, 2018; 14 pages.
Pm Polgreen et al., "Using internet searches for influenza surveillance," Clinical Infectious Diseases, 47(2008), pp. 1443-1448.
J. Ritterman et al. "Using prediction markets and Twitter to predict a swine flu pandemic," Proceedings of the 1st International Workshop on Mining Social Media (2009).
H. Song et al., "Forecasting hotel room demand using search engine data," College of Charleston Working Paper (2009).

(56) References Cited

OTHER PUBLICATIONS

JH Stock et al., "Forecasting inflation," Journal of Monetary Economics, 44(1999), pp. 293-335.
JH Stock et al., "Macroeconomic forecasting using diffusion indexes," Journal of business & Economic Statistics, 20 (2) 2002), pp. 147-162.
T. Suhoy, "Query indices and a 2006 downturn: Israeli data," Bank of Israel Discussion Paper (2009).
T. Suhoy, "Monthly assessments of private consumption," Bank of Israel Discussion Paper (2010).
LB Thomas, "Survey measures of expected US inflation," The Journal of Economic Perspectives 13(4) (1999), pp. 125-144.
S. Vosen et al., "Forecasting private consumption: survey-based indicators vs. Google Trends," Journal of Forecasting, 10.1002, (2011).
Klein, LR. et al., "Economic Forecasting at high-frequency intervals," Journal of Forecasting, vol. 12, Issue 3-4, pp. 301-319 (Apr. 1993). http:l/onlinelibrary_wiley.com/doi/10.1002/for.3980120910/abstract.
Preis et al., "Complex dynamics of our economic life on different scales: insights from search engine query data," Phil. Wrans. R. Soc_ A.2010 368, pp. 5707-5719.
Harding, "Google to map inflation using web data," Financial Times, Oct. 11, 2010.
Vlastakis et al., "Information Demand and Stock Market Volatility," Athena University, May 2010.
Zhi Da et al., "In Search of Attention," SSRN 1364209, Jun. 4, 2009, 45 pages.
Finance Team, "Google Domestic Trends," download date Jul. 17, 2015.
Sharad Goel, "What can search predict?" Messy Matters, Nov. 30, 2009.
Goel et al., "What can search predict?" Yahoo! Labs; Jan. 1, 1979.
Ettredge et al., "Using web-based search data to predict macroeconomic statistics," Commun, ACM, 48(11) 87(92), 2005.
Huang et al., "Constructing Consumer Sentiment Index for US Using Internet Search Patterns"; University of Alberta, Department of Economics, Working Paper No. 2009-26, Oct. 2009, 22 pages.
Shimshoni et al., "On the Predictability of Trends," Google, Israel Labs, Aug. 17, 2009.
Sornette et al., "Endogenous versus exogenous shocks in complex network: an empirical test using book sale rankings," APS preprint, Feb. 2, 2006.
Valdivia et al., "Diseases tracked by using Google Trends," Emerging Infectious Diseases, vol. 16, No. 1, Jan. 2010.
Pelat et al., "More diseases tracked by using Google Trends," Emerging Infectious Diseases, 2009, 15:1327-8.
Matheson, Troy D. (Jan. 2010). "An analysis of the informational content of New Zealand data releases: The Importance of business opinion surveys", Economic Modeling (Elsevier) 27 (1); pp. 304-314. http://www.sciencedirect.com/science/article/pii/S0264999309001679.
M. Woodford, "Interest and Prices", Princeton University Press, Princeton, 2003.
G. Guzman, "GDP Growth Signals, Investor Psychology, and Hedging Pressure: A Multivariable Approach to Forecasting Returns on the S&P500 Index", Independent Study, The Wharton School, University of Pennsylvania, 2003.
Hoffman et al., "Are Brand Attitudes Contagious? Consumer Response to Organic Search Trends", Nov. 2009.
Bardhan et al., "The Past as Prologue? Business Cycles and Forecasting since the 1960s", Fisher Center for Real Estate and Urban Economics, UC Berkeley, Mar. 19, 2010.
Radinsky et al., "Predicting the News of Tomorrow Using Patterns in Web Search Queries", Proceedings of the 2008 IEEE/WIC/ACM International Conference on Web Intelligence, 2008.
Brownstein et al., "Digital Disease Detection—Harnessing the Web for Public Health Surveillance," The New England Uournal of Medicine; May 21, 2009.

Cooper et al., "Cancer Internet Search Activity on a Major Search Engine, United States 2001-2004," J Med Internal Res, 7, 2005.
Corely et al., "Monitoring Influenza Trends Through Mining Social Media," Proceedings of the 2009 International Conference on Bioinformatics and Computational Biology (BIOCOMP09), 2009.
Hulth et al., "Web Queries as a Source of Syndromic Surveillance," Department of Epidemiology, Swedish Institute of Infectious Disease Control, PLoS One, 5, 2009.
Wilson et al., "Early Detection of Disease Outbreaks Using the Internet," CMAJ, Mar. 12, 2009.
Clements et al., "Report of a Scoping Study of Forecasting in the National Accounts at the Office for National Statistics," Statistics Commission, Mar. 5, 2003.
Guzman, Giselle, "Internet Search Behavior as an Economic Forecasting Tool: The Case of Inflation Expectations," Nov. 29, 2011.
Mouchart, Michel, et al.; "Clustered Panel Data Models: An Efficient Approach for Nowcasting from Poor Data" Dec. 4, 2003; 30 pages.
Cors, Andreas et al.; "An Approach for Timely Estimations of the German GDP (Abstract)"; AStA Advances in Statistical Analysis, vol. 87, No. 2, 2003; 2 pages.
Baffigi, Alberto et al.; "Bridge Models to Forecast the Euro Area GDP (Abstract)"; International Journal of Foecasting, vol. 20, Issue 3, Jul.-Sep. 2004; 3 pages.
Mouchart, Michel, et al.; "Clustered Panel Data Models: An Efficient Approach for Nowcasting from Poor Data" International Journal of Forecasting 21 (2005) 577-594; 2005; 18 pages.
Nunes, Luis C.; "Nowcasting Quarterly GDP Growth in a Monthly Coincident Indicator Model (Abstract)"; Journal of Forecasting, vol. 24, Issue 8; Dec. 20, 2005; 4 pages.
Altissimo, Filippo et al.; "New Eurocoin: Tracking Economic Growth in Real Time"; Centre for Economic Policy Reseach Discussion Paper Series, Discussion Paper No. 5633, Apr. 2006; 37 pages.
Banbura, Marta et al.; "A Look Into the Factor Model Black Box: Publication Lags and the Role of Hard and Soft Data in Forecasting GDP"; Nov. 2006; 26 pages.
Marcellino, Massimiliano et al.; "Factor-MIDAS for Now- and Forcasting with Ragged-Edge Data: A Model Comparision for German GDP"; Bank of England CCBS Research Forum, 2007; 41 pages.
Monti, Francesca; "Forecast with Judgement and Models"; National Bank of Belgium, Working Paper Research, No. 153, Dec. 2008; 44 pages.
Matheson, Troy et al.; "Nowcasting and Predicting Data Revisions in Real Time Using Qualitative Panel Survey Data"; Reserve Bank of New Zealand, DP2007/02, Jan. 2007; 25 pages.
Gelper, Sarah et al.; "The Predictive Power of the European Economic Sentiment Indicator"; Katholieke Universiteit Leuven, Department of Decision Sciences and Information Management, Jan. 22, 2007; 15 pages.
Galbraith, John W. et al.; "Electronic Transactions as High-Frequency Indicators of Economic Activity"; Bank of Canada, Working Paper 2007-58, Dec. 2007; 29 pages.
Clements, Michael P. et al.; "Macroeconomic Forecasting with Mixed-Frequency Data: Forecasting Output Growth in the United States"; Journal of Nusiness and Economic Statistics, Oct. 2008, 10 pages.
Darne, Olivier; "Using Business Survey in Industrial and Services Sector to Nowcast GDP Growth: The French Case"; Economic Bulletin, Jul. 2008; 10 pages.
Kholodilin, Konstantin A., et al.; "A New Business Barometer for Germany: Construction and Evaluation of the Nowcast Accuracy"; Nov. 18, 2008; 11 pages.
D'Agostino, Antonello, et al.; "Now-Casting Irish GDP"; Central Bank & Financial Servies Authroity of Ireland, Research Technical Paper, 9/RT/08, Nov. 2008; 25 pages.
Proietti, Tommaso; "Estimation fo Common Factors under Cross-Sectional and Temporal Aggregation Constraints: Nowcasting Monthly GDP and its Main Components (Abstract)"; MPRA Paper, University Library of Munich, Germany, New Economic Papers, Jan. 22, 2008; 1 page.

(56) References Cited

OTHER PUBLICATIONS

Aastveit, Knut Are, et al.; "Estimating the Output Gap in Real-Time: A Factor Model Approach"; Dec. 9, 2008; 40 pages.
Lee, Kevin, et al.; "Nowcasting, Business Cycle Dating and the Interpreation of the New Information when Real Time Data are Available"; The University of Melbourne, Department of Economics, Research Paper No. 1040, May 2008; 45 pages.
Kuzin, Vladimir, et al.; "Pooling Versus Model Selection for Nowcasting with Many Predictors: An Application to German GDP"; Deutsche Bundesbank Eurosystem, Discussion Paper, Series 1: Economic Studies, No. Mar. 2009, 2009; 55 pages.
Castle, Jennifer, et al.; "Nowcasting is Not Just Contemporaneous Forecasting"; National Institute Economic Review, 2009; 26 pages.
Schorfheide, Frank et al.; "Evaluating DSGE Model Forecasts of Comovements"; University of Pennsylvania, Oct. 17, 2010; 57 pages.
Aruoba, A. Boragan, et al.; "Real-Time Macroeconomic Monitoring: Real Activity, Inflation, and Interactions" National Bureau of Economic Research, Working Paper 15657, Jan. 2010; 17 pages.
Kholodilin, Konstantin A., et al.; "Do Google Searches Help in Nowcasting Private Consumption? A Real-Time Evidence for the US"; ETH Zurich, Research Collection, Working Paper, Apr. 2010; 29 pages.
Gilbert, Thomas, et al.; "Why Do Certain Macroeconomic News Announcements Have a Big Impact on Asset Prices?"; Apr. 6, 2010; 38 pages.
Rossiter, James; "Nowcasting the Global Economy"; Bank of Canada Discussion Paper 2010-12, Sep. 2010; 26 pages.
Norin, Anna; "Nowcasting of the Gross Regional Product"; 50th Congress of the European Regional Science Association: Sustainable Regional Growth and Development in the Creative Knowledge Economy, Aug. 19-23, 2010; 11 pages.
Liebermann, Joelle; "Real-Time Nowcasting of GDP: Factor Model Versus Professional Forecasters"; Munich Personal RePEc Archive, Dec. 2010; 36 pages.
Faust, Jon et al.; "Credit Spreads as Predictors of Real-Time Economic Activity: A Bayesian Model-Averaging Approach"; National Bureau of Economic Research, Working Paper 16725, Jan. 2011; 41 pages.
Askitas, Nikolaos et al.; "Nowcasting Business Cycles Using Toll Data"; IZA Discussion Paper No. 5522, Feb. 2011; 19 pages.
Lahiri, Kajal et al.; "Nowcasting US GDP: The Role of ISM Business Surveys"; SUNY Department of Economics, Mar. 2011; 30 pages.
Sorensen, Jonas; "Indicator Models for Private Consumption"; Monetary Review, 1st Quarter 2011, Part 1; 13 pages.
Garratt, Anthony et al.; "Measuring Output Gap Nowcast Uncertainty"; The Australian National University, Centre for Applied Macroeconomic Analysis (CAMA), CAMA Working Paper 16/2011, Jun. 2011; 24 pages.
Banbura, Marta et al., "Nowcasting," Working Papers ECARES 2010-021, Oxford Handbook on Economic Forecasting (2010), 36 pages.
Branch, William A.; "Nowcasting and the Taylor Rule"; University of California, Irvine, Jul. 11, 2011; 32 pages.
Carnot, Vincent et al.; "Economic Forecasting and Policy"; Second Edition, Chapter 2, Jul. 26, 2011; 8 pages.
Guzman, Giselle C.; "Using Sentiment to Predict GDP Growth and Stock Returns"; Preliminary Draft, Munich Personal RePEc Archive, Jun. 29, 2008,41 pages.
Guzman, Giselle C.; "An Inflation Expectations Horserace"; Preliminary Draft, Munich Personal RePEc Archive, Jan. 25, 2010; 44 pages.
Guzman, Giselle C.; "The Case for Higher Frequency Inflation Expectations"; Preliminary Draft, Munich Personal RePEc Archive, Jun. 29, 2011; 44 pages.
Guzman, Giselle C.; "Internet Search Behavior as an Economic Forecasting Tool: The Case of Inflation Expectations"; Preliminary Draft, Munich Personal RePEc Archive, Nov. 29, 2011; 38 pages.
Vosen, Simeon et al.; "A Monthly Consumption Indicator for Germany Based on Internet Search Query Data" Applied Economic Letters, vol. 19, Iss. 7, 2012; 27 pages.
Wieland, Volker et al.; "Macroeconomic Model Comparisons and Forecast Competitions"; Voxeu.org, Feb. 13, 2012; 4 pages.
Matteson, David S.; "Time-Frequency Functional Models: An Approach for Identifying and Predicting Economic Recessions in Real-Time"; Cornell University, Department of Statistical Science, May 17, 2014; 42 pages.
Molodtsova, Tanya et al.; "Taylor Rule Exchange Rate Forecasting During the Financial Crisis"; National Bureau of Economic Research, Working Paper 18330, Aug. 2012; 41 pages.
Scotti, Chiara et al.; "Real-Time Aggregation of Macroeconomic Surprises: A Real Activity Surprise Index"; Federal Reserve Board, Apr. 26, 2012; 24 pages.
Campbell, Jeffrey R. et al.; "Macroeconomic Effects of Federal Reserve Forward Guidance"; Working Paper 2012-03, Federal Reserve Bank of Chicago, 2012; 61 pages.
D'Agostino, Antonello et al.; "Survey-Based Nowcasting of US Growth: A Real-Time Forecast Comparison Over More Than 40 Years"; European Central Bank, Working Paper No. 1455, 2012; 23 pages.
Kuzin, Vladimir, et al.; "Pooling Versus Model Selection for Nowcasting GDP with Many Predictors: Empirical Evidence for Six Industrialized Countries"; Deutsche Bundesbank, 2013; 65 pages.
Hendry, David et al.; "Forecasting and Nowcasting Macroeconomic Variables: A Methodological Overview" University of Oxford, Department of Economics, Discussion Paper No. 674, Sep. 2013; 74 pages.
Koop, Gary et al.; "Macroeconomic Nowcasting Using Google Probabilities"; Aug. 2013; 31 pages.
Amihud, Yakov; "Illiquidity and Stock Returns: Cross-Section and Time-Series Effects"; Journal of Financial Markets 5 (2002) pp. 31-56.
Moghtaderi et al., "Trend filtering via empirical mode decompositions," Computational Statistics & Data Analysis 58 (2013): 114-126, (Year: 2013), 13 pages.
Cristelli et al., "The heterogeneous dynamics of economic complexity, " PLoS One. Feb. 11, 2015;10(2):e0117174. doi: 10.1371/journal.pone.0117174, PMID: 2567131, (Year: 2015), 15 pages.
Muranga et al., "Measurement of liquidity risk in the context of market risk calulation," a BIS volume entitled The Measurement of Aggregate Risk (1997), https://citeseerx.ist/psu/edu/viewdoc/download?doi=10.1.1.452.4012&rep=rep1&type=pdf, 1997, 22 pages.

* cited by examiner

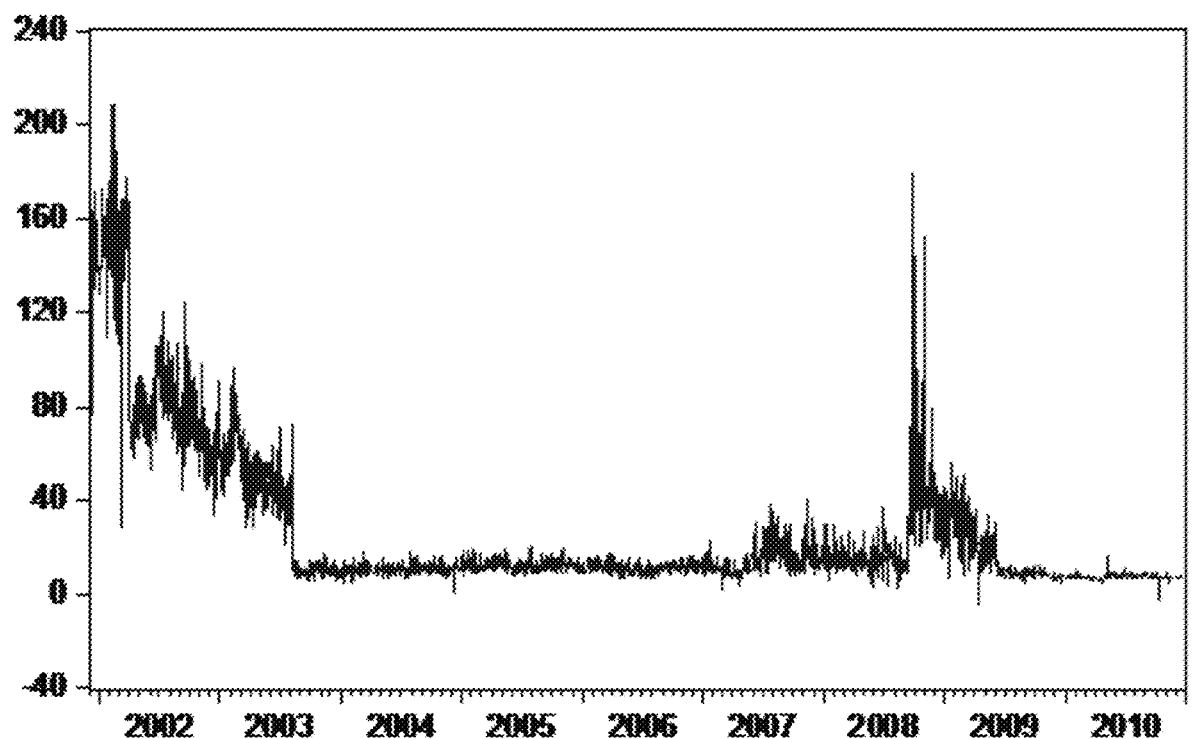
Fig. 5 - Sentiment Risk Index Over Time

Sentiment Regarding A Particular Stock
Fig. 6 - Sentiment Regarding Apple Stock Over Time on "Seeking Alpha" Website
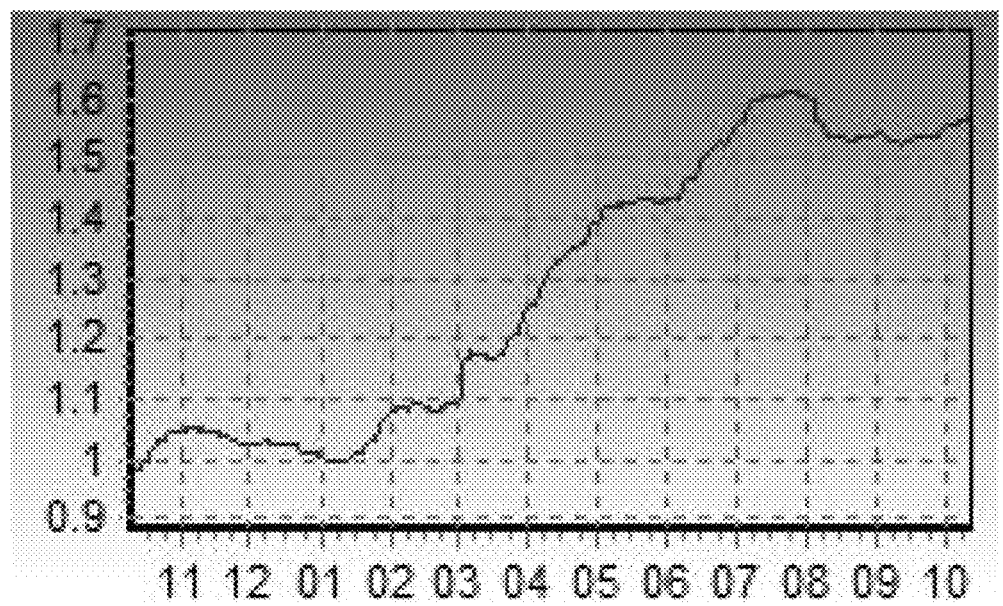

METHODS AND SYSTEMS TO QUANTIFY AND INDEX SENTIMENT RISK IN FINANCIAL MARKETS AND RISK MANAGEMENT CONTRACTS THEREON

CROSS-REFERENCE TO RELATED APPLICATIONS

This application claims the benefit of U.S. Provisional Patent Application No. 61/629,227, filed Nov. 14, 2011, which is hereby incorporated by reference herein in its entirety.

This application is also related to U.S. patent application Ser. No. 13/677,273, entitled "METHODS AND SYSTEMS TO CREATE SYNTHETIC VARIABLES, INDICATORS AND INDICES FROM MULTIPLE DATA AND META-DATA SOURCES AND RISK MANAGEMENT CONTRACTS THEREON,", U.S. patent application Ser. No. 13/677,276, entitled "METHODS AND SYSTEMS TO EXTRACT SIGNALS FROM LARGE AND IMPERFECT DATA SETS," and U.S. patent application Ser. No. 13/677,277, entitled "METHODS AND SYSTEMS TO QUANTIFY AND INDEX LIQUIDITY RISK IN FINANCIAL MARKETS AND RISK MANAGEMENT CONTRACTS THEREON," all of which were filed on Nov. 14, 2012 and incorporated by reference herein in their entireties.

TECHNICAL FIELD

The present invention relates to risk management in financial markets, and in particular to systems and methods for quantifying and indexing risks such that these indices can serve as underlying assets for futures and options and other financial instruments that investors would use to hedge against the risks.

BACKGROUND OF THE INVENTION

Markets are incomplete, in that, it is not possible to hedge against all potential risks. Recent financial crises have highlighted the need for more effective risk management. Portfolio managers are increasingly faced with the need to better understand and efficiently manage multiple sources of risk that can affect the value of their holdings. This can be particularly challenging for holders of multiple asset classes across multiple geographies. Some customized hedging solutions are available to professional money managers, such as, for example the use of swaps. But these over-the-counter instruments are unregulated, expensive, illiquid, and carry significant counter-party risk. The over-the-counter swaps market operates in the shadows of the financial markets, with an estimated size of $650 billion. (See, e.g., http://www.huffingtonpost.com/2012107/08/us-derivatives-reform-rules_n_1656980.html, which is hereby incorporated by reference herein in its entirety.) Indeed, the lack of transparency in the swaps market is largely blamed in the collapse of financial firms such as Lehman Brothers and insurer American International Group during the financial crisis of 2007-2009, which led to billions of dollars in government bailouts, a burden ultimately shouldered by taxpayers.

The specter of regulation looms over the derivatives market. The 2010 Dodd Frank financial reform law is meant to increase transparency in order to mitigate systemic risk, but compliance with such regulation will be expensive, and many small traders will be likely shut out of the market. Additionally, customized and complex hedging solutions through the use of swaps and other derivatives have long been out of reach for individual investors, and costly regulation will further prohibit individual investors from being able to hedge their portfolios from serious risks that can devastate the value of their portfolios. Recent decades have brought technological advances that democratized equity trading for individual investors by making online trading accessible and affordable, but effective risk management remains out of reach.

Risk management must be simplified and democratized in order to build and preserve wealth, both for institutions as well as for individuals. Risk metrics and risk management contracts must be accessible, affordable, and transparent. Improved risk management techniques will assist in mitigating the boom-bubble-bust cycles that have roiled financial markets in recent decades.

One example of improvement in risk management techniques was the introduction of the Chicago Board Options Exchange Market Volatility Index, also known by its ticker symbol, "VIX". The VIX is a popular measure of the implied volatility of S&P 500 index options. It is often referred to as the fear index or the fear gauge, because it represents one measure of the market's expectation of stock market volatility over the subsequent 30-day period. The concept of a volatility index, and financial instruments based on such an index, was first proposed by Menachem Brenner and Dan Galai in 1986, and was published in "New Financial Instruments for Hedging Changes in Volatility," appearing in the July/August 1989 issue of Financial Analysts Journal. (See, e.g., http://people.stem.nyu.edu/mbrenner/research/FAJ_articleon_Volatility_Der.pdf, which is hereby incorporated by reference herein in its entirety.)

While stock index options and futures give investors the ability to hedge against market and interest rate volatility, the VIX allows investors to hedge against the risk of changes in volatility. Changes in market volatility can be brought about by macroeconomic factors such as inflation or economic policy, or by firm-specific factors such as changes in capital structure or news about performance. The ability to hedge against changes in volatility has helped to complete the market by providing insurance against a very real and potentially devastating portfolio risk.

But markets remain significantly incomplete. Investors today are faced with a multitude of serious risks that remain uninsurable. These risks are frequently discussed by market practitioners and in the financial media, but they are discussed as broad concepts, often in nebulous terms. As of yet, there has not been a concerted effort to quantify and index many of these risks so that efficient and accessible hedging methods can be introduced.

There are three risks that are of particular and vital importance to investors participating in modern financial markets: 1) correlation risk; 2) liquidity risk; and 3) sentiment risk. We propose systems and methods to quantify and index these risks, and risk management contracts in order to insure against these risks. These indices would serve as underlying assets for futures and options and other financial instruments that investors would use to hedge against the risk of changes in correlation, liquidity, and sentiment in financial markets.

BRIEF DESCRIPTION OF THE DRAWINGS

FIG. 5 is a schematic diagram that illustrates an example of a sentiment risk index over time in accordance with some embodiments of the present invention; and FIG. 6 depicts an exemplary graphical display of sentiment risk for a particular asset (e.g., a particular stock) in accordance with some embodiments of the present invention.

SUMMARY

Figure 1:
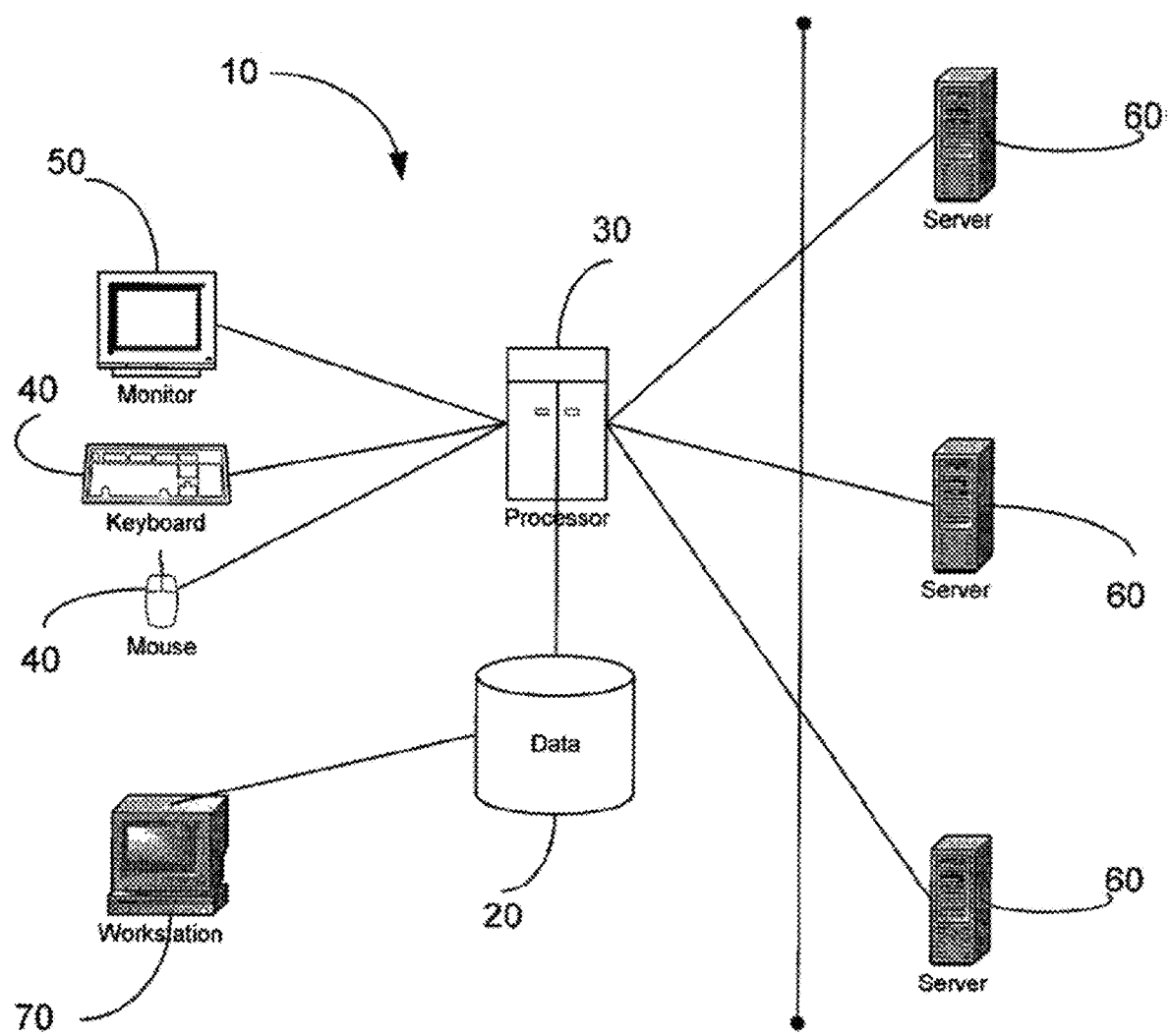
FIG. 1 illustrates an example network environment in which various exemplary embodiments of the present invention can operate.

Systems and methods for creating an index to track sentiment risk in the economy (for example measured by expectations for GDP growth), financial markets (for example measured by expectations for stock market returns on a benchmark financial index) or for individual securities or for a collection of securities, by combining multiple data sources including surveys, opinion polls, prediction markets, news, internet content, activity, and search query data, and extracting a common signal from multiple data sources. An index can be created by aggregating measures of expectations for economic (GDP) growth to track sentiment risk for the economy. An index can be created by aggregating sentiment measures across securities which are the components of a benchmark financial market index to track sentiment risk for the securities comprising that index (for example, the S&P500 or the Dow Jones Industrial Average). An index can be created by aggregating sentiment measures across securities which are the holdings in an individual portfolio. Financial instruments —options, futures, options on futures, ETFs, ETNs and other financial instruments can be created to track the sentiment index and the sentiment measure for each underlying component, providing a way to hedge sentiment risk.

In accordance with some embodiments, a method for providing a sentiment risk index is provided, the method comprising: combining sentiment data relating to a plurality of assets from a plurality of disparate data sources including surveys, opinion polls, prediction markets, news, social media data and Internet content, activity, and search query data; extracting a common signal associated with each of the plurality of sentiment measures from the combined data from the plurality of disparate data sources; determining a sentiment risk measurement for each of the plurality of assets based at least in part on the extracted common signal associated with each of the plurality of sentiment measures; generating a sentiment risk index for the plurality of assets that aggregates the sentiment risk measurement for each of the plurality of assets, wherein a weight is applied to the sentiment risk measurement for each of the plurality of assets; and providing the sentiment risk index. It is understood that such weights can range in value between −1 and 1, and collectively sum to a fixed number.

In accordance with some embodiments, a system for providing a sentiment risk index is provided, the system comprising a hardware processor that is configured to: combine sentiment data relating to a plurality of assets from a plurality of disparate data sources including surveys, opinion polls, prediction markets, news, social media data and Internet content, activity, and search query data; extract a common signal associated with each of the plurality of sentiment measures from the combined data from the plurality of disparate data sources; determine a sentiment risk measurement for each of the plurality of assets based at least in part on the extracted common signal associated with each of the plurality of sentiment measures; generate a sentiment risk index for the plurality of assets that aggregates the sentiment risk measurement for each of the plurality of assets, wherein a weight is applied to the sentiment risk measurement for each of the plurality of assets; and provide the sentiment risk index. It is understood that such weights can range in value between −1 and 1, and collectively sum to a fixed number.

In accordance with some embodiments, a non-transitory computer-readable medium containing computer-executable instructions that, when executed by a processor, cause the processor to perform a method for providing a risk index, is provided. The method comprises: combining sentiment data relating to a plurality of assets from a plurality of disparate data sources including surveys, opinion polls, prediction markets, news, social media data and Internet content, activity, and search query data; extracting a common signal associated with each of the plurality of sentiment measures from the combined data from the plurality of disparate data sources; determining a sentiment risk measurement for each of the plurality of assets based at least in part on the extracted common signal associated with each of the plurality of sentiment measures; generating a sentiment risk index for the plurality of assets that aggregates the sentiment risk measurement for each of the plurality of assets, wherein a weight is applied to the sentiment risk measurement for each of the plurality of assets; and providing the sentiment risk index. It is understood that such weights can range in value between −1 and 1, and collectively sum to a fixed number.

In some embodiments, the method includes sentiment risk alerts, displays, graphs, GUIs, comparisons, trends over time, increasing, decreasing, price impact, predictive power, parameter estimates, forecasts, and/or a scrolling ticker.

In some embodiments, the sentiment risk index is provided for economy (e.g., GDP growth, unemployment, etc.) and financial markets (e.g., stock market returns) as a whole, where survey results are combined with an internet sentiment measure/web activity factor mined from internet content, activity, and search query data, such composite index with weights determined arbitrarily or by optimization or signal extraction methods. It is understood that such weights can range in value between −1 and 1, and collectively sum to a fixed number.

In some embodiments, the sentiment risk measures are provided for individual securities or a collection of securities in a portfolio—simple or composite, with weights determined arbitrarily or by optimization or signal extraction methods. It is understood that such weights can range in value between −1 and 1, and collectively sum to a fixed number. The embodiment can comprise: (i) a scenario analysis module determining the portfolio impact of changes in sentiment risk concerning the economy in general (e.g., sentiment or expectations for future GDP growth), financial markets (e.g., sentiment or expectations for future returns on a benchmark stock market index), or security specific (e.g., securities comprising portfolio holdings); (ii) scenario analysis module determining the security-specific impact for changes in sentiment risk concerning the economy in general (e.g., sentiment or expectations for future GDP growth), financial markets (e.g., sentiment or expectations for future returns on a benchmark stock market index), or security specific sentiment measures (e.g., sentiment for the security of interest, or changes in sentiment for related securities, such as competitors or companies engaged in related businesses), or industry specific sentiment; (iii) a portfolio analysis module determining the impact on a portfolio's overall level of sentiment risk given additions or deletions in holdings; (iv) a securities screening and selection module for determining candidate securities to buy or sell based on their sentiment risk profile; (v) a customized sentiment risk index for the holdings in a given portfolio; (vi) a trade recommendation engine for trading strategies based on sentiment risk; and (vii) real-time alerts (visual, textual, graphical, or auditory) and a scrolling ticker of sentiment risk for the economy, financial markets, benchmark financial indices, asset classes, collections of assets or securities, a portfolio (whereby portfolio weights are applied to each security proportional to its percentage or dollar weighting in the portfolio), or a specific security.

In some embodiments, the sentiment risk index can be complementary to well-known benchmark financial market indexes (for stocks, Dow, S&P500, or corporate bonds, or other indexes for other securities) whereby each security has a sentiment metric and then all the securities are aggregated according to the well-known index's weighting methodology.

In some embodiments, derivatives (options, futures, options on futures) or ETFs or ETNs or other financial instruments provide a way to hedge sentiment risk.

In some embodiments, the method determines an index of stocks with highest social media, news, internet, web activity sentiment—for example tracking the stock market performance of top 10 or 20 or 100 companies with most "Facebook likes" or Twitter followers or Pinterest postings; or alternatively tracking the "Facebook likes" or Twitter followers or Pinterest postings or other social media mentions for the stocks in a benchmark index such as the S&P500 or the NASDAQ Composite.

In some embodiments, the sentiment risk index can be provided for the stocks, corporate bonds or other assets held in a particular investor's portfolio, whereby user inputs holdings data or system connects to online brokerage account to give real time measure of sentiment risk for a portfolio and make a trade or allocation recommendation.

In some embodiments, electronically processing includes extracting a signal from multiple surveys, prediction markets, news, social media data, metadata and Internet content, activity, and search query data sources.

In some embodiments, the sentiment metric is used by said user to predict a future economic data release or asset returns such as stock market returns.

In some embodiments, the method further comprises generating an indicator based at least on the determined one or more related social media data and/or Internet activity metrics.

In some embodiments, the method further comprises determining sentiment using one or more related survey, opinion poll, prediction market, news, social media data and/or Internet activity metrics, each said metric being associated with a different economic or financial condition, quantity or state or asset price; receiving (i) data associated with actual outcomes of the predicted economic or financial condition, quantity or state or asset price, and (ii) historical data regarding past outcomes of such conditions, quantities or states or asset price; and determining one or more mathematical, statistical, and/or econometric relationships between the indicator and the actual outcomes as given by historical time series data and generating a forecast or recommendation.

In some embodiments, the method further comprises: determining sentiment from one or more related surveys, opinion polls, prediction markets, social media data, metadata and/or Internet activity metrics, each said metric being associated with a different related economic or financial condition, quantity or state; receiving data regarding each of said economic or financial conditions, quantities or states; extracting a signal of common elements from the data; and calculating an indicator based at least on (a) said one or more metrics, and (b) the received data regarding said related economic or financial conditions, quantities or states.

In some embodiments, the method further comprises assigning weights to each of said metrics, wherein such weights mathematically sum to a fixed number, and wherein such weights are generated by one of (i) arbitrarily, (ii) determined by applying some rule to said one or more related metrics, or (iii) utilizing a signal extraction algorithm to automatically determine mathematically optimal weights associated with said metrics when processing and combining multiple surveys, social media data, metadata and Internet data sources to produce said metrics.

In some embodiments, the metric is based at least on the frequency of keyword mentions or sentiment of conversations generated by social media platform users related to or associated with said current or future economic or financial conditions, quantities or states or asset prices, and said metric is based at least on the popularity of particular search terms or keywords used in internet search queries performed on a search engine, related to or associated with said economic activity or condition or company or stock.

In some embodiments, the determining is restricted to a defined time interval, and said frequency and said popularity are measured relative to said defined time interval.

In some embodiments, determining a metric is relative to a given demographic group or gender, and further comprises determining said metric based at least on (i) the frequency of key word mentions or the sentiment of conversations generated by social media platform users related to or associated with current or future economic or financial conditions, quantities or states or asset prices, and (ii) the popularity of particular search terms or keywords related to or associated with the current or future economic or financial conditions, quantities or states or asset prices.

In some embodiments, the method is applied to selecting a set of related social media data/Internet activity metrics, further comprising: determining the correlation or covariance between a group of related social media data/Internet activity metrics; combining the related metrics on the basis of said correlation or covariance; and assigning weights to each of the metrics, wherein said weights are assigned by one of (i) applying a signal extraction algorithm to optimally determine the weights, and (ii) arbitrarily, and wherein such weights range in value from −1 to 1 and collectively sum to a fixed number.

In some embodiments, the fixed number is 1.

In some embodiments, the particular survey result or opinion poll or prediction market has an associated future official data release, from at least one of a governmental or private statistical agency or company, and the indicator measures in real time a future quantity which is subject to a data reporting lag, and further comprising: creating a financial instrument based upon the indicator, providing a method to track said survey or opinion poll result in real time; and providing a method to bet on increasing or decreasing values of said indicator so as to hedge sentiment risk.

In some embodiments, the particular company has associated financial revenues, and the metric measures in real time a quantity which is subject to a data reporting lag, and further comprising: creating a financial instrument based upon the metric; providing a method to track in real time the sentiment about whether said financial revenues will meet expectations; and providing a method to bet on increasing or decreasing values of the same and hedge earnings sentiment risk.

In some embodiments, a method is provided that comprises: harvesting and aggregating at least one of (i) unstructured qualitative online social conversations relevant to current or future economic or financial conditions, quantities or states, or asset prices from one or more online social media sources and (ii) Internet search queries; quantifying the aggregated online social media conversations using natural language processing (NLP) techniques or Internet search queries to obtain structured analytic measurements of the online social media conversations and Internet search queries, said analytic measurements including frequency of keyword searches or mentions, and measurements of sentiment expressed among online social media participants and Internet searchers concerning current or future economic or financial conditions, quantities or states, or asset prices; and providing information to users based on the analytic measurements of the online social media conversations or Internet search queries.

In some embodiments, the Internet search query information is obtained from Internet search query logs.

In some embodiments, the information is based on (i) real-time measurements of the sentiment expressed by the online social media participants concerning current or future economic or financial conditions, quantities, or states or asset prices and (ii) historical data representing quantitative measurements of sentiment concerning the subject matter of interest in the past.

In some embodiments, the unstructured qualitative online social media conversations include messages posted online, said messages including at least one of: Internet messages; Twitter posts, social media postings, online news, online dialog; blog posts and comments; and other online traffic.

In some embodiments, the method further comprises displaying the information to a user in a graphical user interface (GUI).

In some embodiments, the method further comprises: performing sentiment score processing on said structured analytical measurements; referring to current or future economic or financial conditions, quantities or states, financial markets, or asset prices to determine a sentiment rating for each of the online social media conversations or Internet search queries; and determining a sentiment score for each of the online social media conversations or Internet search queries.

In some embodiments, the determining the sentiment score includes at least one of: identifying terms or phrases of interest associated with current or future economic or financial conditions, quantities or states, or asset prices in each of the online social media conversations or Internet search queries; searching a thesaurus to find a set of closest words from the terms or phrases of interest to serve as keywords expressing sentiment about current or future economic or financial conditions, quantities or states, or asset prices; assigning a probability value to each of the keywords, the probability value indicating the probability that the keyword suggests something positive or negative about the subject matter of interest; and assigning each occurrence of the terms or phrases with a sentiment score based on the set of keywords in each social media conversation or Internet search query to obtain a sentiment rating concerning current or future economic or financial conditions, quantites or states, or asset prices.

In some embodiments, the sentiment score is based on one or more of: (i) the fraction of positive or negative words to total words, (ii) how many times each occurrence of the terms or phrases of interest appears in a social media conversation or Internet search query log, (iii) number of keywords expressing sentiment about the terms or phrases of interest in the set of keywords, (iv) whether each keyword reflects a positive, negative, or neutral sentiment about the subject matter of interest, and (v) relevance of the keywords expressing sentiment about the terms or phrases of interest.

In some embodiments, the relevance of the keywords is determined by taking into account one or more of: (i) linguistic modifiers of the keywords expressing sentiment about the terms or phrases of interest including one or more of negations, comparatives, and enumerations, or emoticons, and (ii) proximity of the keywords to the terms or phrases of interest in the online social media conversation or Internet search query log.

In some embodiments, the method further comprises: calculating how the sentiment score trends over time; calculating how the sentiment score varies by online source or group of sources; and calculating how the sentiment score concurrently trends over time and varies by online source or group of sources, in order to determine if trends are similar or different among different populations of users or different data sources.

In some embodiments, the method further comprises determining an overall volume of online social media conversations or Internet search queries referring to the current or future economic or financial conditions, quantities, or states, or asset prices by adding up a number of occurrences of keywords or metadata tags concerning the current or future economic or financial conditions, quantities or states, or asset prices in online social media conversations, metadata tags or Internet search query logs per unit of time.

In some embodiments, the method further comprises determining how said overall volume of online social media conversations, metadata tags or Internet search queries trends over time.

In some embodiments, the method further comprises determining a share of online voice concerning current or future economic or financial conditions, quantities or states, or asset prices relative to other subject matter contained in said online social media, metadata tags or Internet search query logs.

In some embodiments, the method further comprises calculating one or more of: how the share of online voice acquired by information concerning sentiment about current or future economic or financial conditions, quantities, or states, or asset prices trends over time, and how the share of online voice acquired by information concerning current or future economic or financial conditions, quantities or states, or asset prices trends over time with respect to other subject matter in the same category.

In some embodiments, the method further comprises generating real-time alerts regarding sentiment about economic or financial conditions, quantities or states, or asset prices or when the frequency of mentions on (i) social media conversations, (ii) metadata tags, or (iii) within the volume of Internet search queries, surpasses a defined threshold level.

In some embodiments, the defined threshold level is 5% greater than the average daily mentions of keywords of interest, or some other quantity.

In some embodiments, the real-time alerts are based on user-configurable conditions or parameters including one or more of: abnormally positive online social media conversations, metadata tags, or Internet search queries about the subject matter of interest; abnormally negative online social media conversations, metadata tags, or Internet search queries about the subject matter of interest; changes in the sentiment expressed among social media participants above or below a pre-selected threshold; abnormally high volume of online social media posts, metadata tags, or the volume of Internet search query logs concerning the subject matter of interest; abnormally low volume of online social media posts, metadata tags, or the volume of Internet search query logs concerning the subject matter of interest; social media posts to certain websites; social media posts containing certain keywords or metadata tags; and volume of Internet search queries.

In some embodiments, harvesting includes using a conversation monitoring module to collect web content to generate a real-time database of social media and web conversations related to current or future economic or financial conditions, quantities or states, or asset prices.

In some embodiments, conversation monitoring module utilizes a web crawler.

In some embodiments, a system for analyzing social media postings on the Internet, the system comprising: a conversation monitoring module, said module having an associated web crawler, wherein, in operation, said module generates a conversation index of social media data related to current or future economic or financial conditions, quantities or states, or asset prices.

In some embodiments, the current or future economic or financial conditions, quantities or states, or asset prices include earnings surprises, company earnings and stock prices.

In some embodiments, the method further comprises using a social media analysis module to generate a sentiment or tone factor that measures at least one of positive words, negative words, and a ratio of negative to positive words or total words used in a conversation.

In some embodiments, the social media includes blogs, wikis, online communities, and other social interaction platforms.

In some embodiments, the method further comprises using a social media analysis module that implements a scoring algorithm to determine which media source has the best track record in terms of predicting current or future economic or financial conditions, quantities or states, or asset prices or company earnings.

In some embodiments, a method is provided, the method comprising: displaying in a graphical user interface one or more visualizations of analytic measurements of online social media conversations, metadata tagging, and Internet search activity data relevant to current or future economic or financial conditions, quantities, or states, or asset prices or company earnings, including displaying analytic measurements of sentiment expressed among online social media participants concerning said current or future economic or financial conditions, quantities or states, or asset prices, or company earnings; and quantifying aggregated social media or Internet data to obtain analytical measurements of the online social media conversations and Internet activity, wherein the analytic measurements of online social media conversations are generated by harvesting and aggregating unstructured qualitative online social media conversations, metadata tagging, and Internet search activity data relevant to current or future economic or financial conditions, quantities or states, or asset prices or company earnings, from one or more online social media sources or Internet search engines or social media data aggregators.

In some embodiments, the method further comprises displaying one or more of: how sentiment or tone expressed by online social media conversations, metadata tags, and Internet search activity concerning current or future economic or financial conditions, quantities or states, or asset prices or company earnings: (i) trends over time, (ii) varies by source or group of sources, and (iii) concurrently trends over time and varies by source.

In some embodiments, the method further comprises displaying sentiment among online social media conversation, metadata tags, and Internet search activity concerning current or future economic or financial conditions, quantities or states, asset prices or company earnings, in comparison to sentiment concerning another topic in terms of current or future economic or financial conditions, quantities or states, or asset prices, or company earnings.

In some embodiments, the method further comprises displaying sentiment among online social media conversation, metadata tags, and Internet search activity concerning current or future economic or financial conditions, quantities or states, or asset prices, or company earnings, in comparison to the consensus view of current or future economic or financial conditions, quantities, or states, or asset prices, or company earnings, or for a particular company's earnings vs. consensus earnings from professional stock analysts.

In some embodiments, the method further comprises displaying how sentiment concerning any user-configurable measure of current or future economic or financial conditions, quantities or states, or asset prices or company earnings, based on quantity measured, geography, demography etc. trends over a user-configurable time period.

In some embodiments, the method further comprises a graphical user interface that allows a user to configure parameters, such as a wizard which prompts the user to set parameters by which the system calculates, delivers, and displays a sentiment metric for such a user-configurable measure.

In some embodiments, the method further comprises displaying an overall frequency of occurrence or volume of social media conversations, metadata tags, or Internet search queries concerning current or future economic or financial conditions, quantities or states, asset prices or company earnings, per unit of time.

In some embodiments, the method further comprises displaying an overall frequency of occurrence or volume of social media conversations, metadata tags, or Internet search queries concerning current or future economic or financial conditions, quantities or states, or asset prices (or company earnings, etc.) per geographic region.

In some embodiments, the method further comprises displaying an overall frequency of occurrence or volume of social media conversations, metadata tags, or Internet search queries concerning current or future economic or financial conditions, quantities or states, or asset prices (or company earnings, etc.) per demographic group.

In some embodiments, the method further comprises calculating the moments of data series, wherein such calculations determine the statistical properties of the data, comprising one or more of the: (i) mean, (ii) median, (iii) mode, (iv) variance, (v) standard deviation, (vi) kurtosis, or (vii) skewness, and using these as elements of the metric.

In some embodiments, the method further comprises calculating the statistical relationships between data items, comprising one or more of (i) correlation, or (ii) covariance, and using these as elements of the metric.

In some embodiments, a method of creating an indicator of sentiment risk is provided, the method comprising: obtaining sentiment data from various sources such as surveys, opinion polls, prediction markets, blogs and social media data; sentiment measures can relate to general economic or financial conditions or prospects, or specific economic or financial conditions or prospects such as the direction of the stock market or the economy; calculate changes in sentiment measures by applying the natural logarithm (log difference) from period to period; forming a composite indicator of sentiment measures obtained from surveys, opinion polls, prediction markets, and social media data by applying weights to the various sentiment measures; wherein said weights are determined either arbitrarily or by using a signal extraction algorithm.

In some embodiments, a method of hedging sentiment risk is provided, comprising: issuing derivatives—options, futures, options on futures—or ETFs and other financial instruments to track the value of the composite sentiment risk index, and issuing derivatives—options, futures, options on futures—or ETFs and other financial instruments to track the value of each of the underlying sentiment measures such as survey or opinion poll results.

In some embodiments, as the price of each underlying derivative contract on sentiment changes, the price of the composite index changes in real time as the prices of the underlying sentiment measures change.

In some embodiments, the method further comprises providing derivative instruments on the outcomes of surveys and opinion polls and prediction markets wherein said instruments include at least one of futures, options, options on futures, and ETFs and other financial instruments.

In some embodiments, the method further comprises providing derivative instruments on at least one of the frequency of keyword mentions on social media data such as Twitter or Facebook, and the sentiment or public mood obtained from social media data, wherein said instruments include at least one of futures, options, options on futures, and ETFs and other financial instruments.

In some embodiments, the method further comprises providing derivative instruments on the frequency of keywords in search query data such as Google, Yahoo, and Bing, wherein said instruments include at least one of futures, options, options on futures, and ETFs and other financial instruments.

In some embodiments, the method further comprises providing derivative instruments are claimed on social media and news sentiment metrics, wherein said instruments include at least one of futures, options, options on futures, and ETFs and other financial instruments.

In some embodiments, a method of generating a sentiment indicator, the method comprising: obtaining Twitter, Facebook, LinkedIn, other social media data, blog posts and comments, or news data directly via an API feed or from an aggregator; calculating the ratio of negative words to total words related to a certain subject or extracting sentiment using natural language processing and other computational techniques; calculating the change in the ratio from period to period by applying the log difference to period t+1 versus time t, that is, by calculating $\ln(X_{t+1}/X_1)$; add to or multiply by a scalar to produce a sentiment score index; calculate the index for any frequency, including at least one of real-time, hourly, daily, weekly, and monthly.

DESCRIPTION OF THE INVENTION

In exemplary embodiments of the present invention, systems and methods for creating a sentiment risk index measuring market-wide sentiment regarding economic and financial conditions that can affect securities prices and returns in financial markets or an individual portfolio of assets are presented.

The present invention concerns sentiment risk, i.e., the risk that investor psychology and opinions and expectations for current and future economic conditions may change suddenly, or become overly pessimistic or optimistic. One of the most important risks affecting financial markets remains unquantified and uninsurable: the risk of changes in investor expectations, psychology, and human emotion, otherwise known as sentiment risk.

The American Heritage Dictionary defines "sentiment" as "a thought, view, or attitude, especially one based mainly on emotion instead of reason." By the same token, it defines something that is "not endowed with reason" to be "irrational." Hence, "sentiment" is largely regarded as "emotional" and "irrational." Classical asset pricing theory makes no provision for such an irrational component in determining asset prices, particularly in long-run equilibrium. Yet, it remains a favorite statistic for financial media and popular press and is the source of endless commentary by market pundits and economists alike. Indeed, the financial press often credits or blames "sentiment" for a rising or falling stock market. If markets do, in fact, react to reports of changes in sentiment, then this indicates that the reality of asset pricing contradicts the theory of asset pricing. This suggests an oversight on the part of the academic literature in failing to give sentiment the importance it may warrant in the theory of asset pricing.

Academics have only recently begun to examine what role, if any, sentiment may have in the theory of asset pricing. However, consensus is lacking regarding its most basic characteristics. The literature remains divided not only about whether or not sentiment matters for asset prices, but also about what sentiment actually is, and how best to measure and incorporate it in a theoretical framework. I focus here on the empirical aspects of sentiment, its measurement, and its predictive power for the real economy as well as for financial markets. Sentiment has no explicit role in traditional asset pricing models. The omission of sentiment from classical finance is rather curious, considering the key role played by emotion in the theories of Bentham (1781), one of the most influential early utilitarian philosophers. Bentham"s concept of utility " . . . meant that property in any object, whereby it tends to produce benefit, advantage, pleasure, good, or happiness . . . or . . . to prevent the happening of mischief, pain, evil, or unhappiness to the party whose interest is considered . . . " As Lowenstein (2000) notes, neoclassical economists later rendered the utility construct devoid of its emotional content in a process that " . . . culminated in the development of ordinal utility and the theory of revealed preference which construed utility as an index of preference rather than of happiness." Classical finance has evolved around the mathematical concepts of mean-variance optimization, rational maximization of preferences, equilibrium analysis, and no-arbitrage arguments, but it has largely neglected a key ingredient of financial markets: human emotion.

The pioneering work of Katona (1951, 1957, 1975) seeks to address the confluence of emotions and economics. His psychological approach to consumption prescribes that both capacity and willingness to buy are primary determinants of the consumption function. From this treatment one can infer that sentiment, i.e., something generally regarded as irrational, should be considered a bona fide component of expectations formation. Katona's theories build upon the notion of "animal spirits" put forth by Keynes (1936). Notable contributions to the theory of emotions in economics are made by Elster (1998), Lowenstein (2000), Thaler (2000), and Romer (2000). Romer succinctly echoes Katona"s theories by stating that " . . . economists can usefully segregate decision mechanisms into two broad categories: those based on thoughts and those based on feelings . . . ," and suggests that the profession should " . . . treat thoughts and feelings more symmetrically." (Excerpt from Guzman, Giselle. Using sentiment surveys to predict GDP growth and stock returns, in: The Making of National Economic Forecasts, L. R. Klein, ed., Edward Elgar Publishing Ltd., London, 2009, pp. 319-351, which is hereby incorporated by reference herein in its entirety.)

Surveys, public opinion polls, and prediction markets have long been considered a fairly reliable source of information regarding what people think and feel, whether the population surveyed is representative of the general public or a highly specialized group of individuals. Survey methods are often criticized, however, for containing statistical biases and a variety of methodological flaws. Moreover, they become stale very quickly, as they are published with substantial data reporting lags. Still, in the absence of a better way to discover the thoughts and feelings of a population, surveys can be extremely useful and accurate tools. Indeed, for all the criticisms of survey methods, many results of surveys of consumers, investors, and purchasing managers are eagerly anticipated news items on Wall Street and tend to be market-moving announcements, often cited as the cause of significant swings in the market. Yet, there is no direct way to speculate upon the results of a survey or hedge against and adverse survey outcome.

Technological advances in recent decades have not only brought about substantial improvements in survey methodology, but also in the accessibility and dissemination of information in general.

According to the Pew Internet & American Life Project's May 2010 survey, 79% of American adults use the internet, and of these, 87% use a search engine to find information. With the ubiquity of internet searches, websites, social media platforms, and blogs, we now have more data about ourselves, our opinions and our expectations than ever before in the history of humankind. Data about this data may contain important clues about human behavior that were unobservable just a decade or so ago. Internet search behavior can be interpreted as a measure of revealed expectations. Presumably, people search for information on topics they want to learn more about, or about things that are causing them concern.

Similarly, Twitter, social media, blogs, chatboards, and other online media contain the digital footprints of human behavior from which measures of expectations and sentiment can be gleaned. There is no doubt that the internet and social media are the vox populi of the modern era. These new channels of communication are the mirrors that reflect our collective social mood. People learn what others are thinking and express what they themselves are thinking by posting and promoting their thoughts and opinions on websites like Twitter, Facebook, and on blogs. People reveal what is on their minds by querying topics on search engines such as Google, Yahoo, and Bing. These activities together create a learning process and a continuous feedback loop, whereby people form, express, and reveal expectations in real-time. (Excerpt from Guzman, Giselle. Internet Search Behavior as an Economic Forecasting Tool: The Case of Inflation Expectations. The Journal of Economic and Social Measurement, Vol. 36, No. 3, December 2011, which is hereby incorporated by reference herein in its entirety.) Therefore, expectations, opinions, and sentiment can be mined from internet data in real-time.

One solution to this problem is to create an index of various sentiment measures that measures and tracks sentiment for the economy or financial markets at large, certain asset classes, or a collection of securities or assets. Such an index can be generalized to track the state of economy-wide or market-wide sentiment, or sentiment for stocks comprising a well-known index, such as the sentiment for stocks in the S&P500 or the Dow Jones Industrial Average index, for example. Similarly, such an index can be highly specialized and customized to track individual portfolio holdings, such as the sentiment regarding individual stocks or corporate events such as earnings announcements, ETFs, particular issues of bonds, commodities, options with particular strike prices or expiration dates, and so on.

The sentiment measures comprising the index can be based on surveys and opinion polls and prediction markets which ask respondents their opinions and expectations regarding economic and financial conditions. By combining several surveys and opinion polls and prediction markets, the statistical biases can be mitigated—they would, in effect, cancel each other out. These can be supplemented with an Internet Sentiment factor—a web activity factor that mines a measure of sentiment from social media, blog posts, news stories, chatboards, Twitter, etc. The internet sentiment/web activity factor can be mined using machine learning techniques and natural language processing, and a measure of public mood, or sentiment, can be extracted in realtime. By combining various indicators of sentiment, a composite index would be more accurate and timely than any one particular indicator.

An index can be constructed using a collection of sentiment measures whereby the composite measure is obtained by applying arbitrary weights or obtaining the weights through optimization or signal extraction methods such as Principal Components Analysis or another signal extraction method whereby the weights range in value between −1 and 1, inclusively, and collectively sum to a fixed number. The sentiment measures for different securities can then be aggregated and converted to an index using (i) a simple method, such as, for example, a weighted average whereby the weights can be arbitrarily assigned, or weighted by applying a pre-defined weighting scheme which mimics index weights of a well-known index such as the market-capitalization weights that are applied to the S&P 500, or by summing and applying a divisor such as the method used to calculate the Dow-Jones Industrial Average, or by (ii) mathematical formulae, transformations, statistical formulae, or some algorithmic method, or (iii) customized to measure the level of sentiment risk of a particular portfolio of individual holdings of various securities.

The term "data" as used herein includes survey data, opinion polls, prediction markets, an internet sentiment factor mined from a web activity, (i) the moments of the statistical distribution of the data, such as, for example, the mean, standard deviation, variance, standard deviation, kurtosis, and skewness; (ii) statistical measures of the data, such as the median and mode; (iii) transformations such as, for example, arithmetic or logarithmic; or (iv) properties of the data over time, such as, for example, a moving average. It is also understood that the term "data" further includes various statistical relationships amongst the various sources of data, such as, for example, correlations and covariances.

In exemplary embodiments of the present invention, once generated as described herein, such indicators can be used to identify and quantify sentiment risk in financial markets. In this case, the indicator becomes an index, whose value is calculated and changes in real time. Thus, financial instruments—i.e., risk management contracts in the form of futures, options, and options on futures or Exchange Traded Funds (ETFs) and other financial instruments—can be introduced which track the value of such an index, and each underlying component of the index. This can provide financial market participants with a method of hedging sentiment risk, which is currently neither quantified nor hedgeable.

A. Overview

In exemplary embodiments of the present invention, systems and methods for creating a sentiment risk index is presented. Such index can either represent public sentiment which regards the broad economy measured by, for example, expectations for future GDP growth, or financial markets in general measured by, for example, expectations for future stock returns on a benchmark financial index, such sentiment obtained from popular survey results, social media, news, internet activity or macroeconomic measures such as inflation or unemployment trends; or sentiment regarding individual companies and/or their securities, and these company-specific sentiment measures, obtained from popular survey results, social media, news, internet activity, or macroeconomic measures such as industry trends can be aggregated into a group of stocks comprising a well-known index such as the S&P500 and be weighted accordingly, or aggregated into a specific group of stocks to reflect an individual investor's portfolio holdings. Alternatively, they can be indexed in some other fashion, such as the 10 (or some other number) stocks with the most positive (or negative) sentiment as extracted from social media, news, or other internet activity.

It is understood that surveys and opinion polls and prediction markets are meant to include (i) the total result of the survey or opinion poll or prediction markets, i.e., the headline number; (ii) the results of any individual underlying question or item in the survey or opinion poll; and (iii) any other data generated from the prediction markets; and (iv) the results pertaining to a subset of respondents, such as, for example, a subset of respondent cohorts identified by demographic information, such as age, gender, race, income level, marital status, education level, religion, political affiliation, profession, or geographic location. (See, e.g., Guzman, Giselle. "Sexonomics: Gender, wealth, and expectations in financial markets," Journal of Economic and Social Measurement, Volume 37, Number 1-2/2012.)

Exemplary embodiments of the present invention apply to the creation and use of synthetic variables, proxy variables, indicators, indices and the like to measure sentiment risk. In exemplary embodiments of the present invention, when more that one data source is used to construct an indicator, each data source can be assigned a weight, where the weights collectively sum to a fixed number. Such weights, which can each have, for example, a value between −1 and 1 inclusively, can either be arbitrarily determined, or can, for example, be determined by a mathematical formula, statistical method, or automatically determined by a signal extraction algorithm such as standard, rolling, or recursive Principal Components Analysis or Kalman Filter, or some other method. This allows for the creation of a synthetic variable or composite indicator by identifying the common element or signal to be discovered from a group of disparate social media data, metadata, Internet search data, Internet activity data, economic data, financial data, surveys and opinion polls, prediction markets, and news data, and a composite indicator thus generated that combines many data sources. An example of such a synthetic variable or composite indicator to measure sentiment risk is described in the following examples which measure sentiment for a particular company, for a state, and for the economy in general.

In exemplary embodiments of the present invention, once generated as described herein, such indicators can be used to identify and quantify sentiment risk that affect the economy and/or asset prices. In this case, the indicator becomes an index, whose value changes in real time. Thus, financial instruments—i.e., risk management contracts in the form of futures, options, and options on futures or Exchange Traded Funds (ETFs) and other financial instruments—can be introduced which track the value of such an index. This can provide financial market participants with a method of hedging sentiment risks that is currently neither quantified nor hedgeable.

In exemplary embodiments of the present invention internet activity data, social media and metadata data to generate a sentiment measure can be collected in real-time via (i) an API feed, (ii) a data consolidator, such as, for example, GNIP, or (iii) collected directly using a web crawler from social media and Internet data sources such as, for example:

Clipmarks, Dailymotion, Delicious, Digg, Diigo, Facebook, Flickr, Flixster Fotolog, Foursquare, FriendFeed, Google Buzz, Google Adwords, Google, Correlate, Google Trends, Google Analytics, Groupon, Hulu, Identi.ca, iLike, IntenseDebate, Linkedin, Living Social, MySpace, Newsgator, Photobucket Plurk, Reddit, Seeking Alpha, Monster, Motley fool, Fool.com, Thestreet.com, Yahoo message boards, Stocktwits, Raging bull, SixApart, SlideShare, SmugMug, StumbleUpon, Thrillist, Tumblr, Twitter, Vimeo, WordPress, Xanga, Yahoo, YouTube, Instagram, Pinterest, as well as any other cloud-based social media website that may be introduced or become popular.

In exemplary embodiments of the present invention historical social media and metadata to make the indicators can be collected from sites such as, for example:

http://indextank.com/
http://trendistic.indextank.com/
http://hashtags.org/
http://www.research.ly/
http://www.rowfeeder.com/
http://www.infochimps.com/
www.keepstream.com
http://www.buzzient.com/ and
http://www.inddig.com/.

In exemplary embodiments of the present invention, Internet search query data used to generate exemplary sentiment risk indicators can be collected or downloaded, either manually or in an automated fashion, such as, for example, via a Python script or with a web crawler, from search engines such as Google, Yahoo, Bing, Yandex, Baidu, or from sources such as, for example:

Google Trends (http://google.com/trends),
Google Correlate (http://www.google.com/trends/correlate/)
Google Zeitgeist (http://www.google.com/inti/en/press/zeitgeist/index.html),
Ask IQ (http://about.ask.com/en/docs/iq/iq.shtml),
Dogpile SearchSpy (http://www.dogpile.com/info.dogpl/searchspy/),
MetaCrawler MetaSpy (http://www.metacrawler.com/),
Lycos 50 (http://50.lycos.com/),
Yahoo Buzz Score,
dWoz Search Phrase Lists (http://www.markosweb.com/www/dwoz.com/),
Google AdWords Keyword Tool
(https://adwords.google.com/select/KeywordToolExternal), and
Search Term Research and Search Behavior (http://searchenginewatch.com/showPage.html?page=_subscribers/topics).

In exemplary embodiments of the present invention, internet sentiment measures (a web activity factor) used to generate exemplary sentiment risk indicators can be obtained from an aggregator such as Recorded Future, Inc., which collects and indexes internet content and applies natural language processing technology and other machine learning techniques to extract and score sentiment measures for we content, with patent-pending methodology described in U.S. Patent Application Publication No. 2010/0299324, entitled "INFORMATION SERVICE FOR FACTS EXTRACTED FROM DIFFERING SOURCES ON A WIDE AREA NETWORK and U.S. Patent Application Publication No. 2009/0132581, entitled "INFORMATION SERVICE FOR FACTS EXTRACTED FROM DIFFERING SOURCES ON A WIDE AREA NETWORK."

In exemplary embodiments of the present invention the above data sources can be used alone or in conjunction with survey and opinion poll data sources, to create a composite sentiment indicator. Such survey and opinion poll data sources can include, for example:

The Conference Board, University of Michigan Survey Research Center, Zillow, The Gallup Organization, Rasmussen Polls, Zogby, Google Consumer Surveys, National Association of Home Builders, National Association of Realtors, Institute for Supply Management Purchasing, Managers' Index, National Association of Purchasing Management—Chicago Business Barometer Index, The Philadelphia Federal Reserve Business Outlook Survey, National Association of Home Builders-Wells Fargo Builders Index, University of Michigan Index of Consumer Sentiment, Conference Board Consumer Confidence Index, Bloomberg consumer comfort index, American Association of Individual Investors Survey, Investors Intelligence Survey, ABC news poll, In-Trade, Bet Fair, and Consensus Point.

It is noted that all such survey and opinion poll data, social media data, metadata, tagging, user clicks, blogs, Internet search and other Internet activity data are sometimes collectively referred to herein as "soft data."

In exemplary embodiments of the present invention the above data sources can be used alone or in conjunction with economic and financial data sources, to create a composite sentiment indicator. Such economic and financial data sources can include, for example:

IHS Global Insight, Bloomberg, Reuters, S&P, S&P Capital IQ, CME Group COMEX, Chicago Board of Trade, TAQ Trade and Quote Data, NYMEX, Standard & Poors, NYSE Euronext, NASDAQ, I/B/E/S (Institutional Brokers' Estimate System), Zacks Investment Research, US Bureau of Economic Analysis, US Census Bureau, US Department of Commerce, The World Bank, International Monetary Fund, US Federal Reserve, Pricestats, London Stock Exchange, The German Bourse, any state, national, or international governmental statistical office, Interactive Data Corporation, Fitch Ratings, Moody's Investors Service, Wanted Technologies, as well as any other provider of economic and financial data. Such economic and financial data are sometimes collectively referred to herein as "hard data".

In exemplary embodiments of the present invention, wherein the particular survey, opinion poll, prediction market, or other data has an associated future official release date, from at least one of a governmental or private statistical agency or company, and the indicator constructed from data sources such as those listed above, measures sentiment risk. Further, a financial instrument can be created based upon the composite indicator and each underlying data element, such as a derivative contract, i.e., futures, options, and options on futures, or an ETF (Exchange Traded Fund) and other financial instruments, thus providing a method to track overall sentiment risk as well as individual survey or opinion poll results, and providing a method to bet on increasing or decreasing values of said composite sentiment indicator so as to hedge sentiment risk.

In exemplary embodiments of the present invention, a given indicator can, for example, comprise exclusively soft data, exclusively hard data, or various combinations of soft and hard data as may be useful, predictive or desirable. Data and metadata, including social media data and other "soft" and "hard" data, may be combined by applying weights that have been determined arbitrarily or by some optimization method such as by applying a signal extraction algorithm, to create synthetic variables, proxy variables, indicators, or indices that can accurately track sentiment and sentiment risk.

In exemplary embodiments of the present invention, a sentiment risk indicator can be statistically tested against historical data regarding the economic or financial quantity of interest in order to make a parameter estimate that can be used to generate a forecast. In the case of stock prices, a sentiment indicator can be tested against historical price or return data that occur on a stock exchange such as the New York Stock Exchange, American Stock Exchange, the NASDAQ, etc. Such price data can include so-called "technical analysis" indicators such as, for example, volume, 50-day moving average, money flow indicators, etc., and such price data can also include any statistical relationships between prices of different assets or indicators, such as, for example, correlations or covariances.

In the case of company earnings, an exemplary sentiment indicator can be tested, for example, against earnings per share data, analyst estimates data, upgrades, downgrades, and actual historical earnings per share data obtained from a service such as I/B/E/S, whereas an indicator for real estate prices could, for example, be compared against price data obtained from a website such as Zillow, or an index of prices such as the National Association of Realtors Metropolitan Median Prices Index or the Case-Shiller Index, etc.

In exemplary embodiments of the present invention an exemplary indicator can be tested against historical data of outcomes by means of (i) a simple statistical analysis, such as correlation or covariance, or by (ii) an econometric model such as Ordinary Least Squares, specified by ($y=a+bx+e$)

whereby the indicator would obtain associated parameter estimates, such as Alpha (a, a constant), Beta (b, the covariance between x and y divided by the variance of x), the Error (e), sigma (the standard deviation of x) and sigma-squared (the variance of x). Other methods to estimate an econometric model can include, for example, General Method of Moments, Maximum Likelihood Estimate, etc. An indicator can be modeled either linearly or non-linearly. It is recognized that in several instances the data may be of different sampling frequencies, so that either the data must be converted to the same frequency, or a technique for modeling mixed frequency data must be employed such as, for example, a MIDAS (Mixed Data Sampling) regression.

In exemplary embodiments of the present invention indicators can be made available on a platform which allows users to (i) specify data inputs for creating custom sentiment indicators, (ii) apply a mathematical formula, statistical method, or signal extraction algorithm to calculate the indicator, (iii) test the indicator against actual outcomes and historical data, and (iv) make forecasts of future values of the economic data or asset prices. The indicators can be displayed numerically, or in graphical form, and can, for example, be compared to one another, displayed in real-time or as time series historical data, and/or compared to historical outcome data. In exemplary embodiments of the present invention such indicators can be used to forecast future outcomes and predict future values of various economic or financial conditions, quantities, or states, or asset prices.

Thus, various exemplary embodiments of the present invention can include one or more of the following processes, systems or methods:

1) The use of surveys, opinion polls, prediction markets, social media data, internet activity data, news, metadata tags, and Internet search query logs to make sentiment and sentiment risk indicators regarding current and/or future economic or financial conditions, quantities or states, or asset prices;

2) Combining several of these data sources with (i) other surveys, opinion polls, prediction markets, social media data, internet activity data, news, metadata tags, and Internet search query logs, and (ii) economic, financial and news data, or combining several sources of economic, financial and news data to create a composite sentiment indicator of current and/or future economic or financial conditions, quantities or states, or asset prices; in such combinations the combination weights can be determined either arbitrarily or by applying a signal extraction algorithm.

3) An analysis platform for statistical and econometric models combining sentiment indicators with economic and financial historical and real-time data sources to generate parameter estimates and make forecasts of future values of economic or financial data or predict asset returns; and 4) Creation of a sentiment risk index based on the sentiment indicators and tradable financial instruments based on the value of the index, such that if an indicator quantifies sentiment risk, the derivative instruments (futures, options, options on futures) or Exchange Traded Fund (ETF) and other financial instruments provide a method of hedging the risk quantified by the indicator.

In exemplary embodiments of the present invention, where multiple data sources are chosen to construct an indicator, the data sources or keywords can be combined into a composite indicator by assigning weights to each data source after the data have been appropriately processed and transformed. Such weights can be assigned either arbitrarily or by some means of optimization, such as, for example, by applying a signal extraction algorithm to find the common signal among the various data items. For example, a signal extraction algorithm such as Principal Components Analysis, the Kalman Filter, or the Wiener-Kolmogorov (WK) signal extraction formulae can be applied to discover the common element among the disparate sources of data. However, it is noted that standard signal extraction algorithms may be inadequate due to the nature of this data, which may be subject to spontaneous arrivals, or revisions, and standard signal extraction methods may induce a look-ahead bias. In this case, in exemplary embodiments of the present invention it is preferable to apply a modified signal extraction procedure to address the idiosyncrasies associated with this type of data, A Modified Principal Components/Kalman Filter (MPCA-KF} approach is next described which addresses the shortcomings of such standard signal extraction techniques, The described modified signal extraction algorithm captures the essence of a large data set in a single series that assigns weights to each contributing data source. Such a series can then be used as (i) a synthetic variable, proxy variable, or latent factor representing some economic or financial condition or quantity which is not directly or immediately observable; (ii) an indicator for making an estimate or a forecast; (iii) a factor in a statistical model; or (iv) as a composite index measuring some quantity, such as a risk factor, which changes in value as the underlying data change in value (e.g., in real-time).

Principal components analysis is a technique used to reduce multidimensional data sets to lower dimensions for analysis. PCA allows for a large set of correlated variables to be employed together, without the problem of multicollinearity, as the extracted factors are pairwise orthogonal. Sensitivity to units of measurement is avoided by standardizing the variables to have mean zero and unit variance, before calculating the principal components. Principal components of the indicators are formed by extracting the characteristic root of the standardized correlation or covariance matrix of the variables. That is, an eigenvalue decomposition, or an eigendecomposition, is performed. In the mathematical discipline of linear algebra, eigendecomposition, or sometimes spectral decomposition, is the factorization of a matrix into a canonical form, whereby the matrix is represented in terms of its eigenvalues and eigenvectors. Only diagonalizable matrices can be factorized in this way. The eigenvectors of a square matrix are the non-zero vectors that, after being multiplied by the matrix, either remain proportional to the original vector (i.e., change only in magnitude, not in direction) or become zero. For each eigenvector, the corresponding eigenvalue is the factor by which the eigenvector changes when multiplied by the matrix. The eigenvectors are sometimes also called characteristic vectors or latent vectors. Similarly, the eigenvalues are also known as characteristic values, characteristic roots or latent roots. The resulting eigenvector is a linear combination of the variables that allows for a common signal to be distilled from the data, thus measuring the collective impact of several indicators at once while conserving degrees of freedom. An eigenvalue tells us the proportion of total variability in a matrix associated with its corresponding eigenvector. Consequently, the eigenvector that corresponds to the highest eigenvalue tells us the dimension (axis) that generates the maximum amount of individual variability in the variables. The next eigenvector is a dimension perpendicular to the first that accounts for the second largest amount of variability, and so on. The eigenvector of the first principal component reveals the variable that has the dominant impact in the overall system. The coefficient loadings of the eigenvector elements are also the correlation coefficients between the principal component and the underlying variables. It is the first principal component that will generally be taken as the synthetic variable, proxy variable, latent factor or composite indicator or index. However, such synthetic variable, proxy variable, latent factor or composite indicator or index is not limited to only the first principal component, as the second, third, or $n^{th}$ may also be utilized.

For ease of exposition, a brief explanation of eigenvalues and eigenvectors is next presented.

An important mathematical formulation is the characteristic equation of a square matrix. If C is an n by n covariance matrix, the characteristic equation is $$|C-\lambda I|=0$$

where $\lambda$ is a scalar. Solving this equation for $\lambda$ reveals that the equation is an degree polynomial of $\lambda$. That is, there are as many $\lambda$s as there are variables in the covariance matrix. The n $\lambda$s that are the roots of this polynomial are known as the eigenvalues of C. Because C is symmetric, all the $\lambda$s will be real numbers (i.e., not complex or imaginary numbers), although some of the $\lambda$s may be equal to or less than 0. The $\lambda$s can be solved for in any order, but it is customary to order them from largest to smallest.

To examine what is meant here, let C denote a two by two correlation matrix that has the form:

$$\begin{pmatrix} 1 & \rho \\ \rho & 1 \end{pmatrix}$$

the quantity $C-\lambda I$ may thus be written as:

$$C-\lambda I = \begin{pmatrix} 1 & \rho \\ \rho & 1 \end{pmatrix} - \begin{pmatrix} \lambda & 0 \\ 0 & \lambda \end{pmatrix} = \begin{pmatrix} 1-\lambda & \rho \\ \rho & 1-\lambda \end{pmatrix}$$

and the determinant is $$|C-\lambda I|=(1-\lambda)^2-\rho^2$$

So the equation that requires solution is $$(1-\lambda)^2-\rho^2=0$$

which is a quadratic in $\lambda$ (if we had three variables it would be cubic, and if we had four variables it would be quartic, etc.). Solving the quadratic gives $$\lambda=1\pm\rho$$

The largest root depends on the sign of $\rho$.
For $\rho>0$,
Then $\lambda_1=1+\rho$ and $\lambda_2=1-\rho$.

For each $\lambda$ one can define a nonzero vector a such that $$(C-\lambda I)a=0$$

The 0 to the right of the equals sign denotes a vector filled with 0s. Any number in a that satisfies this equation is called a latent vector or eigenvector of matrix C. Each eigenvector is associated with its own $\lambda$. It is noted that the solution to a is not unique, because if a is multiplied by any scalar, the above equation still holds. Thus, there is an infinite set of values for a, although each solution will be a scalar multiple of any other solution. It is customary to normalize the values of a by imposing the constraint that a' a=1. A latent vector subject to this constraint is called a normalized latent vector. Taking the two by two correlation matrix with $\rho>0$, then $$(C-\lambda I)a = \begin{pmatrix} 1-\lambda & \rho \\ \rho & 1-\lambda \end{pmatrix}\begin{pmatrix} a_1 \\ a_2 \end{pmatrix} = \begin{pmatrix} (1-\lambda)a_1+\rho a_2 \\ (1-\lambda)a_2+\rho a_1 \end{pmatrix} = \begin{pmatrix} 0 \\ 0 \end{pmatrix}$$

or, by carrying out the multiplication, we find $$(1-\lambda)a_1+\rho a_2=0$$

$$(1-\lambda)a_2+\rho a_1=0$$

Now taking the largest eigenvalue, $\lambda=1+\rho$ and substituting gives $$\rho(a_2-a_1)=0$$

$$\rho(a_1-a_2)=0$$

Thus, all we know is that $a_1=a_2$. If we let $a_1=10$, then $a_2=10$; and if we let $a_1=-0.023$, then $a_2=-0.023$. This is what was meant above when it was said that there were an infinite number of solutions where any single solution is a scalar multiple of any other solution. By requiring that a'a=1, we can settle on values of $a_1$ and $a_2$. That is, if $a_1{}^2+a_2{}^2=1$ and $a_1=a_2=a$, then $2a^2=1$ and $a=\sqrt{0.5}$.

So the first eigenvector will be a 2 by 1 column vector with both elements equaling $\sqrt{0.5}$. For the second eigenvector, we substitute $1-\rho$ for $\lambda$. This gives, $$\rho(a_2+a_2)=0$$

Consequently, $a_1=-a_2$. One of the a's must equal $\sqrt{0.5}$ and the other must equal $-\sqrt{0.5}$. It is immaterial which is positive and which is negative, but it is a frequent convention to make the first one ($a_1$) positive and the second one ($a_2$) negative. It is noted that the normalized eigenvectors of a two by two correlation matrix will always take on these values. The actual value of the correlation coefficient is irrelevant as long as it exceeds 0.

The Kalman (Bucy) filter is a recursive algorithm for sequentially updating the one-step ahead estimate of the state mean and variance given new information. Given initial values for the state mean and covariance, values for the system matrices $\Xi_t$, and observations on $y_t$, a Kalman filter may be used to compute one-step ahead estimates of the state and the associated mean-square error matrix, the contemporaneous or filtered state mean and variance, and the one-step ahead prediction, prediction error, and prediction error variance.

In exemplary embodiments of the present disclosure an exemplary Modified Principal Components Analysis-Kalman Filter (MPCA-KF) algorithm differs from conventional Principal Components Analysis (PCA) in several aspects. First, it is calculated recursively, thus eliminating the look-ahead bias inherent in PCA. Second, dynamic on-the-fly programming allows seamless incorporation of new, discontinued, or revised data series, thus resolving the revision issue that plagues economic and financial data. Third, it can be performed on a matrix of pairwise correlations or covariances (in addition to the standard square correlation or covariance matrix), thus allowing the calculation to be performed on imperfect data sets. Fourth, if a balanced panel is desired, missing observations can be filled in by estimating the values by ARIMA, arithmetic, or logarithmic interpolation or extrapolation, or a user-defined method, as is necessary. Fifth, tattered edges at the end of the sample caused by spontaneous arrival of new data can be smoothed by either: (i) applying a Kalman Filter or (ii) by ARIMA (Autoregressive Integrated Moving Average) or arithmetic or logarithmic extrapolation (estimating series to fill in tattered edges), thus resolving the spontaneous arrival problem associated with economic and financial data, and eliminating the need to discard valuable data observations.

It is noted that there exists the possibility that an eigendecomposition on a matrix of pairwise correlations or covariances (as opposed to the standard PCA method which is an eigendecomposition of a standard square correlation or covariance matrix) may result in a matrix that not positive semidefinite, and the eigendecomposition cannot be performed. In this context it is recalled that a positive semidefinite matrix is a Hermitian matrix all of whose eigenvalues are nonnegative. A square matrix is called Hermitian if it is self-adjoint.

A self-adjoint matrix is a matrix A for which $A^H = \overline{A}^T = A$, where the conjugate transpose is denoted $A^H$, the transpose is $A^T$, and the complex conjugate is $\overline{Z}$. If a matrix is self-adjoint, it is said to be Hermitian. That is, it is noted that the properties of a matrix of pairwise correlations (covariances) are not quite the same as those of a standard correlation (covariance) matrix. In the case that the matrix of pairwise correlations (covariances) is not positive semidefinite, then the data matrix is forced to become balanced or squared by either 1) filling in the missing values by estimation using ARIMA, arithmetic, or logarithmic interpolation or extrapolation or a user-defined method; or 2) a Kalman filter is applied over the entire unbalanced data set.

In exemplary embodiments of the present invention such calculation can be performed continually by automatically checking and detecting the shape of the matrix. If spontaneously arrived data have caused a tattered edge at the end of the dataset, then the data can be filled in with estimates, either by ARIMA or arithmetic or logarithmic extrapolation, or the Kalman Filter can be applied. Once actual data have arrived, the estimate data can be replaced by the actual values. As long as the edge remains tattered, estimates are calculated to square the tattered edge. Once actual data have arrived to complete the tattered edge, the calculation switches back to recursive principal components analysis, and the eigendecomposition performed. Once new data arrives to cause a new tattered edge in the next time period, the estimate procedure is resumed, until the edge becomes square again with actual data, and so on, repeating as each new data point arrives.

In exemplary embodiments of the present disclosure a calculation can be performed as follows. An initial ramp-up period can be designated, such as, for example, the first 20 observation time periods, whereby initial values are calculated using standard Principal Components Analysis (PCA). In the case that an observation is missing at any time period between time t=1 and t=20, the missing data can be estimated by ARIMA interpolation, or, for example, arithmetic or logarithmic interpolation or a user-defined method. Then, at each successive time period after t=20, the principal components can be estimated recursively, adding a set of n observations at each successive time t. That is to say, at each point in time, an eigenvalue decomposition is performed on the standard correlation or covariance matrix, or on the matrix of pairwise correlations or covariances. Data enter the calculation dynamically via on-the-fly programming. That is, at each point in time the program automatically detects which data series are available and performs the calculation on that data set. That is, the calculation is performed at each point in time only on the data that is currently in the Information Set. If a series has been discontinued or introduced in a given time period, the Information Set reflects that change. If a data series has been revised in a given time period, then the revision enters the Information Set at that point in time, and the unrevised data also remains in the information set (or a user can instruct the program to replace the unrevised value with the revised value). In the case that a series has been revised, the newly revised value can be substituted for the previous value, or the unrevised and revised values can enter the calculation concurrently. The key is that the program can automatically detect what is in the Information Set at each point in time, so as to avoid the look-ahead bias that is inherent in standard PCA. In the case newly arrived data causes a tattered edge at time t, either (i) the data can be estimated by ARIMA or arithmetic or logarithmic extrapolation or a user-defined method to complete the square matrix, or (ii) a Kalman Filter is applied. Instead of being performed only on a balanced data matrix and discarding newly arrived or revised data, the calculation can performed on the entire data set including the tattered edge, i.e., on an unbalanced data matrix, or data are estimated to fill the tattered edge or a Kalman Filter is applied, if necessary.

Thus, in exemplary embodiments of the present disclosure such an MPCA-KF algorithm can be applied to a standard correlation or covariance matrix, or to a matrix of pairwise correlations (covariances) generated from a data matrix with a tattered edge. This allows signal extraction from imperfect datasets, eliminating the need to trim to a square matrix and discard valuable data. As noted herein, in the case that the matrix of pairwise correlations (covariances) is not positive semidefinite, then at the final tattered edge of newly arrived data in the data matrix, either (i) the missing data are filled in by ARIMA, arithmetic, or logarithmic extrapolation, or a user-defined method; or (ii) a Kalman Filter can be applied.

Alternatively, in exemplary embodiments of the present disclosure, a two-step approach can be employed whereby first the tattered edge of newly arrived data can be truncated to form a square matrix. The modified principal components can be estimated at each point in time recursively and dynamically on either a standard correlation or covariance matrix or a matrix of pairwise correlations or covariances. Then, a Kalman Filter can be employed over the entire data set including the final tattered edge of newly arrived data. This two-step procedure may be performed in a recursive fashion. This technique addresses the general problem of performing an analysis in real time, such as analyzing an economy, where a forecast must be conducted on the basis of data sets that, due to different arrival times, caused for example, by publication lags, result in a tattered edge, i.e., an unbalanced panel, at the end of the sample period.

Thus, the method described above allows for the calculation of a signal in real-time in exemplary embodiments of the present invention. The method can correct the look-ahead bias that is inherent in standard PCA by performing the calculation recursively at each point in time. The method can correct the revision problem associated with official economic statistics that are subject to publication revisions because the data enter the calculation dynamically and on the fly. The method can also correct for missing data points by estimating values with ARIMA, arithmetic, or logarithmic interpolation or extrapolation. The method can correct for the spontaneous arrival problem associated with publication lags of official economic data or time zone issues in financial markets, such as the market for foreign exchange where markets close and open at different times around the world.

B. Exemplary Network Environment

FIG. 1 illustrates an example environment in which exemplary embodiments of the present invention can be implemented. Relevant social media data and other data can, for example, be stored on a relational database 20 (as are well known and provided by, for example, IBM, Microsoft Corporation, Oracle and the like) associated with a computer system 10 provided with and running various computational hardware and software applications necessary to generate one or more indicators. Computer system 10 can include, for example, a microprocessor 30, which is understood to include various multiple core processors, various distributed processors, etc., memory (not shown), a storage medium (not shown), input devices (e.g., keyboard, mouse, microphone, etc.) 40, and one or more monitors 50. System 10 can, for example, be operated using a conventional operating system, and can include, for example, a graphical user interface for navigating and controlling various computational aspects of the present invention. System 10 can, for example, also be linked to one or more external data source servers 60 that feed system 10 with some or all of the necessary external data for computing the various indicators. Alternatively, as shown in FIG. 1, a stand-alone workstation 70, including a processor, memory, input devices and storage medium may be used to access database 20, or for example, a combination of database 20 and various external data source servers (not shown) akin to external data source servers 60.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

C. Exemplary Operation

Figure 2:
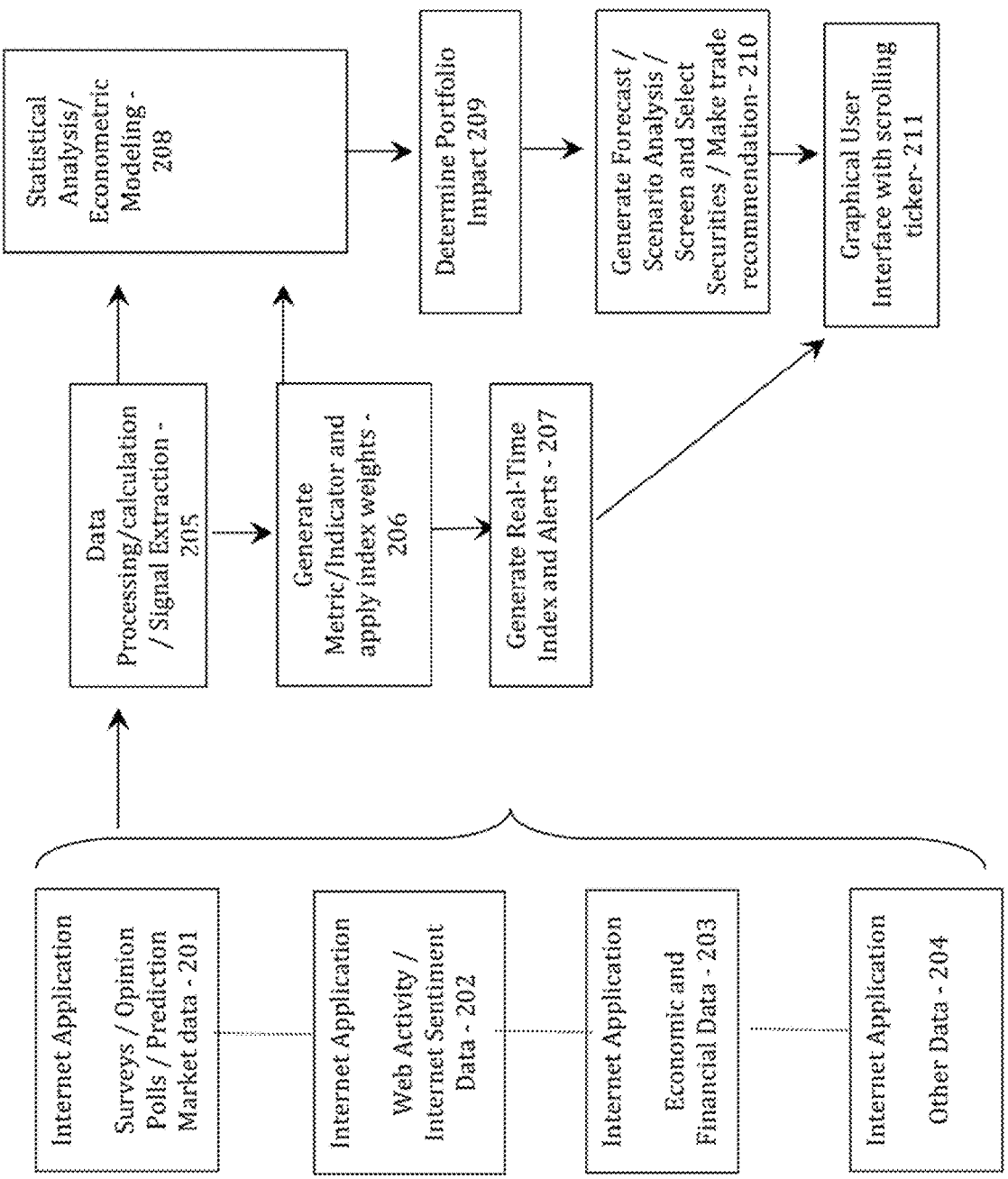
FIG. 2 is a schematic diagram illustrating an example system for creating an index of sentiment risk for an economic or financial quantity based on surveys, opinion polls, prediction market data, metadata, social media data, Internet content, activity, and search query data, economic and financial data, and news data, according to certain implementations of the invention.

FIG. 2 illustrates a basic process according to exemplary embodiments of the present invention. In operation, a forecast, portfolio analysis or trade recommendation generated at 210 can analyze sentiment risk and forecast financial quantities in the following general manner. Forecast 210 can generate and/or receive parameters generated by portfolio impact 209 and statistical analysis/econometric modeling 208, which receives automatically, via a network, or manually entered by a user, a set of indicators at 206 which have been processed at 205 and/or receive directly other data which has been processed solely at 206. Data received at 206 can comprise data received from various Internet applications such as, but not limited to, survey and opinion poll and prediction market data 201, web activity and internet sentiment data 202, economic and financial data 203, and/or other data 204. In the processing node at 205, the data are cleaned, transformed and normalized; primary sentiment measures are calculated and prepared for analysis. If a composite indicator is to be generated from multiple measures of sentiment, a signal is extracted from multiple sentiment measures at node 206. If a sentiment risk index is to be generated from for various securities comprising a well-known index, index weights are applied at node 206. A real-time alert is generated at 207 to notify a user if the level of sentiment risk has surpassed a pre-defined threshold, whereby such alert can be text (email, tweet, or SMS message), visual (a lightbulb changing colors), graphical, sound (chime, bells, etc.), or a scrolling ticker.

As noted above, where multiple sentiment measures are chosen to construct a composite indicator, such measures can be combined into one composite indicator by assigning weights to each data source after the data are processed and transformed accordingly, whereby the weights can range in value between −1 and 1, and must collectively sum to a fixed number. In exemplary embodiments of the present invention the weights can be assigned either arbitrarily or by some means of optimization, such as, for example, by applying a signal extraction algorithm to find the common signal among the various data. Signal extraction algorithm 206 can be, for example, a static, rolling, or recursive Principal Components Analysis which is an eigenvalue decomposition of a covariance or correlation matrix, or a matrix of pairwise correlations and covariances, or a method such as a Kalman Filter, or the Wiener-Kolmogorov (WK) signal extraction formulae, or some other method which modifies or incorporates elements of one or several well-known optimization or signal extraction techniques, such as the hybrid MPCA-KF signal extraction algorithm described in commonly-owned, commonly-assigned U.S. patent application Ser. No. 13/677,273, entitled "METHODS AND SYSTEMS TO CREATE SYNTHETIC VARIABLES, INDICATORS AND INDICES FROM MULTIPLE DATA AND METADATA SOURCES AND RISK MANAGEMENT CONTRACTS THEREON," which was filed on even date herewith. It is understood that such signal extraction methods may need to be modified due to the unique properties of this type of data. In exemplary embodiments of the present invention it is also possible to employ various signal extraction techniques in order to construct various candidate indicators, composite indicators, or indices and then select the indicator or index which results in the lowest forecast error of estimated parameters, i.e., select the indicator or index which results in the best forecast.

In exemplary embodiments of the present invention an example system can offer as a choice several well-known optimization or signal extraction algorithms, the hybrid MPCA-KF algorithm described in above-mentioned U.S. patent application Ser. No. 13/677,273, entitled "METHODS AND SYSTEMS TO CREATE SYNTHETIC VARIABLES, INDICATORS AND INDICES FROM MULTIPLE DATA AND METADATA SOURCES AND RISK MANAGEMENT CONTRACTS THEREON," or some other hybrid or modified optimization or signal extraction method All possible optimization or signal extraction methods can be applied concurrently in order to identify the method that results in the lowest forecast error or the highest level of predictive power. An example system can run several signal extraction algorithms at once to generate candidate indices or indicators. These candidate variables can then be tested concurrently in a statistical or econometric forecasting model. The example system can then automatically identify the candidate indicator that produces the lowest forecast error or the highest level of predictive power, and recommend that indicator as a suitable indicator to the user.

The resulting composite sentiment risk indicator generated at 206 can be a linear combination of the various sentiment measures, such as a weighted average, or some other linear combination, whereby the weights assigned to each data source collectively sum to a fixed number. At 206 the single sentiment measure or composite sentiment measure is applied to each underlying security index component in a well-known financial market index and then the index weights are applied to all securities such that an index is formed which has the same composition as the well-known index.

Figure 3:
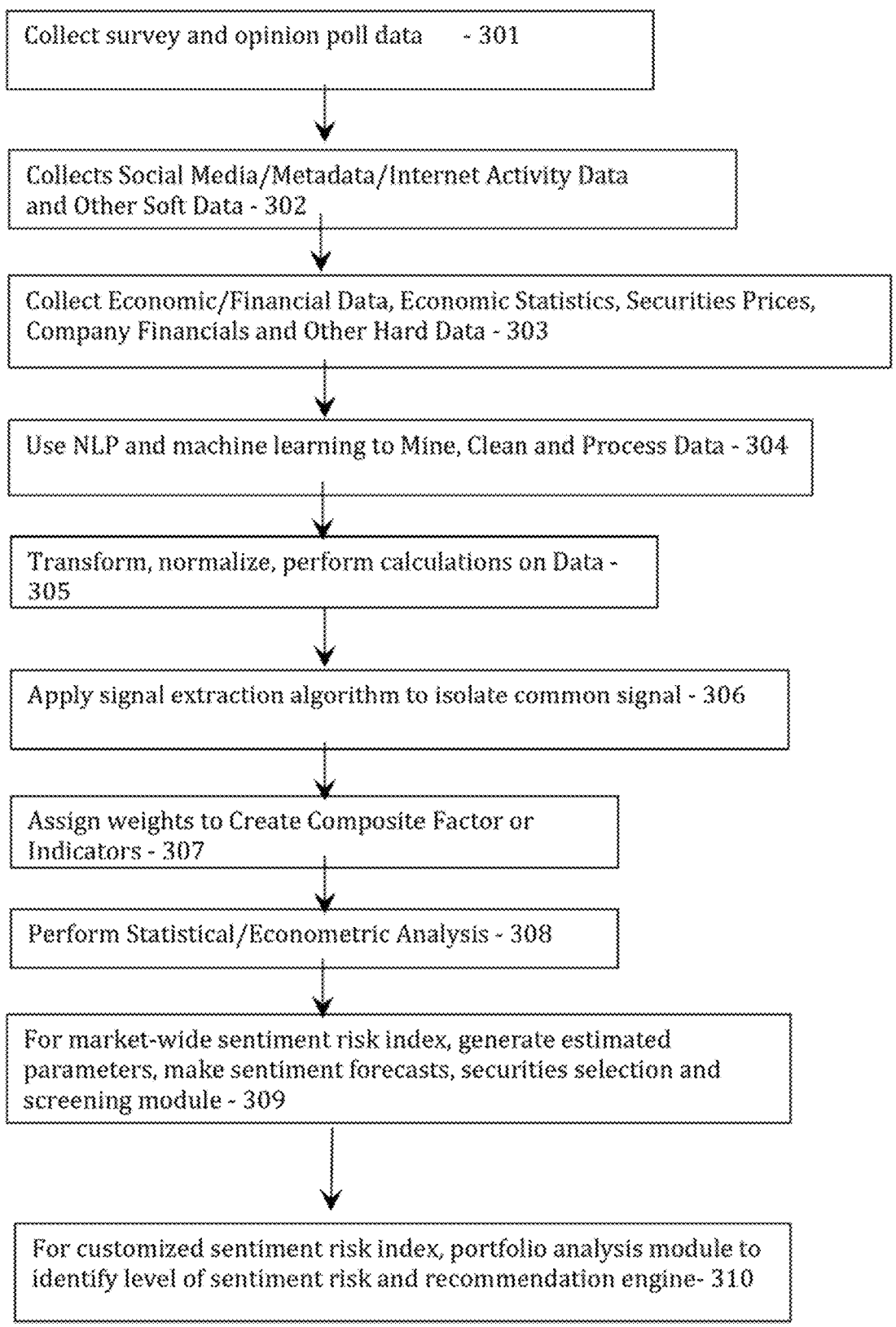
FIG. 3 is a schematic diagram that illustrates the procedure for collecting data and creating a sentiment risk index in accordance with some embodiments of the present invention.

FIG. 3 depicts exemplary process flow. First, survey and opinion poll and/or prediction market data are collected at 301. Then, at 302, the real-time social media data, metadata, Internet search query, internet activity, news, and other data relevant to expectations for and opinions on the state of the economy and financial markets is collected. Then, at 303, economic and financial data such as economic statistics, securities prices, company financial data, etc. and other "hard" data related to the economic or financial quantity of interest are collected. The data are mined, cleaned and processed; Natural Language Processing and machine learning techniques are applied to extract a sentiment measure at 304. It is here understood that each type of data may have its own mining and processing method. Next, if necessary, the data are transformed and normalized, and any necessary calculations are performed 305. At 306, a signal extraction algorithm can be applied to isolate the common element among the data, as noted above. Next, at 307, a composite factor or indicator can be created from the data by assigning weights either arbitrarily or resulting from the optimization or signal extraction process; wherein such weights can range in value between −1 and 1, and collectively sum to a fixed number; it is noted that in the case of a singular factor or indicator the weight on one data source is 1 and the weight on other data sources is 0. At 307, a composite factor or indicator can be comprised of exclusively soft data, exclusively hard data, or a combination of hard and soft data, and the data can enter the expression current or lagged, linear or non-linear. Next, at 308, a statistical and/or econometric analysis can be performed on the sentiment risk index by testing the index against other indicators, or against soft data, or (more likely) hard data related to the economic or financial quantity of interest. This statistical/econometric analysis can thus generate a set of parameter estimates to forecast the effect of market-wide or security-specific sentiment risk on asset prices, and in addition a securities screening and selection module can identify securities which should be bought or sold on the basis of market-wide or security-specific sentiment risk at 309. For a customized sentiment risk index, a portfolio analysis module at 310 can determine the level of sentiment risk in a portfolio given the specific holdings, and a trade or allocation recommendation can be generated.

Figure 4:
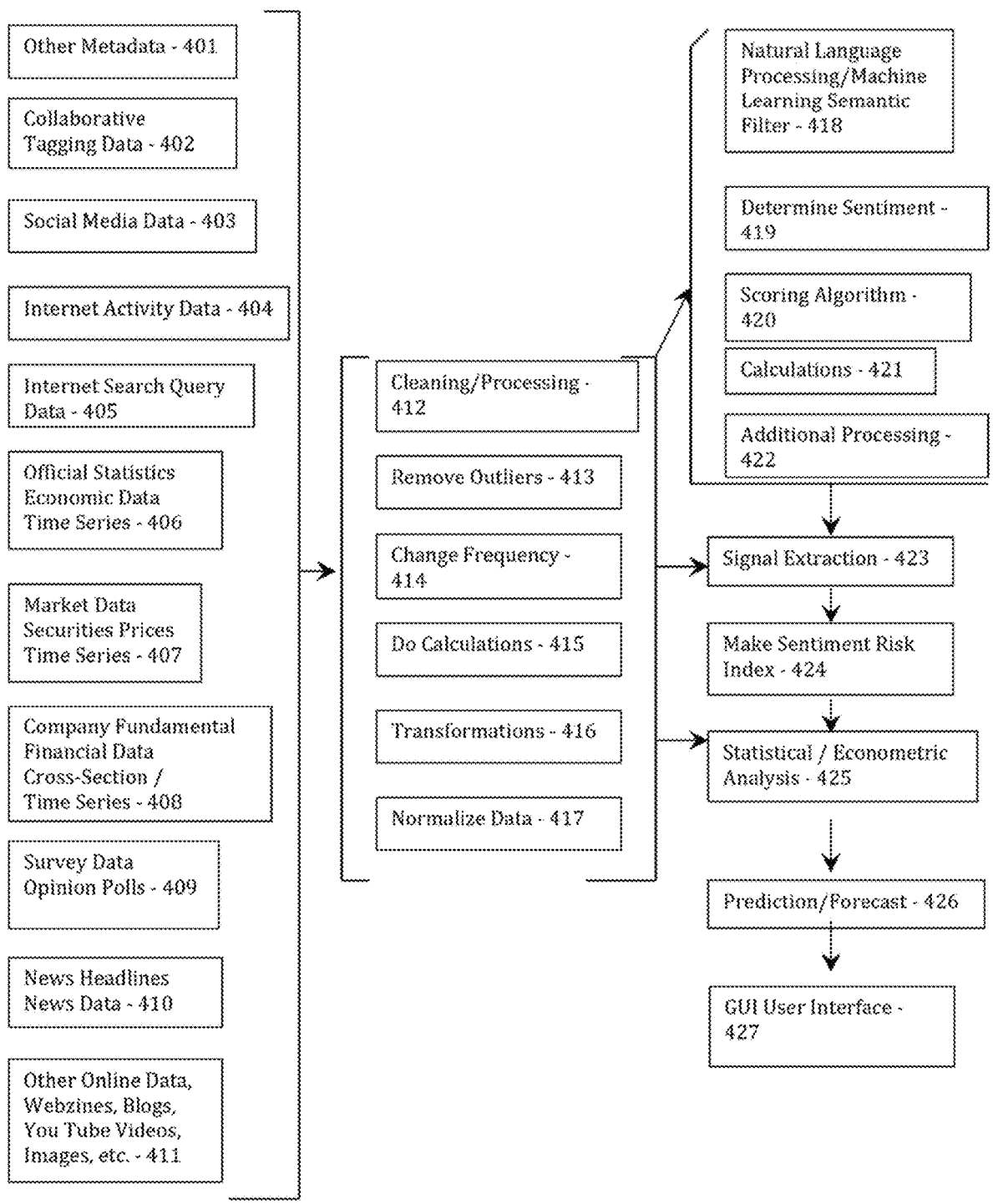
FIG. 4 is a schematic diagram that illustrates an example system of integrating multiple data sources into the system and the processing required to produce a forecast.

FIG. 4 is a more detailed process flow diagram according to exemplary embodiments of the present invention, which illustrates the exemplary process depicted in FIG. 3 in more technical detail. First, the user collects data from a variety of sources such as metadata 401, collaborative tagging data 402, social media data 403, Internet activity data 404, Internet search query data 405, official statistics such as economic data 406, market data, such as securities prices, and transaction data such as volume 407, company fundamental data such as financial data and ownership information such as fund holdings 408, survey data and opinion polls and prediction markets 409, news data and news headlines 410, and other online data such as webzines, blogs, video data, image data, etc. 411.

After the data is collected, it must first be processed before it can be employed in an exemplary analysis. The processing step can include any or all of the following steps: cleaning and processing 412, removing outliers 413, changing the frequency 414, performing calculations 415, performing a statistical or mathematical transformation 416, performing a statistical or mathematical normalization, such as scaling, converting to logs, percent, etc. 417. In the case of "soft" data such as social media data, metadata, collaborative tags, blogs, Internet search query data, internet activity data, news data, etc, the data may need further processing which can include any or all of the following types of processing: data mining and/or natural language processing and/or machine learning processing and/or semantic filter processing 418, some other method of determining the sentiment of the text or data extracted, whether the data has a positive or negative tone 419, some type of scoring algorithm to determine the magnitude of the sentiment extracted from the data 420, additional calculations 421, or some other additional processing to prepare the data for use 422. Next, the data are combined and a signal extraction algorithm is applied to isolate the common element among the various data sources 423. Then, the indicator is created, whereby the weights to the various data sources are determined arbitrarily or by the signal extraction algorithm 424.

In exemplary embodiments of the present invention, once an indicator has been created it can be used, for example, to analyze and/or forecast the sentiment risk for the economic or financial quantity of interest, by employing statistical analysis to determine the relationship between the indicator and (i) other indicators; (ii) soft data; or (iii) hard data or (iv) the economic or financial quantity of interest or asset prices. Such statistical analysis, at 425, such as, for example, Ordinary Least Squares, which takes the form of $y=a+bx+e$, generates parameter estimates such as beta, of the relationship of the indicator with the other variables in the analysis over a certain sample period. These parameter estimates can then be applied, for example, to a post-sample period to produce, at 426, by means of an econometric model, a forecast of the economic or financial quantity of interest or asset prices. At 427 a Graphical User Interface (GUI) allows a visual representation of steps 401-426 to a user comprising charts, graphs, and other user-configurable visual representations of the data in order to determine, for example, relationships between data and trends over time or conduct scenario analysis or portfolio analysis.

FIG. 5 illustrates a Sentiment Risk Index for the Dow Jones Industrial Average over time.

FIG. 6 illustrates a measure of sentiment for a particular stock, Apple, obtained from natural language processing methods on the investing website Seeking Alpha.

For example, a graph can represent data such as, the sentiment regarding a particular well-known stock index by displaying the sentiment for each company's stock indexed by the same methodology as the well-known stock index. With reference thereto, FIG. 5 depicts an exemplary graphical display of sentiment risk for the Dow Jones Industrial Average. Alternatively, a graph can represent data such as, the sentiment regarding a particular stock by applying Natural Language Processing methods or by displaying the relative frequency of negative words to total words related to a company's stock price on a blog site, such as Seeking Alpha. With reference thereto, FIG. 6 depicts an exemplary graphical display of sentiment regarding a stock as expressed on a blog site. It is understood that such graphical depiction may also include one or more of the following:

(i) calculating and displaying how the sentiment score trends over time;
(ii) calculating and displaying how the sentiment score varies by online source or group of sources; and
(iii) calculating and displaying how the sentiment score concurrently trends over time and varies by online source or group of sources, in order to determine if trends are similar or different among different populations of users or different data sources;
(iv) calculating and displaying an overall volume of online social media conversations or Internet search queries referring to the current or future economic or financial conditions, quantities, or states, or asset prices by adding up a number of occurrences of keywords or metadata tags concerning the current or future economic or financial conditions, quantities or states, or asset prices in online social media conversations, metadata tags or Internet search query logs per unit of time;
(v) calculating and displaying how said overall volume of online social media conversations, metadata tags or Internet search queries trends over time;
(vi) calculating and displaying a share of online voice concerning current or future economic or financial conditions, quantities or states, or asset prices relative to other subject matter contained in said online social media, metadata tags or Internet search query logs;
(vii) calculating and displaying one or more of: how the share of online voice acquired by information concerning current or future economic or financial conditions, quantities, or states, or asset prices trends over time, and how the share of online voice acquired by information concerning current or future economic or financial conditions, quantities or states, or asset prices trends over time with respect to other subject matter in the same category.

It is also understood that exemplary graphical display may be accompanied by or include the capacity to generate real-time graphical, numerical, auditory, visual or textual alerts sentiment, or when the frequency of mentions on (i) social media conversations, (ii) metadata tags, or (iii) within the volume of Internet search queries, surpasses a defined threshold level, wherein said defined threshold level is 5% greater than the average daily mentions of keywords of interest, or some other quantity, and, wherein the real-time alerts are based on user-configurable conditions or parameters including one or more of:

(i) abnormally positive online social media conversations, metadata tags, or Internet search queries about the subject matter of interest;
(ii) abnormally negative online social media conversations, metadata tags, or Internet search queries about the subject matter of interest;
(iii) changes in the sentiment expressed among social media participants above or below a pre-selected threshold;
(iv) abnormally high volume of online social media posts, metadata tags, or the volume of Internet search query logs concerning the subject matter of interest;
(v) abnormally low volume of online social media posts, metadata tags, or the volume of Internet search query logs concerning the subject matter of interest;
(vi) social media posts to certain websites;
(vii) social media posts containing certain keywords or metadata tags; and volume of Internet search queries.

It is also understood that such a system utilizes a graphical user interface comprising a unique combination of (i) data mining capabilities including natural language processing and machine learning, (ii) statistical and econometric analysis and (iii) graphical reporting tools to identify a data source or combination of sources that has greatest predictive power of current and future economic or financial conditions, quantities or states, or asset prices.

It is also understood that such a system may display in a graphical user interface one or more visualizations of analytic measurements of online social media conversations, metadata tagging, and Internet search activity data relevant to current or future economic or financial conditions, quantities, or states, or asset prices or company earnings, including displaying analytic measurements of sentiment expressed among online social media participants concerning said current or future economic or financial conditions, quantities or states, or asset prices, or company earnings; and quantifying aggregated social media or Internet data to obtain analytical measurements of the online social media conversations and Internet activity, wherein the analytic measurements of online social media conversations are generated by harvesting and aggregating unstructured qualitative online social media conversations, metadata tagging, and Internet search activity data relevant to current or future economic or financial conditions, quantities or states, or asset prices or company earnings, from one or more online social media sources or Internet search engines or social media data aggregators.

Such a system may further comprise displaying one or more of how sentiment or tone expressed by online social media conversations, metadata tags, and Internet search activity concerning current or future economic or financial conditions, quantities or states, or asset prices or company earnings:

(i) trends over time,
(ii) varies by source or group of sources, and
(iii) concurrently trends over time and varies by source.

It is also understood that such a system may comprise displaying sentiment among surveys and opinion polls, prediction markets, online activity, news, social media conversations, metadata tags, and Internet search activity concerning current or future economic or financial conditions, quantities or states, asset prices or companies or company earnings, in comparison to sentiment concerning another topic in terms of current or future economic or financial conditions, quantities or states, or asset prices, or companies or company earnings. Additionally, such a system may comprise displaying sentiment among online social media conversations, metadata tags, and Internet search query activity concerning current or future economic or financial conditions, quantities or states, or asset prices, or company earnings, in comparison to the consensus view of current or future economic conditions or asset prices, or company earnings, or for a particular company's earnings vs. consensus earnings from professional stock analysts.

Such a system may further comprise displaying how sentiment concerning any user-configurable measure of current or future economic or financial conditions, quantities or states, or asset prices or company earnings, based on quantity measured, geography, demography etc. trends over a user-configurable time period, wherein said measure includes conversations, news or search queries about job availability or other economic conditions in a geographical area of the United States such as a state or municipality or zip code over a previous number of months.

It is understood that such a system may further comprise a graphical user interface that allows a user to configure parameters, such as a wizard which prompts the user to set parameters by which the system calculates, delivers, and displays a sentiment metric for such a user-configurable measure. In addition, such a system may further comprise displaying an overall frequency of surveys or opinion poll results, or occurrence or volume of social media conversations, metadata tags, or Internet search queries concerning current or future economic or financial conditions, quantities or states, asset prices or company earnings, per unit of time. Similarly, such a system may further comprise displaying an overall frequency of occurrence or volume of social media conversations, metadata tags, or Internet search queries concerning current or future economic or financial conditions, quantities or states, or asset prices (or company earnings, etc.) per geographic region.

Finally, such a system may further comprise displaying an overall frequency of survey or opinion poll or prediction market results, or occurrence or volume of social media conversations, metadata tags, or Internet search queries concerning current or future economic or financial conditions, quantities or states, or asset prices (or company earnings, etc.) per demographic group.

To further concretize the above discussion, a set of examples is next described. The examples illustrate exemplary uses of various exemplary embodiments of the present invention.

Example 3—Sentiment Regarding a Stock and Metric to Predict Earnings Surprises And Derivatives Thereon This example relates to the use of social media data, metadata, Internet search data, and Internet activity data in combination with company financial and analyst expectations data to determine a metric to predict earnings surprises, and use such a metric to bet on probability that earnings expectations will be met. A combination of "soft" and "hard" data can be used to try to create an indicator estimating the probability that a public company will have a positive or negative earnings surprise when quarterly earnings are announced. In this case a composite indicator can be created by combining data items such as: (1) the monthly growth rate of Facebook likes for the company; (2) the ratio of negative words to total words on a post regarding the company on an investing website such as Seeking Alpha; (3) the number of Twitter mentions; (4) the number of Google searches for information related to the company; (5) the dispersion of analyst estimates from I/B/E/S; (6) the number of analyst upgrades versus total number of analyst recommendations on I/B/E/S; (7) the percentage of times in the past that a company has reported an earnings surprise in the history of reporting its earnings; (8) the percent distance the stock price is above or below its 50-day moving average; (9) the growth rate of the company's Free Cash Flow; and (10) the growth rate of the company's revenues relative to the average growth rate of competitor companies in the same industry. A linear combination of such data could thus take the form:

ESI (Earnings surprise indicator)=0.05 Facebook Likes+0.25 Seeking Alpha Sentiment+0.05 Twitter Sentiment+0.15 Google Searches+0.05 dispersion+0.05 upgrades+0.10 past surprise ratio+0.10 distance from moving average+0.10 FCF growth+0.10 relative revenue growth It is understood that the weights in the above linear combination example are for illustrative purposes only. Such a synthetic variable, or tracking index, can be created for any public company that trades on any stock exchange anywhere in the world.

Moreover, derivative instruments can be created on the earnings surprise indicator to allow betting on the probability that a company will report earnings that deviate (either positively or negatively) from consensus expectations. Similarly, an Exchange Traded Fund or other financial instruments can be created to track the value of the index. This can give financial market participants the possibility of betting only on the earnings component, and abstracting away from other factors which can complicate the valuation of an equity security, such as litigation risk or unfunded pension liabilities.

An example ESI generation can, for example, operate as follows:

1. Identify data sources:

| | |
|---|---|
| FACE | Growth rate of Facebook likes |
| SEEK | Ratio of negative words to total words on Seeking Alpha |
| TWIT | Number of mentions on Twitter |
| GOOG | Number of keyword searches on Google |
| DISP | Dispersion of analyst estimates |
| UPDN | Number of analyst upgrades |
| SURP | Past Earnings surprise ratio |
| DMAV | Distance from moving average |

FCFG Free cash flow growth
RREV Relative revenue growth
2. Select data period for calculation and gather data:

| | | | FACE | SEEK | TWIT | GOOG | DISP | UPDN |
|---|---|---|---|---|---|---|---|---|
| June 2007 | t = | 1 | 12.036676 | 4.66257798 | 11.3198812 | −3.7063772 | −9.8280105 | −15.078582 |
| July 2007 | t = | 2 | 13.2370786 | −7.6503095 | −6.8821552 | 8.20129732 | 5.54767731 | 16.4067155 |
| August 2007 | t = | 3 | −8.2455515 | −4.6910248 | −5.6912602 | −1.1098409 | 6.88852509 | −44.337855 |
| September 2007 | t = | 4 | −15.562007 | 0.2466599 | 1.25353427 | 3.51998477 | 9.11561743 | 17.562371 |
| October 2007 | t = | 5 | 19.6989406 | −0.4113494 | −3.2049607 | −3.63147 | −10.283101 | −3.3860183 |
| November 2007 | t = | 6 | −1.3650045 | 3.33679826 | 7.17743135 | 5.35778514 | −3.2967545 | 7.89294996 |
| December 2007 | t = | 7 | 2.42795242 | 13.021114 | 13.2223943 | −1.8349429 | 2.25048658 | 11.3706494 |
| January 2008 | t = | 8 | −4.0049679 | −12.059821 | −16.143157 | 3.75113837 | 9.26062444 | −44.448301 |
| February 2008 | t = | 9 | −4.0246811 | −6.1229989 | 3.47887816 | 1.9937026 | 3.98738689 | 37.4396157 |
| March 2008 | t = | 10 | 9.84625292 | 1.2469147 | −6.5613245 | 0.20816858 | −3.0099282 | 12.3024427 |
| April 2008 | t = | 11 | −16.974851 | 0.57799333 | −4.4567581 | −25.68701 | −21.02799 | −10.802569 |
| May 2008 | t = | 12 | −11.214799 | −3.2520772 | 3.67507408 | −14.163549 | 7.19794791 | −6.5825925 |
| June 2008 | t = | 13 | −3.7938642 | −2.1264437 | −3.9774639 | 13.4072915 | −5.9244944 | 6.81187706 |
| July 2008 | t = | 14 | 5.0738735 | −1.3786325 | 2.00331264 | 8.57101582 | 8.32967312 | −23.722505 |
| August 2008 | t = | 15 | −9.1007275 | 2.23321499 | 2.65837085 | −3.1206393 | −10.888651 | 11.504696 |
| September 2008 | t = | 16 | 11.055463 | 4.85311768 | 1.1649761 | −2.9457477 | −0.7194807 | −12.87601 |

| | | | | | | | |
|---|---|---|---|---|---|---|---|
| October 2008 | t = | 17 | −1.8389678 | −1.737174 | −4.5211453 | 5.94768075 | 3.84062224 | 17.678373 |
| November 2008 | t = | 18 | 2.86253345 | −1.5069244 | 3.74560754 | 4.66902564 | 7.50236407 | −20.182231 |
| December 2008 | t = | 19 | 5.22327938 | 0.42027242 | 1.45051436 | −4.6690256 | −1.3335584 | −6.9121608 |
| January 2009 | t = | 20 | 25.0171885 | 6.63299454 | 3.79386417 | 5.24151192 | 6.79557713 | −7.5955906 |
| February 2009 | t = | 21 | −14.027539 | −11.851506 | −7.2028501 | −1.1473994 | −4.2729256 | −7.8806615 |
| March 2009 | t = | 22 | 14.5703892 | 2.33463757 | −1.3879545 | 4.19774756 | 13.6298631 | −23.638235 |
| April 2009 | t = | 23 | 5.74567317 | −1.7254915 | 9.61577672 | 5.25901623 | 2.47556443 | 25.6109505 |
| May 2009 | t = | 24 | 6.42316721 | 4.02061901 | 4.11422246 | 2.13246217 | 2.6604703 | −7.7231295 |
| June 2009 | t = | 25 | −0.165191 | −4.5425765 | −9.8983425 | −12.398221 | −5.7321755 | 20.7827318 |
| July 2009 | t = | 26 | −11.913385 | 6.21797525 | 0.86906399 | 1.61319251 | −8.6333924 | 21.6031528 |
| August 2009 | t = | 27 | 11.3336271 | 11.7173594 | 11.7043515 | 2.72159902 | 9.22953318 | −0.379716 |
| September 2009 | t = | 28 | −1.8384013 | −16.720544 | −3.8508611 | 7.10796838 | 2.94201992 | 8.59430111 |
| October 2009 | t = | 29 | 6.4085213 | 7.64150335 | 6.5607649 | −5.3234453 | 1.15916774 | −12.842887 |
| November 2009 | t = | 30 | −0.3213788 | 6.06767276 | 2.57191905 | 2.41599879 | 7.1928995 | 3.3584257 |

| | | | | SURP | DMAV | FCFG | RREV |
|---|---|---|---|---|---|---|---|
| June 2007 | t = | 1 | | 9.20565821 | 12.036676 | 11.3198812 | 4.66257798 |
| July 2007 | t = | 2 | | 14.4586042 | 13.2370786 | −6.8821552 | −7.6503095 |
| August 2007 | t = | 3 | | −26.645081 | −8.2455515 | −5.6912602 | −4.6910248 |
| September 2007 | t = | 4 | | 4.78312847 | −15.562007 | 0.2466599 | 1.25353427 |
| October 2007 | t = | 5 | | 19.5567107 | 19.6989406 | −0.4113494 | −3.2049607 |
| November 2007 | t = | 6 | | 9.53764604 | −1.3650045 | 3.33679826 | 7.17743135 |
| December 2007 | t = | 7 | | 2.77062407 | 2.42795242 | 13.021114 | 13.2223943 |
| January 2008 | t = | 8 | | −9.4327885 | −4.0049679 | −16.143157 | −12.059821 |
| February 2008 | t = | 9 | | −14.8171 | −4.0246811 | 3.47887816 | −6.1229989 |
| March 2008 | t = | 10 | | 7.81068604 | 9.84625292 | 1.2469147 | −6.5613245 |
| April 2008 | t = | 11 | | −2.1136293 | −16.974851 | −4.4567581 | 0.57799333 |
| May 2008 | t = | 12 | | −44.783562 | −11.214799 | 3.67507408 | −3.2520772 |
| June 2008 | t = | 13 | | 0.14105233 | −3.7938642 | −2.1264437 | −3.9774639 |
| July 2008 | t = | 14 | | −10.702895 | 5.0738735 | −1.3786325 | 2.00331264 |
| August 2008 | t = | 15 | | 1.21498506 | −9.1007275 | 2.23321499 | 2.65837085 |
| September 2008 | t = | 16 | | 2.39779594 | 11.055463 | 4.85311768 | 1.1649761 |
| October 2008 | t = | 17 | | 7.09011377 | −1.8389678 | −1.737174 | −4.5211453 |
| November 2008 | t = | 18 | | 4.43791907 | 2.86253345 | −1.5069244 | 3.74560754 |
| December 2008 | t = | 19 | | 9.73843359 | 5.22327938 | 0.42027242 | 1.45051436 |
| January 2009 | t = | 20 | | 19.5937134 | 25.0171885 | 6.63299454 | 3.79386417 |
| February 2009 | t = | 21 | | 14.9688828 | −14.027539 | −11.851506 | −7.2028501 |
| March 2009 | t = | 22 | | 0.39310694 | 14.5703892 | 2.33463757 | −1.3879545 |
| April 2009 | t = | 23 | | 16.7784397 | 5.74567317 | −1.7254915 | 9.61577672 |
| May 2009 | t = | 24 | | 5.85508766 | 6.42316721 | 4.02061901 | 4.11422246 |
| June 2009 | t = | 25 | | 6.24871429 | −0.165191 | −4.5425765 | −9.8983425 |
| July 2009 | t = | 26 | | −4.0246811 | −11.913385 | 6.21797525 | 0.86906399 |
| August 2009 | t = | 27 | | 7.77915753 | 11.3336271 | 11.7173594 | 11.7043515 |
| September 2009 | t = | 28 | | −4.4701604 | −1.8384013 | −16.720544 | −3.8508611 |
| October 2009 | t = | 29 | | 6.61321314 | 6.4085213 | 7.64150335 | 6.5607649 |
| November 2009 | t = | 30 | | 0.3034046 | −0.3213788 | 6.06767276 | 2.57191905 |

3. Select starting window to begin calculation, on data spanning t=1 to t=20:

| | | | FACE | SEEK | TWIT | GOOG | DISP | UPDN |
|---|---|---|---|---|---|---|---|---|
| June 2007 | t = | 1 | 12.036676 | 4.66257798 | 11.3198812 | −3.7063772 | −9.8280105 | −15.078582 |
| July 2007 | t = | 2 | 13.2370786 | −7.6503095 | −6.8821552 | 8.20129732 | 5.54767731 | 16.4067155 |
| August 2007 | t = | 3 | −8.2455515 | −4.6910248 | −5.6912602 | −1.1098409 | 6.88852509 | −44.337855 |
| September 2007 | t = | 4 | −15.562007 | 0.2466599 | 1.25353427 | 3.51998477 | 9.11561743 | 17.562371 |
| October 2007 | t = | 5 | 19.6989406 | −0.4113494 | −3.2049607 | −3.63147 | −10.283101 | −3.3860183 |
| November 2007 | t = | 6 | −1.3650045 | 3.33679826 | 7.17743135 | 5.35778514 | −3.2967545 | 7.89294996 |
| December 2007 | t = | 7 | 2.42795242 | 13.021114 | 13.2223943 | −1.8349429 | 2.25048658 | 11.3706494 |
| January 2008 | t = | 8 | −4.0049679 | −12.059821 | −16.143157 | 3.75113837 | 9.26062444 | −44.448301 |
| February 2008 | t = | 9 | −4.0246811 | −6.1229989 | 3.47887816 | 1.9937026 | 3.98738689 | 37.4396157 |
| March 2008 | t = | 10 | 9.84625292 | 1.2469147 | −6.5613245 | 0.20816858 | −3.0099282 | 12.3024427 |
| April 2008 | t = | 11 | −16.974851 | 0.57799333 | −4.4567581 | −25.68701 | −21.02799 | −10.802569 |
| May 2008 | t = | 12 | −11.214799 | −3.2520772 | 3.67507408 | −14.163549 | 7.19794791 | −6.5825925 |
| June 2008 | t = | 13 | −3.7938642 | −2.1264437 | −3.9774639 | 13.4072915 | −5.9244944 | 6.81187706 |
| July 2008 | t = | 14 | 5.0738735 | −1.3786325 | 2.00331264 | 8.57101582 | 8.32967312 | −23.722505 |
| August 2008 | t = | 15 | −9.1007275 | 2.23321499 | 2.65837085 | −3.1206393 | −10.888651 | 11.504696 |
| September 2008 | t = | 16 | 11.055463 | 4.85311768 | 1.1649761 | −2.9457477 | −0.7194807 | −12.87601 |

-continued

| | | | | | | | |
|---|---|---|---|---|---|---|---|
| October 2008 | t = | 17 | −1.8389678 | −1.737174 | −4.5211453 | 5.94768075 | 3.84062224 | 17.678373 |
| November 2008 | t = | 18 | 2.86253345 | −1.5069244 | 3.74560754 | 4.66902564 | 7.50236407 | −20.182231 |
| December 2008 | t = | 19 | 5.22327938 | 0.42027242 | 1.45051436 | −4.6690256 | −1.3335584 | −6.9121608 |
| January 2009 | t = | 20 | 25.0171885 | 6.63299454 | 3.79386417 | 5.24151192 | 6.79557713 | −7.5955906 |

| | | | SURP | DMAV | FCFG | RREV |
|---|---|---|---|---|---|---|
| June 2007 | t = | 1 | 9.20565821 | 12.036676 | 4.66257798 | 11.3198812 |
| July 2007 | t = | 2 | 14.4586042 | 13.2370786 | −7.6503095 | −6.8821552 |
| August 2007 | t = | 3 | −26.645081 | −8.2455515 | −4.6910248 | −5.6912602 |
| September 2007 | t = | 4 | 4.78312847 | −15.562007 | 0.2466599 | 1.25353427 |
| October 2007 | t = | 5 | 19.5567109 | 19.6989406 | −0.4113494 | −3.2049607 |
| November 2007 | t = | 6 | 9.53764604 | −1.3650045 | 3.33679826 | 7.17743135 |
| December 2007 | t = | 7 | 2.77062407 | 2.42795242 | 13.021114 | 13.2223943 |
| January 2008 | t = | 8 | −9.4327885 | −4.0049679 | −12.059821 | −16.143157 |
| February 2008 | t = | 9 | −14.8171 | −4.0246811 | −6.1229989 | 3.47887816 |
| March 2008 | t = | 10 | 7.81068604 | 9.84625292 | 1.2469147 | −6.5613245 |
| April 2008 | t = | 11 | −2.1136293 | −16.974851 | 0.57799333 | −4.4567581 |
| May 2008 | t = | 12 | −44.783562 | −11.214799 | −3.2520772 | 3.67507408 |
| June 2008 | t = | 13 | 0.14105233 | −3.7938642 | −2.1264437 | −3.9774639 |
| July 2008 | t = | 14 | −10.702895 | 5.0738735 | −1.3786325 | 2.00331264 |
| August 2008 | t = | 15 | 1.21498506 | −9.1007275 | 2.23321499 | 2.65837085 |
| September 2008 | t = | 16 | 2.39779594 | 11.055463 | 4.85311768 | 1.1649761 |
| October 2008 | t = | 17 | 7.09011377 | −1.8389678 | −1.737174 | −4.5211453 |
| November 2008 | t = | 18 | 4.43791907 | 2.86253345 | −1.5069244 | 3.74560754 |
| December 2008 | t = | 19 | 9.73843359 | 5.22327938 | 0.42027242 | 1.45051436 |
| January 2009 | t = | 20 | 19.5937134 | 25.0171885 | 6.63299454 | 3.79386417 |

4. Calculate a correlation matrix (not shown) and apply signal extraction algorithm to data from t=1 to t=20 to obtain initial values, ie., a set of initial weights at t=20:

| Earnings Surprise Indicator |
|---|
| January 2009  t = 20  ESI = 0.21  TWIT 0.17  FACE 0.15  SEEK 0.14  DISP 0.11  DMAV 0.09  GOOG 0.07  RREV 0.03  FCFG |
| January 2009  t = 20  ESI = 0.21  0.02  UPDN  0.01  SURP |

5. Perform calculation and obtain value of ERI at t=20:

| Earnings Surprise Index Calculation |
|---|
| January 2009 t = 20 SRI = (0.21 * 3.794) + (0.17* 25.02) + (0.15 * 6.633) + (0.14 * 6.796) + (0.11 * 25.02) + (0.09 * 5.242) + (0.07 * 3.79) + (0.03 * 6.633) + (0.02 * −7.6) + (0.01 * 19.59) = 10.728176 |

6. Repeat at t=21, obtain a new set of weights from data spanning t=1 to t=21:

| | | | FACE | SEEK | TWIT | GOOG | DISP | UPDN |
|---|---|---|---|---|---|---|---|---|
| June 2007 | t = | 1 | 12.036676 | 4.66257798 | 11.3198812 | −3.7063772 | −9.8280105 | −15.078582 |
| July 2007 | t = | 2 | 13.2370786 | −7.6503095 | −6.8821552 | 8.20129732 | 5.54767731 | 16.4067155 |
| August 2007 | t = | 3 | −8.2455515 | −4.6910248 | −5.6912602 | −1.1098409 | 6.88852509 | −44.337855 |
| September 2007 | t = | 4 | −15.562007 | 0.2466599 | 1.25353427 | 3.51998477 | 9.11561743 | 17.562371 |
| October 2007 | t = | 5 | 19.6989406 | −0.4113494 | −3.2049607 | −3.63147 | −10.283101 | −3.3860183 |
| November 2007 | t = | 6 | −1.3650045 | 3.33679826 | 7.17743135 | 5.35778514 | −3.2967545 | 7.89294996 |
| December 2007 | t = | 7 | 2.42795242 | 13.021114 | 13.2223943 | −1.8349429 | 2.25048658 | 11.3706494 |
| January 2008 | t = | 8 | −4.0049679 | −12.059821 | −16.143157 | 3.75113837 | 9.26062444 | −44.448301 |
| February 2008 | t = | 9 | −4.0246811 | −6.1229989 | 3.47887816 | 1.9937026 | 3.98738689 | 37.4396157 |
| March 2008 | t = | 10 | 9.84625292 | 1.2469147 | −6.5613245 | 0.20816858 | −3.0099282 | 12.3024427 |
| April 2008 | t = | 11 | −16.974851 | 0.57799333 | −4.4567581 | −25.68701 | −21.02799 | −10.802569 |
| May 2008 | t = | 12 | −11.214799 | −3.2520772 | 3.67507408 | −14.163549 | 7.19794791 | −6.5825925 |
| June 2008 | t = | 13 | −3.7938642 | −2.1264437 | −3.9774639 | 13.4072915 | −5.9244944 | 6.81187706 |
| July 2008 | t = | 14 | 5.0738735 | −1.3786325 | 2.00331264 | 8.57101582 | 8.32967312 | −23.722505 |

-continued

| | | | | | | | |
|---|---|---|---|---|---|---|---|
| August 2008 | t = | 15 | −9.1007275 | 2.23321499 | 2.65837085 | −3.1206393 | −10.888651 | 11.504696 |
| September 2008 | t = | 16 | 11.055463 | 4.85311768 | 1.1649761 | −2.9457477 | −0.7194807 | −12.87601 |
| October 2008 | t = | 17 | −1.8389678 | −1.737174 | −4.5211453 | 5.94768075 | 3.84062224 | 17.678373 |
| November 2008 | t = | 18 | 2.86253345 | −1.5069244 | 3.74560754 | 4.66902564 | 7.50236407 | −20.182231 |
| December 2008 | t = | 19 | 5.22327938 | 0.42027242 | 1.45051436 | −4.6690256 | −1.3335584 | −6.9121608 |
| January 2009 | t = | 20 | 25.0171885 | 6.63299454 | 3.79386417 | 5.24151192 | 6.79557713 | −7.5955906 |
| February 2009 | t = | 21 | −14.027539 | −11.851506 | −7.2028501 | −1.1473994 | −4.2729256 | −7.8806615 |

| | | | SURP | DMAV | FCFG | RREV |
|---|---|---|---|---|---|---|
| June 2007 | t = | 1 | 9.20565821 | 12.036676 | 4.66257798 | 11.3198812 |
| July 2007 | t = | 2 | 14.4586042 | 13.2370786 | −7.6503095 | −6.8821552 |
| August 2007 | t = | 3 | −26.645081 | −8.2455515 | −4.6910248 | −5.6912602 |
| September 2007 | t = | 4 | 4.78312847 | −15.562007 | 0.2466599 | 1.25353427 |
| October 2007 | t = | 5 | 19.5567109 | 19.6989406 | −0.4113494 | −3.2049607 |
| November 2007 | t = | 6 | 9.53764604 | −1.3650045 | 3.33679826 | 7.17743135 |
| December 2007 | t = | 7 | 2.77062407 | 2.42795242 | 13.021114 | 13.2223943 |
| January 2008 | t = | 8 | −9.4327885 | −4.0049679 | −12.059821 | −16.143157 |
| February 2008 | t = | 9 | −14.8171 | −4.0246811 | −6.1229989 | 3.47887816 |
| March 2008 | t = | 10 | 7.81068604 | 9.84625292 | 1.2469147 | −6.5613245 |
| April 2008 | t = | 11 | −2.1136293 | −16.974851 | 0.57799333 | −4.4567581 |
| May 2008 | t = | 12 | −44.783562 | −11.214799 | −3.2520772 | 3.67507408 |
| June 2008 | t = | 13 | 0.14105233 | −3.7938642 | −2.1264437 | −3.9774639 |
| July 2008 | t = | 14 | −10.702895 | 5.0738735 | −1.3786325 | 2.00331264 |
| August 2008 | t = | 15 | 1.21498506 | −9.1007275 | 2.23321499 | 2.65837085 |
| September 2008 | t = | 16 | 2.39779594 | 11.055463 | 4.85311768 | 1.1649761 |
| October 2008 | t = | 17 | 7.09011377 | −1.8389678 | −1.737174 | −4.5211453 |
| November 2008 | t = | 18 | 4.43791907 | 2.86253345 | −1.5069244 | 3.74560754 |
| December 2008 | t = | 19 | 9.73843359 | 5.22327938 | 0.42027242 | 1.45051436 |
| January 2009 | t = | 20 | 19.5937134 | 25.0171885 | 6.63299454 | 3.79386417 |
| February 2009 | t = | 21 | 14.9688828 | −14.027539 | −11.851506 | −7.2028501 |

7. Apply signal extraction algorithm and obtain new weights 30 at t=21:

Earnings Surprise Indicator

| | | | | | | | | | | | | | | | |
|---|---|---|---|---|---|---|---|---|---|---|---|---|---|---|---|
| January 2009 | t = 20 | ESI = 0.21 | TWIT | 0.17 | FACE | 0.15 | SEEK | 0.14 | DISP | 0.11 | DMAV | 0.09 | GOOG | 0.07 | RREV |
| February 2009 | t = 21 | ESI = 0.23 | RREV | 0.15 | FCFG | 0.13 | DMAV | 0.12 | SURP | 0.11 | UPDN | 0.08 | DISP | 0.07 | GOOG |

| | | | | | | | | |
|---|---|---|---|---|---|---|---|---|
| January 2009 | t = 20 | ESI = 0.21 | 0.03 | FCFG | 0.02 | UPDN | 0.01 | SURP |
| February 2009 | t = 21 | ESI = 0.23 | 0.06 | TWIT | 0.03 | SEEK | 0.02 | FACE |

8. Perform calculation and obtain Earnings Surprise Indicator at t=21:

Earnings Surprise Index Calculation

January 2009 t = 20 SRI = (0.21 * 3.794) + (0.17 * 25.02) + (0.15 * 6.633) + (0.14 * 6.796) + (0.11 * 25.02) + (0.09 * 5.242) + (0.07 * 3.79) + (0.03 * 6.633) + (0.02 * −7.6) + (0.01 * 19.59) = 10.728176
February 2009 t = 21 SRI = (0.23 * −7.203) + (0.15 * −11.9) + (0.13 * −14) + (0.12 * 14.97) + (0.11 * −7.88) + (0.08 * −4.27) + (0.07 * −1.15) + (0.06 * −7.2) + (0.03 * −11.9) + (0.02 * −14) = −5.8189874

9. And so on at each time period until t=30:

Earnings Surprise Index Calculation

January 2009 t = 20 SRI = (0.21 * 3.794) + (0.17 * 25.02) + (0.15 * 6.633) + (0.14 * 6.796) + (0.11 * 25.02) + (0.09 * 5.242) + (0.07 * 3.79) + (0.03 * 6.633) + (0.02 * −7.6) + (0.01 * 19.59) = 10.728176
February 2009 t = 21 SRI = (0.23 * −7.203) + (0.15 * −11.9) + (0.13 * −14) + (0.12 * 14.97) + (0.11 * −7.88) + (0.08 * −4.27) + (0.07 * −1.15) + (0.06 * −7.2) + (0.03 * −11.9) + (0.02 * −14) = −5.8189874
March 2009 t = 22 SRI = (0.19 * 14.57) + (0.18 * 2.335) + (0.16 * −1.39) + (0.15 * 4.198) + (0.12 * 13.63) + (0.07 * −23.6) + (0.06 * 0.39) + (0.04 * 14.57) + (0.02 * 2.335) + (0.01 * −1.39) = 4.21632044
April 2009 t = 23 SRI = (0.22 * 5.259) + (0.17 * 25.61) + (0.15 * 16.78) + (0.11 * 5.746) + (0.09 * 2.476) + (0.08 * −1.73) 4 (0.07 *

-continued

Earnings Surprise Index Calculation 9.62) + (0.05 * 9.616) + (0.04 * 5.746) + (0.02 * −1.73) = 10.0936069
May 2009 t = 24 SRI = (0.20 * 4.114) + (0.19 * 2.132) + (0.17 * 2.66) + (0.12 * −7.723) + (0.09 * 4.021) + (0.07 * 4.114) + (0.06 * 6.42) + (0.04 * 4.021) + (0.04 * 5.855) + (0.02 * 6.423) = 2.31224965
June 2009 t = 25 SRI = (0.21 * −4.543) + (0.20 * −9.9) + (0.18 * −0.17) + (0.14 * −4.543) + (0.08 * 6.249) + (0.06 * 0.17) + (0.05 * −9.9) + (0.04 * −12.4) + (0.03 * −5.73) + (0.01 * 20.78) = −4.0643029
July 2009 t = 26 SRI = (0.23 * 6.218) + (018 * 0.869) + (0.16 * −11.9) + (0.15 * 6.218) + (0.11 * 0.869) + (0.07 * −11.9) + (0.44 * −8.63) + (0.03 * 21.6) + (0.02 * −4.02) + (0.01 * 1.613) = 0.11317773
August 2009 t = 27 SRI = (0.22 * 7.779) + (018 * 9.23) + (0.15 * 11.7) + (013 * 2.722) + (0.12 * 11.33) + (0.06 * −0.38) + (0.05 * 11.7) + (0.04 * 11.33) + (0.03 * 11.7) + (0.02 * 11.12) = 8.44413429
September 2009 = 28 SRI = (0.20 * 2.942) + (0.18 * −1.84) + (0.17 * 7.108) + (0.14 * −3.851) + (0.11 * −16.7) + (0.07 * −4.47) + (0.05 * 8.59) + (0.04 * −1.84) + (0.03 * −16.7) + (0.01 * −3.85) = −14093912
October 2009 t = 29 SRI = (0.21 * 6.409) + (0.17 * 7.642) + (0.15 * 6.561) + (0.13 * −5.323) + (0.11 * 1.159) + (0.10 * −12.8) + (0.06 * 6.61) + (0.04 * 6.409) + (0.02 * 7.642) + (0.01 * 6.561) = 2.65170299
November 2009 t = 30 SRI = (0.23 * −0.321) + (0.18 * 0.303) + (0.14 * 2.572) + (0.12 * 3.358) + (0.09 * 2.572) + (0.07 * 6.068) + (0.06 * 6.07) + (0.05 * −0.32) + (0.04 * 2.416) + (0.02 * 7.193) = 1.98847462

Example 4 Sentiment Regarding Economic
Conditions in a State for Analysis of a State's
Municipal Bonds To determine whether a state's municipal bonds will increase or decrease in value, an indicator can be created to gauge the real-time health of the state's local economy. A combination of "soft" and "hard" data can thus be used to try to create an indicator of economic health for a given state. Data can include: (1) job availability indicator of the growth rate (for example, the log difference calculated from period to period) of number of help wanted ads in the state from the Conference Board's Help Wanted Ad Index or Wanted Technologies over a period of time; (2) a job availability indicator from the growth rate (for example the log difference calculated from period to period) in the number of job openings mentioned on Twitter in that state over a period of time; (3) the growth rate in the number of job postings listed on Monster.com in that state (4) a measure of the change in resident's satisfaction with the quality of government in that state obtained from an opinion poll conducted by Gallup over a period of time; (5) a measure of the change in consumer's level of income anxiety obtained from answers to questions regarding income expectations from a survey conducted by University of Michigan; (6) the rate of change of tax revenue collection in that state; (7) an index of public mood in the state obtained from emotion keywords on Twitter (for example the ratio of keywords reflecting negative emotions to keywords reflecting positive emotions), (8) a measure of the change in real estate prices obtained from Zillow; (9) the change in the number of Google searches for information about durable goods in that state (for example, the frequency of searches for items such as cars, televisions, washing machines, and other high-ticket items can indicate consumers income expectations and propensity to spend, therefore future tax revenue to the state); and/or (10) change in the state's ratio of total debt to total revenue.

An indicator can thus be created by assigning weights to a linear combination of the data, for example as follows:

SBPI (state bond price indicator)=0.10 Help Wanted+0.10 Twitter jobs+0.10 Monster jobs+ 0.10 government satisfaction+0.10 income anxiety+0.10 tax revenue+0.10 Twitter public mood+0.10 real estate prices+0.10 Google searches+0.10 state debt ratio.

It is understood that the weights in the above linear combination example are for illustrative purposes only. It is further understood that just as this type of synthetic variable can be created to track the health of a state or municipal local economy in the US, it can also be created for any local economy in any country in the world, such as, for example, provinces and territories in Canada, states in Germany, prefectures in Japan, provinces in China, or any other geographic area.

Derivative instruments—futures, options, and options on futures—or other financial instruments can be issued to track the value of the index, allowing financial market participants to speculate on the likelihood of the state's municipal bonds increasing or decreasing in value, i.e., a means to bet on improving or deteriorating economic conditions in that state. Similarly, an Exchange Traded Fund or other financial instruments can also be created to track the value of the index.

Example 7—Sentiment Risk Indicator and Method of Hedging Sentiment Risk

An indicator of sentiment, psychological, or emotion risk in the economy and financial markets can be created by forming a composite indicator of sentiment measures obtained from surveys, opinion polls, prediction markets, internet search query data and social media data. A signal extraction algorithm such as the one described above would be applied to changes in values of certain periodic surveys and opinion polls and prediction markets which measure public (businesses and households or consumers) sentiment regarding their particular economic circumstances and prospects, the circumstances and prospects for the economy in general, and their outlooks on financial markets and business conditions. Surveys such as the Institute for Supply Management Purchasing Managers' Index (ISM), The Philadelphia Federal Reserve Business Outlook Survey (PHIL), University of Michigan Index of Consumer Sentiment (ICS), Conference Board Consumer Confidence Index (CCI), and the Bloomberg consumer comfort index (BBG) are examples of surveys and opinion polls which contain sentiment and forward looking expectations measures. Similarly, a measure of public sentiment can be obtained from social media posts on services such as Twitter (TWIT). Similarly, a measure of public sentiment can be obtained from news headlines and articles by creating a news factor (NEWS). Since Twitter and News are real-time data sources, these sources would theoretically serve to update the overall sentiment risk index in between arrival times of survey and opinion poll and/or prediction market data.

For Twitter, a sentiment score index could be calculated as follows. Suppose measurements are taken at each time t to determine the ratio of negative words to total words found in Tweets related to the economy and financial markets. The change can be calculated by applying the log difference to period t+1 versus time t, that is, by calculating $\ln(X_{t+1}/X_t)$. Multiplying the change by 100 (a Multiplier) produces the TWIT sentiment score index.

| TWIT | Negative | Total | Ratio | Change | Index |
|---|---|---|---|---|---|
| t = 1 | 32486 | 45998 | 0.7062481 | | |
| t = 2 | 35132 | 56224 | 0.62485771 | −0.1224426 | −12.244263 |
| t = 3 | 42332 | 59887 | 0.70686459 | 0.12331516 | 12.3315164 |
| t = 4 | 40665 | 65231 | 0.62339992 | −0.1256509 | −12.565089 |
| t = 5 | 39887 | 62991 | 0.63321744 | 0.01562564 | 1.56256417 |
| t = 6 | 41232 | 60865 | 0.67743366 | 0.06749776 | 6.74977598 |
| t = 7 | 32869 | 61543 | 0.53408186 | −0.2377625 | −23.776251 |
| t = 8 | 29663 | 58943 | 0.5032489 | −0.0594642 | −5.9464244 |
| t = 9 | 31987 | 57654 | 0.55480973 | 0.09754034 | 9.7540339 |
| t = 10 | 30443 | 61443 | 0.49546734 | −0.1131238 | −11.312377 |

For example, a sentiment measure from Twitter could be calculated, by determining the ratio of positive or negative words to total words, related to topics such as the economy and financial markets. The TWIT sentiment score index would represent the percent change from period to period in the ratio of negative words to total words. A similar technique could be employed to construct a NEWS factor. Sentiment factors from TWIT, NEWS, and other real-time sources could theoretically be calculated to have any frequency from real-time, to hourly, to daily, weekly, monthly, etc. For ease of exposition, the following example considers a monthly factor.

It is also understood that in similar fashion, methods to create TWIT could produce a sentiment score from one or more of the following:

(i) the fraction of positive or negative words to total words,
(ii) how many times each occurrence of the terms or phrases of interest appears in a social media conversation or Internet search query log, (iii) number of keywords expressing sentiment about the terms or phrases of interest in the set of keywords,
(iv) whether each keyword reflects a positive, negative, or neutral sentiment about the subject matter of interest, and
(v) relevance of the keywords expressing sentiment about the terms or phrases of interest.

It is also understood that such a sentiment metric may be obtained by harvesting data obtained from online content, wherein said harvesting includes using a conversation monitoring module to collect web content to generate a real-time database of social media and web conversations related to current or future economic or financial conditions, quantities or states, or asset prices, wherein said conversation monitoring module utilizes a crawler. Such a system for analyzing social media postings on the Internet, comprises a conversation monitoring module, said module having an associated crawler, wherein, in operation, said module generates a conversation index of social media related to current or future economic or financial conditions, quantities or states, or asset prices, wherein said current or future economic or financial conditions, quantities or states, or asset prices include earnings surprises, company earnings and stock prices, and further comprising using a social media analysis module to generate a sentiment or tone factor that measures at least one of positive words, negative words, and a ratio of negative to positive words or total words used in a conversation, wherein said social media includes blogs, wikis, online communities, and other social interaction platforms. Such a system further comprises using a social media analysis module that implements a scoring algorithm to determine which media source has the best track record in terms of predicting current or future economic or financial conditions, quantities or states, or asset prices or company earnings.

It is also noted that internet search query data may be utilized to create a real-time proxy for a given survey. For example, in the case of the University of Michigan Index of Consumer Sentiment, internet search queries performed on a search engine such as Google for information related to certain items such as durable goods can be used as a real-time proxy for the Michigan ICS questions regarding household expectations for purchasing durable goods in the near future.

A composite index can be formed by applying a signal extraction algorithm to identify the common element among the various sentiment measures. A weight $w_i$ can be determined for each of the data sources, and a composite index can be formed as follows:

SRI(Sentiment Risk Index)=$w_1$ISM+$w_2$PHIL+ $w_3$ICS+$w_4$CCI+$w_5$BBG+$w_6$TWIT+$w_7$NEWS Alternatively, $$\sum_{i=1}^{n} w_i P_i^* M + S = SRI_{(Sentiment\ Risk\ Index)}$$

where $w_i$ are weights, $P_i$ are investor or consumer psychology or sentiment measures, M is a multiplier, and S is a scalar. It is understood that the multiplier M and scalar S may take on any value, including 1 and 0, respectively. It is understood that such weights can range in value between −1 and 1, and collectively sum to a fixed number.

Alternatively, a Sentiment Risk Index can be calculated as a counterpart to any benchmark financial market index. For example, a sentiment risk index for the S&P500 could be calculated as follows:

Let $w_{xi}$ represent the market capitalization weight of stock $X_i$ which is the i-th index component in the S&P500 index. That is, let $$w_{xi} = \frac{P_{xi} F_{xi}}{\sum_{i=1}^{500} P_{xi} F_{xi}}$$

where
$P_{xi}$=Price of stock $X_i$, the i-th index component
$F_{xi}$=Float-adjusted shares outstanding of stock $X_i$, the i-th index component Then an index of sentiment risk for the S&P500 can be calculated as follows:

$$SRI_{S\&P} = \sum_{i=1}^{500} w_{xi} \sum_{j=1}^{n} w_{xj} S_{xi} P_{xi} * M + C$$

where $w_{xi}$, are index weights, $S_{xi}$ are any of j sentiment measures for security x whereby such weights for the sentiment measures can be between −1 and 1 inclusively and must collectively sum to a fixed number, M is a multiplier and C is a constant scalar. It is understood that the multiplier M and scalar C may take on any value, including 1 and 0, respectively. This equation illustrates a double-weighting procedure.

Since the S&P500 is calculated in real-time, the Sentiment Risk Index for the S&P500 can also be calculated in real-time.

A similar construction can be used for a Sentiment Risk Index for the Dow Jones Industrial Average (DJIA), which is a price-weighted index whereby the sum of the component stock prices for each stock $X_i$ is divided by a Divisor, d, which adjusts the index for stock splits, spinoffs, and other structural changes. Thus, the DJIA is calculated as $$DJIA = \frac{\sum_{i=1}^{30} P_{xi}}{d}$$

The current value of the divisor is d=0.132129493

In this case, the Sentiment Risk Index for the DJIA is given by:

$$SRI_{DOW} = \frac{\sum_{i=1}^{30} S_{xi} * P_{xi}}{d}$$

Since the DJIA is calculated in real-time, the Sentiment Risk Index for the DJIA can also be calculated in real-time.

Derivative instruments—futures, options, and options on futures—or any other financial instrument can be issued to track the value of each underlying survey and opinion poll and social media and news sentiment metric, allowing financial market participants to speculate on the value of an upcoming survey or opinion poll or prediction market outcome or the direction of the sentiment social media or news metric. Similarly, futures, options, and options on futures or an Exchange Traded Fund or any other financial instrument can be created to track the value of the composite sentiment risk index. As the price of each underlying contract on a survey or opinion poll or social media metric changes, the composite sentiment risk index would also change value in real time as the prices of the underlying contracts change. Derivative instruments—futures, options, and options on futures—or an ETF or other financial instruments, can be issued to track the value of the composite sentiment risk index, providing market participants with a method to hedge overall emotion or sentiment or confidence risk in financial markets or in a portfolio, that is the sensitivity of asset prices to sudden shifts in public sentiment and levels of general optimism or pessimism regarding the economy or financial markets. That is, a way to hedge the purely psychological component—levels of greed and fear—of financial markets.

It is also noted that derivative instruments may be issued on any of the individual elements comprising the composite metric. That is, derivative instruments may be issued on the outcomes of surveys and opinion polls and prediction markets wherein said instruments include at least one of futures, options, options on futures, and ETFs and other financial instruments. Similarly, derivative instruments may be issued on at least one of the sentiment or frequency of keyword mentions on social media data such as Twitter or Facebook, and the sentiment or public mood obtained from social media data, wherein said instruments include at least one of futures, options, options on futures, and ETFs and other financial instruments. Likewise, derivative instruments may be issued on the frequency of keywords in search query data such as Google, Yahoo, and Bing, wherein said instruments include at least one of futures, options, options on futures, and ETFs and other financial instruments. Finally, Derivative instruments may be issued on social media and news sentiment metrics, wherein said instruments include at least one of futures, options, options on futures, and ETFs and other financial instruments.

Example Calculation

Suppose, for example, we have the following data representing monthly changes (calculated by the log differences) in the values for ISM, PHIL, ICS, CCI, BBG, TWIT, and NEWS. Note that other information can also be included such as prediction market data or macroeconomic measures or indicators.

|  | ISM | PHIL | ICS | CCI | BBG | TWIT | NEWS |
| --- | --- | --- | --- | --- | --- | --- | --- |
| Jun-07 t = 1 | 8.88 | 3.44 | 8.35 | −2.73 | −7.25 | −11.12 | 6.79 |
| Jul-07 t = 2 | 9.76 | −5.64 | −5.07 | 6.05 | 4.09 | 12.10 | 10.66 |
| Aug-07 t = 3 | −6.08 | −3.46 | −4.20 | 0.82 | 5.08 | −32.69 | −19.65 |
| Sep-07 t = 4 | −11.47 | 0.18 | 0.92 | 2.60 | 6.72 | 12.95 | 3.53 |
| Oct-07 t = 5 | 14.52 | −0.30 | −2.36 | −2.68 | −7.58 | −2.50 | 14.42 |
| Nov-07 t = 6 | −1.01 | 2.46 | 5.29 | 3.95 | −2.43 | 5.82 | 7.03 |
| Dec-07 t = 7 | 1.79 | 9.60 | 9.75 | −1.35 | 1.66 | 8.38 | 2.04 |
| Jan-08 t = 8 | −2.95 | −8.89 | −11.90 | 2.77 | 6.83 | −32.77 | −6.96 |
| Feb-08 t = 9 | −2.97 | −4.51 | 2.57 | 1.47 | 2.94 | 27.61 | −10.93 |
| Mar-08 t = 10 | 7.26 | 0.92 | −4.84 | 0.15 | −2.22 | 9.07 | 5.76 |
| Apr-08 t = 11 | −12.52 | 0.43 | −3.29 | −18.94 | −15.50 | −7.97 | −1.56 |
| May-08 t = 12 | −8.27 | −2.40 | 2.71 | −10.44 | 5.31 | −4.85 | −33.02 |
| Jun-08 t = 13 | −2.80 | −1.57 | −2.93 | 9.89 | −4.37 | 5.02 | 0.10 |
| Jul-08 t = 14 | 3.74 | −1.02 | 1.48 | 6.32 | 6.14 | −17.49 | −7.89 |
| Aug-08 t = 15 | −6.71 | 1.65 | 1.96 | −2.30 | −8.03 | 8.48 | 0.90 |
| Sep-08 t = 16 | 8.15 | 3.58 | 0.86 | −2.17 | −0.53 | −9.49 | 1.77 |
| Oct-08 t = 17 | −1.36 | −1.28 | −3.33 | 4.39 | 2.83 | 13.04 | 5.23 |
| Nov-08 t = 18 | 2.11 | −1.11 | 2.76 | 3.44 | 5.53 | −14.88 | 3.27 |
| Dec-08 t = 19 | 3.85 | 0.31 | 1.07 | −3.44 | −0.98 | −5.10 | 7.18 |
| Jan-09 t = 20 | 18.45 | 4.89 | 2.30 | 3.36 | 5.01 | −5.60 | 14.45 |
| Feb-09 t = 21 | −10.34 | −8.74 | −5.31 | −0.85 | −3.15 | −5.81 | 11.04 |
| Mar-09 t = 22 | 10.74 | 1.72 | −1.02 | 3.10 | 10.05 | −17.43 | 0.29 |
| Apr-09 t = 23 | 4.24 | −1.27 | 7.09 | 3.88 | 1.83 | 18.88 | 12.37 |
| May-09 t = 24 | 4.74 | 2.96 | 3.03 | 1.57 | 1.96 | −5.69 | 4.32 |
| Jun-09 t = 25 | −0.12 | −3.35 | −7.30 | −9.14 | −4.23 | 15.32 | 4.61 |
| Jul-09 t = 26 | −8.78 | 4.58 | 0.64 | 1.19 | −6.37 | 15.93 | −2.97 |
| Aug-09 t = 27 | 8.36 | 8.64 | 8.63 | 2.01 | 6.81 | −0.28 | 5.74 |
| Sep-09 t = 28 | −1.36 | −12.33 | −2.84 | 5.24 | 2.17 | 6.34 | −3.30 |
| Oct-09 t = 29 | 4.73 | 5.63 | 4.84 | −3.93 | 0.85 | −9.47 | 4.88 |
| Nov-09 t = 30 | −0.24 | 4.47 | 1.90 | 1.78 | 5.30 | 2.48 | 0.22 |

Suppose the MPCA-KF algorithm described above is applied, and assuming for ease of exposition that the data items arrive simultaneously at each successive time period. The first 20 observations are utilized as a ramp-up period and a set of initial weights, summing to 1, are calculated at $t=20$ based on the correlation matrix, a standard correlation matrix with values bounded between −1 and 1. A standard correlation matrix is obtained for the 20-month period covering June 2007 to January 2009:

| Correlation Matrix Jun. 2007 - Jan. 2009 | | | | | | | |
|---|---|---|---|---|---|---|---|
| | ISM | PHIL | ICS | CCI | BBG | TWIT | NEWS |
| ISM | 1 | 0.280055 | 0.125079 | 0.329044 | 0.046757 | −0.031162 | 0.610783 |
| PHIL | 0.280055 | 1 | 0.751053 | −0.169945 | −0.313332 | 0.20769 | 0.38833 |
| ICS | 0.125079 | 0.751053 | 1 | −0.089229 | −0.083228 | 0.281934 | 0.077864 |
| CCI | 0.329044 | −0.169945 | −0.089229 | 1 | 0.536445 | 0.150346 | 0.297538 |
| NG | 0.046757 | −0.313332 | −0.083228 | 0.536445 | 1 | −0.138821 | −0.30494 |
| TWIT | −0.031162 | 0.20769 | 0.281934 | 0.150346 | −0.138821 | 1 | 0.28608 |
| NEWS | 0.610783 | 0.38833 | 0.077864 | 0.297538 | −0.30494 | 0.28608 | 1 |

An eigendecomposition can then be performed on the $t=20$ correlation matrix and the following weights can be thus obtained:

| Sentiment Risk Index Calculation |
|---|
| January 2009 t = 20 SRI = 0.39 PHIL 0.18 ISM 0.14 BBG 0.11 TWIT 0.09 ICS 0.07 NEWS 0.02 CCI | which result in the following linear combination and calculation of the Sentiment Risk Index at $t=20$.

| Sentiment Risk Index Calculation |
|---|
| January 2009 t = 20 SRI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097 |

Sentiment Risk Index Calculation

Jan-09 $t=20$ SRI=6.65355097+ 100=106.653551=Sentiment Risk Indes

Next, at $t=21$, the calculation can be repeated. For ease of exposition, it is assumed that all data items arrive simultaneously at $t=21$ (i.e., there is no tattered edge). A new correlation matrix can thus be obtained at $t=21$, for the 21-month period covering June 2007 to February 2009.

| Correlation Matrix Jun. 2007 - Feb. 2009 | | | | | | | |
|---|---|---|---|---|---|---|---|
| | ISM | PHIL | ICS | CCI | BBG | TWIT | NEWS |
| ISM | 1 | 0.368545 | 0.185727 | 0.323169 | 0.079517 | −0.013852 | 0.509614 |
| PHIL | 0.368545 | 1 | 0.760258 | −0.14017 | −0.228691 | 0.210349 | 0.252066 |
| ICS | 0.185727 | 0.760258 | 1 | −0.079567 | −0.051989 | 0.286316 | 0.02461 |
| CCI | 0.323169 | −0.14017 | −0.079567 | 1 | 0.535939 | 0.151677 | 0.28461 |
| BBG | 0.079517 | −0.228691 | −0.051989 | 0.535939 | 1 | −0.131162 | −0.321035 |
| TWIT | −0.013852 | 0.210349 | 0.286316 | 0.151677 | −0.131162 | 1 | 0.268098 |
| NEWS | 0.509614 | 0.252066 | 0.02461 | 0.28461 | −0.321035 | 0.268098 | 1 |

The eigendecomposition can again be performed on the t=21 correlation matrix and the following weights can thus be obtained:

| Sentiment Risk Index Calculation | | | | | | | | | | | | | | | |
|---|---|---|---|---|---|---|---|---|---|---|---|---|---|---|---|
| Jan-09 | t = 20 | SRI = 0.39 | PHIL | 0.18 | ISM | 0.14 | BBG | 0.11 | TWIT | 0.09 | ICS | 0.07 | NEWS | 0.02 | CCI |
| Feb-09 | t = 21 | SRI = 0.28 | ISM | 0.21 | ICS | 0.17 | PHIL | 0.11 | BBG | 0.09 | CCI | 0.08 | TWIT | 0.06 | NEWS |

This results in the following linear combination and calculation of the Sentiment Risk Index at t=21.

| Sentiment Risk Index Calculation |
|---|
| January 2009 t = 20 SRI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097 |
| February 2009 t = 21 SRI = (0.28 * −10.34) + (0.21 * −5.31) + (0.17 * −8.74) + (0.11 * −3.15) + (0.09 * −0.85) + (0.08 * −5.81) + (0.06 * 11.04) = −5.7222905 |

| Sentiment Risk Index Calculation | | |
|---|---|---|
| Jan-09 | t = 20 | SRI = 6.65355097 + 100 = 106.653551 = Sentiment Risk Index |
| Feb-09 | t = 21 | SRI = −5.7222905 + 100 = 94.2777095 = Sentiment Risk Index |

The process can be continued, and thus at each successive time period t+n, a new row of observations can be added to the matrix (data items arrive simultaneously in this example), a new correlation matrix is determined, a new eigendecomposition performed, a new set of weights obtained, and a new value of the Sentiment Risk Index calculated. The procedure continues recursively, with a new set of weights obtained at each period until t=30. The weights determined at each time period sum to 1 (note that the weights can range between −1 and 1, and could sum to any fixed number).

| Weights | | | | | | | |
|---|---|---|---|---|---|---|---|
| | w1 | w2 | w3 | w4 | w5 | w6 | w7 | TOTAL |
| t = 20 | 0.39 | 0.18 | 0.14 | 0.11 | 0.09 | 0.07 | 0.02 | = 1 |
| t = 21 | 0.28 | 0.21 | 0.17 | 0.11 | 0.09 | 0.08 | 0.06 | = 1 |
| t = 22 | 0.41 | 0.25 | 0.12 | 0.08 | 0.07 | 0.05 | 0.02 | = 1 |
| t = 23 | 0.37 | 0.22 | 0.16 | 0.14 | 0.07 | 0.03 | 0.01 | = 1 |
| t = 24 | 0.52 | 0.23 | 0.11 | 0.07 | 0.04 | 0.02 | 0.01 | = 1 |
| t = 25 | 0.49 | 0.26 | 0.14 | 0.05 | 0.03 | 0.02 | 0.01 | = 1 |
| t = 26 | 0.34 | 0.27 | 0.18 | 0.13 | 0.04 | 0.03 | 0.01 | = 1 |
| t = 27 | 0.28 | 0.24 | 0.21 | 0.18 | 0.06 | 0,02 | 0.01 | = 1 |
| t = 28 | 0.51 | 0.19 | 0.15 | 0,09 | 0.03 | 0.02 | 0.01 | = 1 |
| t = 29 | 0.48 | 0.21 | 0.14 | 0.08 | 0.04 | 0.03 | 0.02 | = 1 |
| t = 30 | 0.35 | 0.17 | 0.15 | 0.13 | 0.09 | 0.07 | 0.04 | = 1 |

At each time period, a vector can be determined, that is, a linear combination of the data elements is determined by the signal extraction algorithm, whereby the algorithm determines which data element is exerting the most to the least influence on the system at that point in time.

| Sentiment Risk Index Calculation | | | | | | | | | | | | | | | | | |
|---|---|---|---|---|---|---|---|---|---|---|---|---|---|---|---|---|---|
| January 2009 | t = 20 | SRI = 0.39 | PHIL | 0.18 | ISM | 0.14 | BBG | 0.11 | TWIT | 0.09 | ICS | 0.07 | NEWS | 0.02 | CCI |
| February 2009 | t = 21 | SRI = 0.28 | ISM | 0.21 | ICS | 0.17 | PHIL | 0.11 | BBG | 0.09 | CCI | 0.08 | TWIT | 0.06 | NEWS |
| March 2009 | t = 22 | SRI = 0.41 | TWIT | 0.25 | ICS | 0.12 | ISM | 0.08 | PHIL | 0.07 | NEWS | 0.05 | CCI | 0.02 | BBG |
| April 2009 | t = 23 | SRI = 0.37 | ICS | 0.22 | NEWS | 0.16 | CCI | 0.14 | ISM | 0.07 | TWIT | 0.03 | BBG | 0.01 | PHIL |
| May 2009 | t = 24 | SRI = 0.52 | BBG | 0.23 | PHIL | 0.11 | CCI | 0.07 | ICS | 0.04 | ISM | 0.02 | NEWS | 0.01 | TWIT |
| June 2009 | t = 25 | SRI = 0.49 | ISM | 0.26 | PHIL | 0.14 | ICS | 0.05 | CCI | 0.03 | BBG | 0.02 | TWIT | 0.01 | NEWS |
| July 2009 | t = 26 | SRI = 0.34 | NEWS | 0.27 | TWIT | 0.18 | CCI | 0.13 | BBG | 0.04 | ICS | 0.03 | PHIL | 0.01 | ISM |
| August 2009 | t = 27 | SRI = 0.28 | BBG | 0.24 | NEWS | 0.21 | PHIL | 0.18 | CCI | 0.06 | TWIT | 0.02 | ISM | 0.01 | ICS |
| September 2009 | t = 28 | SRI = 0.51 | TWIT | 0.19 | BBG | 0.15 | NEWS | 0.09 | PHIL | 0.03 | ICS | 0.02 | ISM | 0.01 | CCI |
| October 2009 | t = 29 | SRI = 0.48 | CCI | 0.21 | ICS | 0.14 | TWIT | 0.08 | NEWS | 0.04 | ISM | 0.03 | PHIL | 0.02 | BBG |
| November 2009 | t = 30 | SRI = 0.35 | TWIT | 0.17 | PHIL | 0.15 | ICS | 0.13 | CCI | 0.09 | BBG | 0.07 | ISM | 0.04 | NEWS |

Substituting back in the values of the data matrix gives the following linear combination of weighted variables:

| Sentiment Risk Index Calculation |
| --- |
| January 2009 t = 20 SRI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097 |
| February 2009 t = 21 SRI = (0.28 * −10.34) + (0.21 * −5.31) + (0.17 * −8.74) + (0.11 * −3.15) + (0.09 * −0.85) + (0.08 * −5.81) + (0.06 * 11.04) = −5.7222905 |
| March 2009 t = 22 SRI = (0.41 * −17.43) + (0.25 * −1.02) + (0.12 * 10.74) + (0.08 * 1.72) + (0.07 * 0.29) + (0.05 * 3.10) + (0.02 * 10.05) = −5.5989857 |
| April 2009 t = 23 SRI = (0.37 * 7.09) + (0.22 * 12.37) + (0.16 * 3.88) + (0.14 * 4.24) + (0.07 * 18.88) + (0.03 * 1.83) + (0.01 * −1.27) = 7.92255339 |
| May 2009 t = 24 SRI = (0.52 * 1.96) + (0.23 * 2.96) + (0.11 * 1.57) + (0.07 * 3.03) + (0.04 * 4.74) + (0.02 * 4.32) + (0.01 * −5.69) = 2.30608242 |
| June 2009 t = 25 SRI = (0.49 * −0.12) + (0.26 * −3.35) + (0.14 * −7.30) + (0.05 * −9.14) + (0.03 * −4.23) + (0.02 * 15.32) + (0.01 * 4.61) = −2.1836578 |
| July 2009 t = 26 SRI = (0.34 * −2.97) + (0.27 * 15.93) + (0.18 * 1.19) + (0.13 * −6.37) + (0.04 * 0.64) + (0.03 * 4.58) + (0.01 * −8.78) = 2.75373227 |
| August 2009 t = 27 SRI = (0.28 * 6.81) + (0.24 * 5.74) + (0.21 * 8.64) + (0.18 * 2.01) + (0.06 * −0.28) + (0.02 * 8.36) + (0.01 * 8.63) = 5.69431573 |
| September 2009 t = 28 SRI = (0.51 * 6.34) + (0.19 * 2.17) + (0.15 * −3.30) + (0.09 * −12.33) + (0.03 * −2.84) + (0.02 * −1.36) + (0.01 * 5.24) = 1.98013163 |
| October 2009 t = 29 SRI = (0.48 * −3.93) + (0.21 * 4.84) + (0.14 * −9.47) + (0.08 * 4.88) + (0.04 * 4.73) + (0.03 * 5.63) + (0.02 * 0.85) = −1.4287312 |
| November 2009 t = 30 SRI = (0.35 * 2.48) + (0.17 * 4.47) + (0.15 * 1.90) + (0.13 * 1.78) + (0.09 * 5.30) + (0.07 * −0.24) + (0.04 * 0.22) = 2.61301774 |

Adding a scalar then produces the Sentiment Risk Index for periods t=20 to t=30.

| Sentiment Risk Index Calculation |
| --- |
| January 2009 t = 20 SRI = 6.65355097 + 100 = 106.653551 = Sentiment Risk Index |
| February 2009 t = 21 SRI = −5.7222905 + 100 = 94.2777095 = Sentiment Risk Index |
| March 2009 t = 22 SRI = −5.5989857 + 100 = 94.4010143 = Sentiment Risk Index |
| April 2009 t = 23 SRI = 7.9225339 + 100 = 107.922553 = Sentiment Risk Index |
| May 2009 t = 24 SRI = 2.30608242 + 100 = 102.306082 = Sentiment Risk Index |
| June 2009 t = 25 SRI = −2.1836578 + 100 = 97.8163422 = Sentiment Risk Index |
| July 2009 t = 26 SRI = 2.75373227 + 100 = 102.753732 = Sentiment Risk Index |
| August 2009 t = 27 SRI = 5.69431573 + 100 = 105.694316 = Sentiment Risk Index |
| September 2009 t = 28 SRI = 1.98013163 + 100 = 101.980132 = Sentiment Risk Index |
| October 2009 t = 29 SRI = −.4287312 + 100 = 98.5712688 = Sentiment Risk Index |
| November 2009 t = 30 SRI = 2.61301774 + 100 = 102.613018 = Sentiment Risk index |

Since the data were assumed to arrive simultaneously at each time period, the matrix did not have a tattered edge, i.e., the matrix was balanced and so a standard correlation matrix was obtained and the eigendecomposition was performed recursively, and there was no need for ARIMA, arithmetic, or logarithmic extrapolation or for the Kalman Filter to be applied.

Alternatively, we can assume the more realistic case where some data may be missing, and data arrive spontaneously, rather than simultaneously. In this case, the MPCA-KF algorithm would calculate the composite sentiment indicator as follows:

1) Load data: Excel, ascii, or other standard formats, or connect to API feeds. The user specifies data sources. The program automatically detects number of data series and arrange data from left to right in chronological order, with the data series having the oldest start date on the leftmost column, and the data series having the newest start date on the rightmost column;

2) Normalize data and/or perform any transformations,
The program gives basic functionality: log differences, basic calculations, change frequency (eg, convert weekly data to monthly, monthly to quarterly, etc.). In this example log differences are calculated.

3) Define ramp-up period to obtain initial values; designate the first n observations to be the ramp-up window to obtain first set of Principal Components,
The user designates a time period as the ramp-up period, for example, from t=1 to t=20. The program automatically detects if there are any missing observations in the ramp-up period. The user specifies how to deal with any missing observations in the ramp-up period: 1) estimate by ARIMA; 2) logarithmic interpolation; 3) arithmetic interpolation; 4) user defined method. In this example, logarithmic interpolation is selected.

4) Choose whether principal components will be estimated on: 1) standard correlation matrix; 2) standard covariance matrix; 3) a matrix of pairwise correlations, 4) a matrix of pairwise covariances
In this example, a matrix of pairwise correlations is selected.

5) Perform eigendecomposition and obtain first set of principal components

6) The program designates a placeholder for series for PC1, PC2 . . . PCn

7) Once the initial values have been obtained, a recursive PCA calculation begins, i.e., repeat steps 5 and 6, now on matrix of data for t=1 to t=21, then on matrix for t=1 to t=22, and so on, until t=30.

8) The program automatically detects which series are available at each point in time. That is, if a series is revised, the revision enters concurrently with the unrevised data, or the user can elect to have the revised data replace the unrevised data. If a series is discontinued or a new series is introduced at a given point in time, the program detects what data are in the Information Set at any given point in time. This means that the calculation is done "on the fly" only on the information available at each point in time. The program detects the Information Set at each point in time. The user specifies if any revision should a) enter the calculation concurrently with the unrevised data, or b) replace the unrevised data as soon as the revision is available.

9) If there is a tattered edge of data at the end of any sample period at any point in time, that is, if due to spontaneous arrival of data (due to different publication dates), then the program estimates data to fill in the missing values.

The user selects from various options on how to handle the tattered edge of data at the end of the sample period. The user can choose to estimate missing data points at the tattered edge with: 1) Kalman Filter; 2) ARIMA estimation; 3) Logarithmic Extrapolation; 4) Arithmetic Extrapolation; or, 5) a user-defined method. The user can also choose to generate several candidate series by more than one method simultaneously. For example, choose Kalman Filter and ARIMA at the same time and generate 2 candidate series. In this example, missing data points at the tattered edge are estimated by the Kalman Filter.

Such a calculation is performed continually by automatically checking and detecting the shape of the matrix. If spontaneously arrived data have caused a tattered edge at the end of the dataset, then the data can be filled in with estimates, either by ARIMA or arithmetic or logarithmic extrapolation or some other method, or the Kalman Filter can be applied. Once actual data have arrived, the estimate data can be replaced by the actual values. As long as the edge remains tattered, estimates are calculated to square the tattered edge. Once actual data have arrived to complete the tattered edge, the calculation switches back to recursive principal components analysis, and the eigendecomposition performed. Once new data arrives to cause a new tattered edge in the next time period, the estimate procedure is resumed, until the edge becomes square again with actual data, and so on, repeating as each new data point arrives.

The calculation can be performed as follows. Suppose, for example, we have the following data representing monthly changes (calculated by the log differences) in the values for 7 data series:

| ISM, PHIL, ICS, CCI, BBG, TWIT, and NEWS. | | | | | | | | |
|---|---|---|---|---|---|---|---|---|
| | | ISM | PHIL | ICS | CCI | BBG | TWIT | NEWS |
| June 2007 | t = 1 | 8.88 | 3.44 | 8.35 | −2.73 | −7.25 | −11.12 | 6.79 |
| July 2007 | t = 2 | 9.76 | −5.64 | −5.07 | 6.05 | 4.09 | 12.10 | 10.66 |
| August 2007 | t = 3 | −6.08 | −3.46 | −4.20 | −0.82 | 5.08 | −32.69 | −19.65 |
| September 2007 | t = 4 | −11.47 | 0.18 | 0.92 | 2.60 | 6.72 | 12.95 | 3.53 |
| October 2007 | t = 5 | 14.52 | −0.30 | −2.36 | −2.68 | −7.58 | −2.50 | 14.42 |
| November 2007 | t = 6 | −1.01 | 2.46 | 5.29 | 3.95 | −2.43 | 5.82 | 7.03 |
| December 2007 | t = 7 | 1.79 | 9.60 | 9.75 | −1.35 | 1.66 | 8.38 | 2.04 |
| January 2008 | t = 8 | −2.95 | −8.89 | −11.90 | 2.77 | 6.83 | −32.77 | −6.96 |
| February 2008 | t = 9 | −2.97 | −4.51 | | 1.47 | 2.94 | 27.61 | −10.93 |
| March 2008 | t = 10 | 7.26 | 0.92 | −4.84 | 0.15 | −2.22 | 9.07 | 5.76 |
| April 2008 | t = 11 | −12.52 | 0.43 | −3.29 | −18.94 | −15.50 | −7.97 | −1.56 |
| May 2008 | t = 12 | −8.27 | −2.40 | 2.71 | −10.44 | 5.31 | −4.85 | −33.02 |
| June 2008 | t = 13 | −2.80 | −1.57 | −2.93 | 9.89 | −4.37 | 5.02 | 0.10 |
| July 2008 | t = 14 | 3.74 | −1.02 | 1.48 | 6.32 | 6.14 | −17.49 | −7.89 |
| August 2008 | t = 15 | −6.71 | 1.65 | 1.96 | −2.30 | −8.03 | 8.48 | 0.90 |
| September 2008 | t = 16 | 8.15 | 3.58 | 0.86 | −2.17 | −0.53 | −9.49 | 1.77 |
| October 2008 | t = 17 | −1.36 | −1.28 | −3.33 | 4.39 | 2.83 | 13.04 | 5.23 |
| November 2008 | t = 18 | 2.11 | −1.11 | 2.76 | 3.44 | 5.53 | −14.88 | 3.27 |
| December 2008 | t = 19 | 3.85 | 0.31 | 1.07 | −3.44 | −0.98 | −5.10 | 7.18 |
| January 2009 | t = 20 | 18.45 | 4.89 | 2.80 | 3.86 | 5.01 | −5.60 | 14.45 |
| February 2009 | t = 21 | −10.34 | −8.74 | −5.31 | −0.85 | −3.15 | −5.81 | 11.04 |
| March 2009 | t = 22 | 10.74 | 1.72 | −1.02 | 3.10 | 10.05 | −17.43 | 0.29 |
| April 2009 | t = 23 | 4.24 | −1.27 | 7.09 | 3.88 | 1.83 | 18.88 | 12.37 |
| May 2009 | t = 24 | 4.74 | 2.96 | 3.03 | 1.57 | 1.96 | −5.69 | 4.32 |
| June 2009 | t = 25 | −0.12 | −3.35 | −7.30 | −9.14 | −4.23 | 15.32 | 4.61 |
| July 2009 | t = 26 | −8.78 | 4.58 | 0.64 | 1.19 | −6.37 | 15.93 | −2.97 |
| August 2009 | t = 27 | 8.36 | 8.64 | 8.63 | 2.01 | 6.81 | −0.28 | 5.74 |
| September 2009 | t = 28 | −1.36 | −12.33 | −2.84 | 5.24 | 2.17 | 6.34 | −3.30 |
| October 2009 | t = 29 | 4.73 | 5.63 | 4.84 | −3.93 | 0.85 | −9.47 | 4.88 |
| November 2009 | t = 30 | | 4.47 | 1.90 | | | 2.48 | 0.22 |

Notice that at t=9, there is a missing value for ICS, and at the end of the sample period, at t=30, there is a tattered edge of data due to publication lags.

Suppose the MPCA-KF algorithm described above is applied, and assuming for ease of exposition that the data items arrive simultaneously at each successive time period, except at the end of the sample period, at t=30.

At t=9, the missing data is estimated by logarithmic interpolation (user-selected method). The first 20 observations are utilized as a ramp-up period.

| | | ISM | PHIL | ICS | CCI | BBG | TWIT | NEWS |
|---|---|---|---|---|---|---|---|---|
| June 2007 | t = 1 | 8.88 | 3.44 | 8.35 | −2.73 | −7.25 | −11.12 | 6.79 |
| July 2007 | t = 2 | 9.76 | −5.64 | −5.07 | 6.05 | 4.09 | 12.10 | 10.66 |
| August 2007 | t = 3 | −6.08 | −3.46 | −4.20 | −0.82 | 5.08 | −32.69 | −19.65 |
| September 2007 | t = 4 | −11.47 | 0.18 | 0.92 | 2.60 | 6.72 | 12.95 | 3.53 |
| October 2007 | t = 5 | 14.52 | −0.30 | −2.36 | −2.68 | −7.58 | −2.50 | 14.42 |
| November 2007 | t = 6 | −1.01 | 2.46 | 5.29 | 3.95 | −2.43 | 5.82 | 7.03 |
| December 2007 | t = 7 | 1.79 | 9.60 | 9.75 | −1.35 | 1.66 | 8.38 | 2.04 |
| January 2008 | t = 8 | −2.95 | −8.89 | −11.90 | 2.77 | 6.83 | −32.77 | −6.96 |
| February 2008 | t = 9 | −2.97 | −4.51 | 5.36 | 1.47 | 2.94 | 27.61 | −10.93 |
| March 2008 | t = 10 | 7.26 | 0.92 | −4.84 | 0.15 | −2.22 | 9.07 | 5.76 |
| April 2008 | t = 11 | −12.52 | 0.43 | −3.29 | −18.94 | −15.50 | −7.97 | −1.56 |
| May 2008 | t = 12 | −8.27 | −2.40 | 2.71 | −10.44 | 5.31 | −4.85 | −33.02 |
| June 2008 | t = 13 | −2.80 | −1.57 | −2.93 | 9.89 | −4.37 | 5.02 | 0.10 |
| July 2008 | t = 14 | 3.74 | −1.02 | 1.48 | 6.32 | 6.14 | −17.49 | −7.89 |
| August 2008 | t = 15 | −6.71 | 1.65 | 1.96 | −2.30 | −8.03 | 8.48 | 0.90 |

-continued

|  | ISM | PHIL | ICS | CCI | BBG | TWIT | NEWS |
|---|---|---|---|---|---|---|---|
| September 2008 t = 16 | 8.15 | 3.58 | 0.86 | −2.17 | −0.53 | −9.49 | 1.77 |
| October 2008 t = 17 | −1.36 | −1.28 | −3.33 | 4.39 | 2.83 | 13.04 | 5.23 |
| November 2008 t = 18 | 2.11 | −1.11 | 2.76 | 3.44 | 5.53 | −14.88 | 3.27 |
| December 2008 t = 19 | 3.85 | 0.31 | 1.07 | −3.44 | −0.98 | −5.10 | 7.18 |
| January 2009 t = 20 | 18.45 | 4.89 | 2.80 | 3.86 | 5.01 | −5.60 | 14.45 |

The first 20 observations are utilized as a ramp-up period and a set of initial weights, summing to 1, are calculated at t=20 based on the matrix of pairwise correlations, with pairwise correlation values bounded between −1 and 1. A matrix of pairwise correlations is obtained for the 20-month period covering June 2007 to January 2009:

Matrix of Pairwise Correlations June 2007-January 2009

|  | ISM | PHIL | ICS | CCI | BBG | TWIT | NEWS |
|---|---|---|---|---|---|---|---|
| ISM | 1 | 0.280055 | 0.125079 | 0.329044 | 0.046757 | −0.031162 | 0.610783 |
| PHIL | 0.280055 | 1 | 0.751053 | −0.169945 | −0.313332 | 0.20769 | 0.38833 |
| ICS | 0.125079 | 0.751053 | 1 | −0.089229 | −0.083228 | 0.281934 | 0.077864 |
| CCI | 0.329044 | −0.169945 | −0.089229 | 1 | 0.536445 | 0.150346 | 0.297538 |
| BBG | 0.046757 | −0.313332 | −0.083228 | 0.536445 | 1 | −0.138821 | −0.30494 |
| TWIT | −0.031162 | 0.20769 | 0.281934 | 0.150346 | −0.138821 | 1 | 0.28608 |
| NEWS | 0.610783 | 0.38833 | 0.077864 | 0.297538 | −0.30494 | 0.28608 | 1 |

An eigendecomposition is then performed on the t=20, correlation matrix and the following weights are thus obtained:

Composite Sentiment Index Calculation

January 2009 t = 20 CSI = 0.39 PHIL 0.18 ISM 0.14 BBG 0.11 TWIT 0.09 ICS 0.07 NEWS 0.02 CCI which result in the following linear combination and calculation of the Composite Index at t=20.

Composite Sentiment Index Calculation

January 2009 t = 20 CSI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097

Thus, PC1, the first principal component, has a value of 6.65 at t=20, and becomes the first observation of the series representing the Composite Sentiment Index.

Next, at t=21, the calculation is repeated. For ease of exposition, it is assumed that all data items arrive simultaneously at t=21 (i.e., there is no tattered edge). A new matrix of pairwise correlations can thus be obtained at t=21, for the 21-month period covering June 2007 to February 2009.

Matrix of Pairwise Correlations June 2007-February 2009

|  | ISM | PHIL | ICS | CCI | BBG | TWIT | NEWS |
|---|---|---|---|---|---|---|---|
| ISM | 1 | 0.368545 | 0.185727 | 0.323169 | 0.079517 | −0.013852 | 0.509614 |
| PHIL | 0.368545 | 1 | 0.760258 | −0.14017 | −0.228691 | 0.210349 | 0.252066 |
| ICS | 0.185727 | 0.760258 | 1 | −0.079567 | −0.051989 | 0.286316 | 0.02461 |
| CCI | 0.323169 | −0.14017 | −0.079567 | 1 | 0.535939 | 0.151677 | 0.28461 |

-continued

Matrix of Pairwise Correlations June 2007-February 2009

|      | ISM       | PHIL      | ICS       | CCI      | BBG       | TWIT      | NEWS      |
|------|-----------|-----------|-----------|----------|-----------|-----------|-----------|
| BBG  | 0.079517  | −0.228691 | −0.051989 | 0.535939 | 1         | −0.131162 | −0.321035 |
| TWIT | −0.013852 | 0.210349  | 0.286316  | 0.151677 | −0.131162 | 1         | 0.268098  |
| NEWS | 0.509614  | 0.252066  | 0.02461   | 0.28461  | −0.321035 | 0.268098  | 1         |

The eigendecomposition can again be performed on the t=21 matrix of pairwise correlations and the following weights can thus be obtained:

Compose Sentiment Index Calculation

| January 2009  | t = 20 | CSI = 0.39 | PHIL | 0.18 | ISM  | 0.14 | BBG  | 0.11 | TWIT | 0.09 | ICS  | 0.07 | NEWS | 0.02 | CCI  |
| February 2009 | t = 21 | CSI = 0.28 | ISM  | 0.21 | ICS  | 0.17 | PHIL | 0.12 | BBG  | 0.09 | CCI  | 0.07 | TWIT | 0.06 | NEWS |

This results in the following linear combination and calculation of the Composite Sentiment Index at t=21.

Composite Sentiment Index Calculation

January 2009 t = 20 CSI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097
February 2009 t = 21 CSI = (0.28 * −10.34) + (0.21 * −5.31) + (0.17 * −8.74) + (0.11 * −3.15) + (0.09 * −0.85) + (0.08 * −5.81) + (0.06 * 11.04) = −5.7222905

Thus PC1 (the Composite Sentiment Index) has a value of −5.72 at t=21.

The PC1 series is building at each time period:

$t=20, PC1 = $ Composite Sentiment Index$=6.65$ $t=21, PC1 = $ Composite Sentiment Index$=-5.72$ The process can be continued, and thus at each successive time period t+i, a new row of observations can be added to the matrix (data items arrive simultaneously in this example at each time period until the very end), a new matrix of pairwise correlations is determined at each point in time, a new eigendecomposition is performed, a new set of weights are obtained, a new PC1 (first principal component), i.e., a new value of the Composite Sentiment Index is calculated. The procedure continues recursively, with a new set of weights obtained at each period until t=30. The weights determined at each time period sum to 1.

At t=30, missing data for ISM, CCI, and BBG are estimated by means of a Kalman Filter (the user could have also selected ARIMA, or logarithmic extrapolation, or arithmetic extrapolation or some other method).

|                |        | ISM    | PHIL   | ICS    | CCI    | BBG    | TWIT   | NEWS   |
|----------------|--------|--------|--------|--------|--------|--------|--------|--------|
| June 2007      | t = 1  | 8.88   | 3.44   | 8.35   | −2.73  | −7.25  | −11.12 | 6.79   |
| July 2007      | t = 2  | 9.76   | −5.64  | −5.07  | 6.05   | 4.09   | 12.10  | 10.66  |
| August 2007    | t = 3  | −6.08  | −3.46  | −4.20  | −0.82  | 5.08   | −32.69 | −19.65 |
| September 2007 | t = 4  | −11.47 | 0.18   | 0.92   | 2.60   | 6.72   | 12.95  | 3.53   |
| October 2007   | t = 5  | 14.52  | −0.30  | −2.36  | −2.68  | −7.58  | −2.50  | 14.42  |
| November 2007  | t = 6  | −1.01  | 2.46   | 5.29   | 3.95   | −2.43  | 5.82   | 7.03   |
| December 2007  | t = 7  | 1.79   | 9.60   | 9.75   | −1.35  | 1.66   | 8.38   | 2.04   |
| January 2008   | t = 8  | −2.95  | −8.89  | −11.90 | 2.77   | 6.83   | −32.77 | −6.96  |
| February 2008  | t = 9  | −2.97  | −4.51  | 5.36   | 1.47   | 2.94   | 27.61  | −10.93 |
| March 2008     | t = 10 | 7.26   | 0.92   | −4.84  | 0.15   | −2.22  | 9.07   | 5.76   |
| April 2008     | t = 11 | −12.52 | 0.43   | −3.29  | −18.94 | −15.50 | −7.97  | −1.56  |
| May 2008       | t = 12 | −8.27  | −2.40  | 2.71   | −10.44 | 5.31   | −4.85  | −33.02 |
| June 2008      | t = 13 | −2.80  | −1.57  | −2.93  | 9.89   | −4.37  | 5.02   | 0.10   |
| July 2008      | t = 14 | 3.74   | −1.02  | 1.48   | 6.32   | 6.14   | −17.49 | −7.89  |
| August 2008    | t = 15 | −6.71  | 1.65   | 1.96   | −2.30  | −8.03  | 8.48   | 0.90   |
| September 2008 | t = 16 | 8.15   | 3.58   | 0.86   | −2.17  | −0.53  | −9.49  | 1.77   |
| October 2008   | t = 17 | −1.36  | −1.28  | −3.33  | 4.39   | 2.83   | 13.04  | 5.23   |
| November 2008  | t = 18 | 2.11   | −1.11  | 2.76   | 3.44   | 5.53   | −14.88 | 3.27   |
| December 2008  | t = 19 | 3.85   | 0.31   | 1.07   | −3.44  | −0.98  | −5.10  | 7.18   |
| January 2009   | t = 20 | 18.45  | 4.89   | 2.80   | 3.86   | 5.01   | −5.60  | 14.45  |
| February 2009  | t = 21 | −10.34 | −8.74  | −5.31  | −0.85  | −3.15  | −5.81  | 11.04  |
| March 2009     | t = 22 | 10.74  | 1.72   | −1.02  | 3.10   | 10.05  | −17.43 | 0.29   |
| April 2009     | t = 23 | 4.24   | −1.27  | 7.09   | 3.88   | 1.83   | 18.88  | 12.37  |
| May 2009       | t = 24 | 4.74   | 2.96   | 3.03   | 1.57   | 1.96   | −5.69  | 4.32   |
| June 2009      | t = 25 | −0.12  | −3.35  | −7.30  | −9.14  | −4.23  | 15.32  | 4.61   |
| July 2009      | t = 26 | −8.78  | 4.58   | 0.64   | 1.19   | −6.37  | 15.93  | −2.97  |
| August 2009    | t = 27 | 8.36   | 8.64   | 8.63   | 2.01   | 6.81   | −0.28  | 5.74   |
| September 2009 | t = 28 | −1.36  | −12.33 | −2.84  | 5.24   | 2.17   | 6.34   | −3.30  |
| October 2009   | t = 29 | 4.73   | 5.63   | 4.84   | −3.93  | 0.85   | −9.47  | 4.88   |
| November 2009  | t = 30 | −0.24  | 4.47   | 1.90   | 1.78   | 5.30   | 2.48   | 0.22   |

The weights determined at each time period sum to a fixed number, in this case the number 1.

| | w1 | w2 | w3 | w4 | w5 | w6 | w7 | TOTAL |
|---|---|---|---|---|---|---|---|---|
| Weights | | | | | | | | |
| t = 20 | 0.39 | 0.18 | 0.14 | 0.11 | 0.09 | 0.07 | 0.02 | = 1 |
| t = 21 | 0.28 | 0.21 | 0.17 | 0.11 | 0.09 | 0.08 | 0.06 | = 1 |
| t = 22 | 0.41 | 0.25 | 0.12 | 0.08 | 0.07 | 0.05 | 0.02 | = 1 |
| t = 23 | 0.37 | 0.22 | 0.16 | 0.14 | 0.07 | 0.03 | 0.01 | = 1 |
| t = 24 | 0.52 | 0.23 | 0.11 | 0.07 | 0.04 | 0.02 | 0.01 | = 1 |
| t = 25 | 0.49 | 0.26 | 0.14 | 0.05 | 0.03 | 0.02 | 0.01 | = 1 |
| t = 26 | 0.34 | 0.27 | 0.18 | 0.13 | 0.04 | 0.03 | 0.01 | = 1 |
| t = 27 | 0.28 | 0.24 | 0.21 | 0.18 | 0.06 | 0.02 | 0.01 | = 1 |
| t = 28 | 0.51 | 0.19 | 0.15 | 0.09 | 0.03 | 0.02 | 0.01 | = 1 |
| t = 29 | 0.48 | 0.21 | 0.14 | 0.08 | 0.04 | 0.03 | 0.02 | = 1 |
| t = 30 | 0.35 | 0.17 | 0.15 | 0.13 | 0.09 | 0.07 | 0.04 | = 1 |

At each time period, a vector, PC1 (the Composite Sentiment Indicator), is determined, that is, a linear combination of the data elements is determined by the signal extraction algorithm, whereby the algorithm determines which data element is exerting the most to the least influence on the system at that point in time.

| | | | | | | | | | | | | | | | | | |
|---|---|---|---|---|---|---|---|---|---|---|---|---|---|---|---|---|---|
| Composite Sentiment Index Calculation | | | | | | | | | | | | | | | | | |
| January 2009 | t = 20 | CSI = 0.39 | PHIL | 0.18 | ISM | 0.14 | BBG | 0.11 | TWIT | 0.09 | ICS | 0.07 | NEWS | 0.02 | CCI | | |
| February 2009 | t = 21 | CSI = 0.28 | ISM | 0.22 | ICS | 0.17 | PHIL | 0.12 | BBG | 0.09 | CCI | 0.07 | TWIT | 0.06 | NEWS | | |
| March 2009 | t = 22 | CSI = 0.41 | TWIT | 0.25 | ICS | 0.12 | ISM | 0.08 | PHIL | 0.07 | NEWS | 0.05 | CCI | 0.02 | BBG | | |
| April 2009 | t = 23 | CSI = 0.37 | ICS | 0.22 | NEWS | 0.16 | CCI | 0.14 | ISM | 0.07 | TWIT | 0.03 | BBG | 0.01 | PHIL | | |
| May 2009 | t = 24 | CSI = 0.52 | BBG | 0.23 | PHIL | 0.11 | CCI | 0.07 | ICS | 0.04 | ISM | 0.02 | NEWS | 0.01 | TWIT | | |
| June 2009 | t = 25 | CSI = 0.49 | ISM | 0.26 | PHIL | 0.14 | ICS | 0.05 | CCI | 0.03 | BBG | 0.02 | TWIT | 0.01 | NEWS | | |
| July 2009 | t = 26 | CSI = 0.34 | NEWS | 0.27 | TWIT | 0.18 | CCI | 0.13 | BBG | 0.04 | ICS | 0.03 | PHIL | 0.01 | ISM | | |
| August 2009 | t = 27 | CSI = 0.28 | BBG | 0.24 | NEWS | 0.21 | PHIL | 0.18 | CCI | 0.06 | TWIT | 0.02 | ISM | 0.01 | ICS | | |
| September 2009 | t = 28 | CSI = 0.51 | TWIT | 0.19 | BBG | 0.15 | NEWS | 0.09 | PHIL | 0.03 | ICS | 0.02 | ISM | 0.01 | CCI | | |
| October 2009 | t = 29 | CSI = 0.48 | CCI | 0.21 | ICS | 0.14 | TWIT | 0.08 | NEWS | 0.04 | ISM | 0.03 | PHIL | 0.02 | BBG | | |
| November 2009 | t = 30 | CSI = 0.35 | TWIT | 0.17 | PHIL | 0.15 | ICS | 0.13 | CCI | 0.09 | BBG | 0.07 | ISM | 0.04 | NEWS | | |

Substituting back in the values of the data matrix gives the following linear combination of weighted variables, and PC1 values:

Substituting back in the values of the data matrix gives the following linear combination of weighted variables, and PC1 values:
Composite Sentiment Index Calculation January 2009 t = 20 CSI = (0.39 * 4.89) + (0.18 * 18.45) + (0.14 * 5.01) + (0.11 * −5.60) + (0.09 * 2.80) + (0.07 * 14.45) + (0.02 * 3.86) = 6.65355097
February 2009 t = 21 CSI = (0.28 * −10.34) + (0.21 * −5.31 + (0.17 * −8.74) + 0.11 * −3.15) +) 0.09 * −0.85) + (0.08 * −5.81) + (0.06 * 11.04) = −5.7222905
March 2009 t = 22 CSI = (0.41 * −17.43)) + (0.25 * −1.02) + (0.12 * 10.74) + (0.08 * 1.72) + (0.07 * 0.29) + (0.05 * 3.10) + (0.02 * 10.05) = −5.5989857
April 2009 t = 23 CSI = (0.37 * 7.09) + (0.22 * 12.37) + (0.16 * 3.88) + (0.14 * 4.24) + (0.07 * 18.88) + (0.03 * 1.83) + (0.01 * −1.27) = 7.92255339
May 2009 t = 24 CSI = (0.52 * 1.96) + (0.23 * 2.96) + (0.11 * 1.57) + (0.07 * 3.03) + (0.04 * 4.74) + (0.02 * 4.32) + (0.01 * −5.69) = 2.30608242
June 2009 t = 25 CSI = (0.49 * −0.12) + (0.26 * −3.35) + (0.14 * −7.30) + (0.05 * −9.14) + (0.03 * −4.23) + (0.02 * 15.32) + (0.01 * 4.61) = −2.1836578
July 2009 t = 26 CSI = (0.34 * −2.97) + (0.27 * 15.93) + (0.18 * 1.19) + (0.13 * −6.37) + (0.04 * 0.64) + (0.03 * 4.58) + (0.01 * −8.78) = 2.75373227
August 2009 t = 27 CSI = (0.28 * 6.81) + (0.24 * 5.74) + (0.21 * 8.64) + (0.18 * 2.01) + (0.06 * −0.28) + (0.02 * 8.36) + (0.01 * 8.63) = 5.69431573

-continued

Substituting back in the values of the data matrix gives the following linear combination of weighted variables, and PC1 values:
Composite Sentiment Index Calculation September 2009 t = 28 CSI = (0.51 * 6.34) + (0.19 * 2.17) + (0.15 * −3.30) + (0.09 * −12.33) + (0.03 * −2.84) + (0.02 * −1.36) + (0.01 * 5.24) = 1.98013163
October 2009 t = 29 CSI = (0.48 * −3.93) + (0.21 * 4.84) + (0.14 * −9.47) + (0.08 * 4.88) + (0.04 * 4.73) + (0.03 * 5.63) + (0.02 * 0.85) = −1.4287312
November 2009 t = 30 CSI = (0.35 * 2.48) + (0.17 * 4.47) + (0.15 * 1.90) + (0.13 * 1.78) + (0.09 * 5.30) + (0.07 * −0.24) + (0.04 * 0.22) = 2.61301774

And the PC1 series is:

| Composite Sentiment Index Calculation | | |
|---|---|---|
| Jan. 09 | t = 20 | CSI = 6.65355097 |
| Feb. 09 | t = 21 | CSI = −5.7222905 |
| Mar. 09 | t = 22 | CSI = −5.5989857 |
| Apr. 09 | t = 23 | CSI = 7.92255339 |
| May 09 | t = 24 | CSI = 2.30608242 |

-continued

| Composite Sentiment Index Calculation | | |
|---|---|---|
| Jun. 09 | t = 25 | CSI = −2.1836578 |
| Jul. 09 | t = 26 | CSI = 2.75373227 |
| Aug. 09 | t = 27 | CSI = 5.69431573 |
| Sep. 09 | t = 28 | CSI = 1.98013163 |
| Oct. 09 | t = 29 | CSI = −1.4287312 |
| Nov. 09 | t = 30 | CSI = 2.61301774 |

Since the data were assumed to arrive simultaneously at each time period, there was no need for ARIMA, arithmetic, or logarithmic extrapolation or for the Kalman Filter to be applied, until t=30. But, the estimate at t=30 could have occurred at any time period after the initial ramp-up window, which in this example was selected at t=20.

It is noted that the properties of a matrix of pairwise correlations (covariances) are not quite the same as those of a standard correlation (covariance) matrix. In the case that the matrix of pairwise correlations (or covariances) is not positive semidefinite, then the data matrix is forced to become square by either 1) filling in the missing values by estimation using ARIMA, arithmetic, or logarithmic interpolation or extrapolation or a user-defined method, and therefore the calculation is performed on a standard correlation or covariance matrix; or 2) a Kalman filter is applied over the entire unbalanced data set. The Program is prepared for the case that a matrix of pairwise correlations (or covariances) is not positive semidefinite, and offers an alternative calculation in this case.

Once the PC1 series, ie, the Composite Sentiment Index has been obtained, it can be analyzed on a standard analytical platform which can include graphs and summary statistics, as well as basic econometric analysis, such as OLS, MLE, GMM, etc., modeling with exponential (ie, polynomial distributed lags), etc. The Program allows a user to import other data to use in the analysis, for comparisons, making forecasts, etc. If the calculation utilizes real-time data via an API feed, the program can perform the calculation dynamically (in near real-time), and generate a numerical value for the index dynamically (in near real-time), as well as a graph, which updates dynamically (in near real-time).

It is noted that such a composite index can similarly be formed to identify the common element among various other sentiment or emotional measures. Such emotion measures are commonly understood to relate to intangible psychological factors, which drive human behavior and decision-making. These emotion measures are called by many names: emotion, sentiment, confidence, mood, expectations, fear, greed, hope, despair, optimism, pessimism, risk-on, risk-off, or other synonymous terms. It is noted that some people consider these measures to be synonymous and fungible, and others do not. By combining various measures of sentiment or emotion among market participants or among the general population, and extracting the common elements, we can more accurately determine the state of the collective consciousness of society, i.e., we can measure the pulse of collective thoughts. The collective mood or sentiment is an important measure because it is a precursor to actions and behavior which can effect economic outcomes, i.e., expectations and decisions regarding consumption, investment, and saving, which affect the allocation of resources and therefore the state of the economy and financial markets. Therefore, it is important to quantify sentiment risk and provide a method to insure against changes in sentiment.

The above-presented description and figures are intended by way of example only and are not intended to limit the present invention in any way except as set forth in the following claims. It is particularly noted that the persons skilled in the art can readily combine the various technical aspects of the various exemplary embodiments described. For example, different known and novel signal extraction algorithms could be loaded in to the system and candidate synthetic variables could be judged not only by minimum forecast error, but also by minimum forecast variance or some other measure. Alternatively, a user may devise a proprietary signal extraction algorithm by modifying and customizing a known signal extraction algorithm in the system. Similarly, weights can be determined by some other method, such as arbitrarily, user-configured, etc. Alternatively, for example, the weights could be determined by some other type of optimization or signal extraction method.

What is claimed:

1. A computer-implemented method for providing a sentiment risk index via a graphical user interface, the method comprising:

accessing, by a processor of a computer system executing a software application for generating a sentiment risk index, disparate data from one or more servers originating from a plurality of data sources forming a multidimensional data set, each of the disparate data being related to a sentiment about at least one respective asset from a plurality of assets and at least some of the disparate data related to a sentiment being in an unstructured qualitative form;

converting, by the processor, the accessed at least some of the disparate data in an unstructured qualitative form to obtain a structured quantitative form based on a process that converts the at least some of the disparate data related to the sentiment into a form such that the disparate data is combinable;

combining, by the processor of the computer system, the disparate data and the converted disparate data;

reducing the multidimensionality of the converted and combined data to obtain a reduced set of data, wherein the reducing is based on extracting, by the processor of the computer system, a respective common signal from the converted and combined data related to the sentiment for each respective asset from the plurality of assets;

determining, by the processor of the computer system, a respective sentiment risk index for each respective asset from the plurality of assets based at least in part on the reduced set of converted and combined data corresponding to the each respective asset;

generating, by the processor of the computer system, a respective sentiment risk index having a value for each respective asset from the plurality of assets, wherein the respective sentiment risk index is a measure of the sentiment about each respective asset from the plurality of assets determined from the converted, combined, and reduced disparate data; and providing, by the processor of the computer system via the graphical user interface, the respective sentiment risk index on a periodically updating basis such that a value of the sentiment risk index changes in response to a change in a sentiment determined from the converted, combined, and reduced disparate data.

2. The method of claim 1, wherein the plurality of data sources include at least one of: financial market data, company financial data, social media data, online comments, news, news data, weblog posts, surveys, opinion polls, prediction markets, Internet metadata, Internet search query data, and web activity data, and wherein the plurality of assets includes assets associated with at least one of: an identified index and a portfolio of assets.

3. The method of claim 1, further comprising:

generating, by the computer system, a composite sentiment risk index for the plurality of assets that aggregates the plurality of respective sentiment risk indices determined for each respective asset from the plurality of assets, wherein a respective weight is applied to each respective sentiment risk index and wherein the composite sentiment risk index is a measure of sentiment about the plurality of assets determined from the disparate data; and providing, by the computer system via the graphical user interface user platform, the composite sentiment risk index on a periodically updating basis such that a value of the composite sentiment risk index changes in response to a change in a sentiment determined from the converted, combined, and reduced disparate data.

4. The method of claim 3, further comprising:

selecting the plurality of assets to track an identified index, wherein each of the respective sentiment risk indices corresponding to each respective asset from the plurality of assets is weighted by a set of weights associated with the identified index; and tracking the composite sentiment risk in the identified index using the composite sentiment risk index.

5. The method of claim 3, further comprising generating an alert based on (i) at least one of a predetermined value of the composite sentiment risk index and a predetermined value of a respective sentiment risk index from the plurality of respective sentiment risk indices determined for each respective asset from the plurality of assets and (ii) a user-defined threshold level of at least one of a value of the composite sentiment risk index and a value of a respective sentiment risk index from the plurality of respective sentiment risk indices determined for each respective asset from the plurality of assets.

6. The method of claim 1, wherein the disparate data from the plurality of data sources comprises, for each respective asset from the plurality of assets, at least one of: a respective frequency of mentions and a respective volume of comments, each comment or mention being found in at least one of: financial market data, company financial data, social media data, online comments, news, news data, weblog posts, surveys, opinion polls, prediction markets, Internet metadata, Internet search query data, and web activity data.

7. The method of claim 6, wherein the respective volume of comments for each respective asset comprises at least one of positive comments, negative comments, and total comments.

8. The method of claim 1, wherein the disparate data from the plurality of data sources comprises, for each respective asset from the plurality of assets, a respective comparison of a number of positive words or a number of negative words related to the asset to a total number of words related to the asset or to a number of positive words or negative words, respectively, related to the asset, the words being found in at least one of: financial market data, company financial data, social media data, online comments, news, news data, weblog posts, surveys, opinion polls, prediction markets, Internet metadata, Internet search query data, and web activity data.

9. The method of claim 1, wherein the disparate data from the plurality of data sources includes a respective frequency of keyword occurrences related to at least one respective asset from the plurality of assets.

10. The method of claim 1, wherein the converting includes one or more of:
cleaning the accessed data;
estimating values of missing data from the accessed data;
removing outliers from the accessed data;
changing the frequency of the accessed data;
changing the format of the accessed data;
applying a mathematical transformation to the accessed data;
applying a statistical transformation to the accessed data;
applying natural language processing techniques to the accessed data;
applying semantic filtering techniques to the accessed data;
applying machine learning techniques to the accessed data;
applying a scoring algorithm to the accessed data;
applying a scaling procedure to the accessed data;
scaling the accessed data to have mean zero and unit variance; and
normalizing the accessed data.

11. The method of claim 3, further comprising:
establishing a financial instrument to track the value, over time, of at least one of: a respective sentiment risk index corresponding to a respective asset from the plurality of assets, and the composite sentiment risk index corresponding to the plurality of assets.

12. The method of claim 3, wherein the financial instrument comprises one of the following:

a risk management contract,
an exchange traded fund (ETF),
a derivatives instrument,
a futures instrument,
an options instrument, and
an option on futures instrument.

13. A system for providing a sentiment risk index via a graphical user interface, the system comprising:
at least one hardware processor and
a computer-readable medium storing a software application for generating the sentiment risk index, the software application including computer-executable instructions that, when executed by the at least one hardware processor, cause the at least one hardware processor to:
access, by the at least one hardware processor, disparate data from one or more servers originating from a plurality of data sources forming a multidimensional data set, each of the disparate data being related to a sentiment about at least one respective asset from a plurality of assets and at least some of the disparate data related to a sentiment being in an unstructured qualitative form;
convert, by the at least one hardware processor, the accessed at least some of the disparate data in an unstructured qualitative form to obtain a structured quantitative form based on a process that converts the at least some of the disparate data related to the sentiment into a form such that the disparate data is combinable;
combine, by at least one hardware processor, the disparate data and the converted disparate data;
reduce the multidimensionality of the converted and combined data to obtain a reduced set of data based on an extraction, by at least one hardware processor, of a respective common signal from the converted and combined data related to the sentiment for each respective asset from the plurality of assets;
determine, by the at least one hardware processor, a respective sentiment risk index for each respective asset from the plurality of assets based at least in part on the reduced set of converted and combined data corresponding to the each respective asset;
generate, by the at least one hardware processor, a respective sentiment risk index having a value for each respective asset from the plurality of assets, wherein the respective sentiment risk index is a measure of the sentiment about each respective asset from the plurality of assets determined from the converted, combined, and reduced disparate data; and,
in response to the generation of the sentiment risk index, display by the processor via the graphical user interface, the respective sentiment risk index on a periodically updating basis such that a value of the sentiment risk index changes in response to a change in a sentiment determined from the converted, combined, and reduced disparate data.

14. The system of claim 13, wherein the plurality of data sources include at least one of: financial market data, company financial data, social media data, online comments, news, news data, weblog posts, surveys, opinion polls, prediction markets, Internet metadata, Internet search query data, and web activity data and wherein the plurality of assets includes assets associated with at least one of: an identified index and a portfolio of assets.

15. The system of claim 13, further comprising:

generate, by at least one hardware processor, a composite sentiment risk index for the plurality of assets that aggregates the plurality of respective sentiment risk indices determined for each respective asset from the plurality of assets, wherein a respective weight is applied to each respective sentiment risk index and wherein the composite sentiment risk index is a measure of sentiment about the plurality of assets determined from the disparate data; and provide, by the at least one hardware processor via the graphical user interface user platform, the composite sentiment risk index on a periodically updating basis such that a value of the composite sentiment risk index changes in response to a change in a sentiment determined from the converted, combined, and reduced disparate data.

16. The system of claim 15, wherein the hardware processor is further configured to:

select the plurality of assets to track an identified index, wherein each of the respective sentiment risk indices corresponding to each respective asset from the plurality of assets is weighted by a set of weights associated with the identified index; and track the composite sentiment risk in the identified index using the composite sentiment risk index.

17. The system of claim 15, wherein the hardware processor is further configured to generate an alert based on (i) at least one of a predetermined value of the composite sentiment risk index and a predetermined value of a respective sentiment risk index from the plurality of respective sentiment risk indices determined for each respective asset from the plurality of assets and (ii) a user-defined threshold level of at least one of a value of the composite sentiment risk index and a value of a respective sentiment risk index from the plurality of respective sentiment risk indices determined for each respective asset from the plurality of assets.

18. A non-transitory computer-readable medium comprising computer-executable instructions that, when executed by a processor, cause the processor to:

access, by the processor executing a software application for generating a sentiment risk index, disparate data from one or more servers originating from a plurality of data sources forming a multidimensional data set, each of the disparate data being related to a sentiment about at least one respective asset from a plurality of assets and at least some of the disparate data related to a sentiment being in an unstructured qualitative form;

convert, by the processor, the accessed at least some of the disparate data in an unstructured qualitative form to obtain a structured quantitative form based on a process that converts the at least some of the disparate data related to the sentiment into a form such that the disparate data is combinable;

combine, by the processor, the disparate data and the converted disparate data;

reduce the multidimensionality of the converted and combined data to obtain a reduced set of data based on extracting, by the processor, a respective common signal from the converted and combined data related to the sentiment for each respective asset from the plurality of assets;

determine, by the processor, a respective sentiment risk index for each respective asset from the plurality of assets based at least in part on the reduced set of converted and combined data corresponding to the each respective asset;

generate, by the processor, a respective sentiment risk index having a value for each respective asset from the plurality of assets, wherein the respective sentiment risk index is a measure of the sentiment about each respective asset from the plurality of assets determined from the converted, combined, and reduced disparate data; and provide, by the processor via the graphical user interface, the respective sentiment risk index on a periodically updating basis such that a value of the sentiment risk index changes in response to a change in a sentiment determined from the converted, combined, and reduced disparate data.

* * * * *